(12) United States Patent
Wildey

(10) Patent No.: US 12,222,233 B2
(45) Date of Patent: Feb. 11, 2025

(54) METHOD FOR GENERATING A TIME DELAY

(71) Applicant: Rochester Gauges, LLC, Dallas, TX (US)

(72) Inventor: Chester Roy Wildey, Euless, TX (US)

(73) Assignee: Rochester Sensors, LLC, Coppell, TX (US)

( * ) Notice: Subject to any disclaimer, the term of this patent is extended or adjusted under 35 U.S.C. 154(b) by 147 days.

(21) Appl. No.: 17/377,651

(22) Filed: Jul. 16, 2021

(65) Prior Publication Data

US 2022/0065683 A1   Mar. 3, 2022

Related U.S. Application Data

(62) Division of application No. 16/173,993, filed on Oct. 29, 2018, now Pat. No. 11,099,052.

(51) Int. Cl.
*G01F 23/284* (2006.01)

(52) U.S. Cl.
CPC .................. *G01F 23/284* (2013.01)

(58) Field of Classification Search
CPC ..................................... G01F 23/284
See application file for complete search history.

(56) References Cited

U.S. PATENT DOCUMENTS 5,609,059 A   3/1997 McEwan
6,285,195 B1  9/2001 Needle
(Continued)

FOREIGN PATENT DOCUMENTS

CA   3082816 A1   5/2019
CN   207335822 U  5/2018
(Continued)

OTHER PUBLICATIONS

European Search Report as issued in connection with European Patent Application No. EP3647745A1 completed on Nov. 11, 2019, 2 pages.

(Continued)

*Primary Examiner* — Marcus E Windrich
(74) *Attorney, Agent, or Firm* — Howard IP Law Group, PC

(57) ABSTRACT

In a Time Domain Reflectometry (TDR) measurement system including a measurement probe and an electronics assembly, a method for generating a time delay between transmit and receive pulses for capturing measurements in a given measurement cycle, comprising initiating first relatively slow and second relatively fast time-dependent non-linear ramped waveform functions associated with transmit and receive signals, respectively; and initiated at a time prior to initiation of the first time-dependent non-linear ramped waveform at a second time $t_0$; comparing outputs of the first and second time dependent non-linear ramped waveform functions and activating a receive signal to measure a data point along the waveguide at a third time $t_1$ when the outputs of the first and second time-dependent non-linear functions are equal; wherein the first and second time-dependent non-linear ramped functions are configured such that their waveform characteristics produces a time delay between time $t_0$ and time $t_1$ that is a linear function of time.

8 Claims, 51 Drawing Sheets

(56) References Cited

U.S. PATENT DOCUMENTS

| | | | |
|---|---|---|---|
| 2001/0050629 A1* | 12/2001 | Benway | G01S 13/88 342/204 |
| 2007/0236269 A1* | 10/2007 | Viswanathan | H03H 11/265 327/276 |
| 2008/0036649 A1* | 2/2008 | Lyon | G01S 7/4052 342/174 |
| 2010/0030081 A1* | 2/2010 | Masuzawa | G01S 15/8915 600/459 |
| 2011/0199103 A1 | 8/2011 | Osswald et al. | |
| 2014/0085133 A1* | 3/2014 | Flasza | G01S 13/88 342/124 |
| 2014/0159743 A1* | 6/2014 | Dayal | G01F 23/284 324/649 |
| 2015/0084809 A1 | 3/2015 | Flasza et al. | |
| 2016/0187179 A1 | 6/2016 | Hrncir et al. | |
| 2016/0245685 A1 | 8/2016 | Gerding et al. | |
| 2019/0011308 A1 | 1/2019 | Edvardsson et al. | |
| 2019/0025234 A1 | 1/2019 | Weightman et al. | |
| 2020/0343678 A1 | 10/2020 | Shirai et al. | |

FOREIGN PATENT DOCUMENTS

| | | |
|---|---|---|
| DE | 102008043252 A1 | 5/2010 |
| EP | 1069649 A1 | 1/2001 |
| EP | 2741059 A1 | 6/2014 |
| EP | 3035041 A1 | 6/2016 |
| EP | 3647745 A1 | 5/2020 |
| WO | 2016090191 A1 | 6/2016 |
| WO | 2019099301 A1 | 5/2019 |

OTHER PUBLICATIONS

International Search Report and Written Opinion as issued in connection with International Patent Application No. PCT/US2018/060100 mailed May 23, 2019, 6 pages.

* cited by examiner

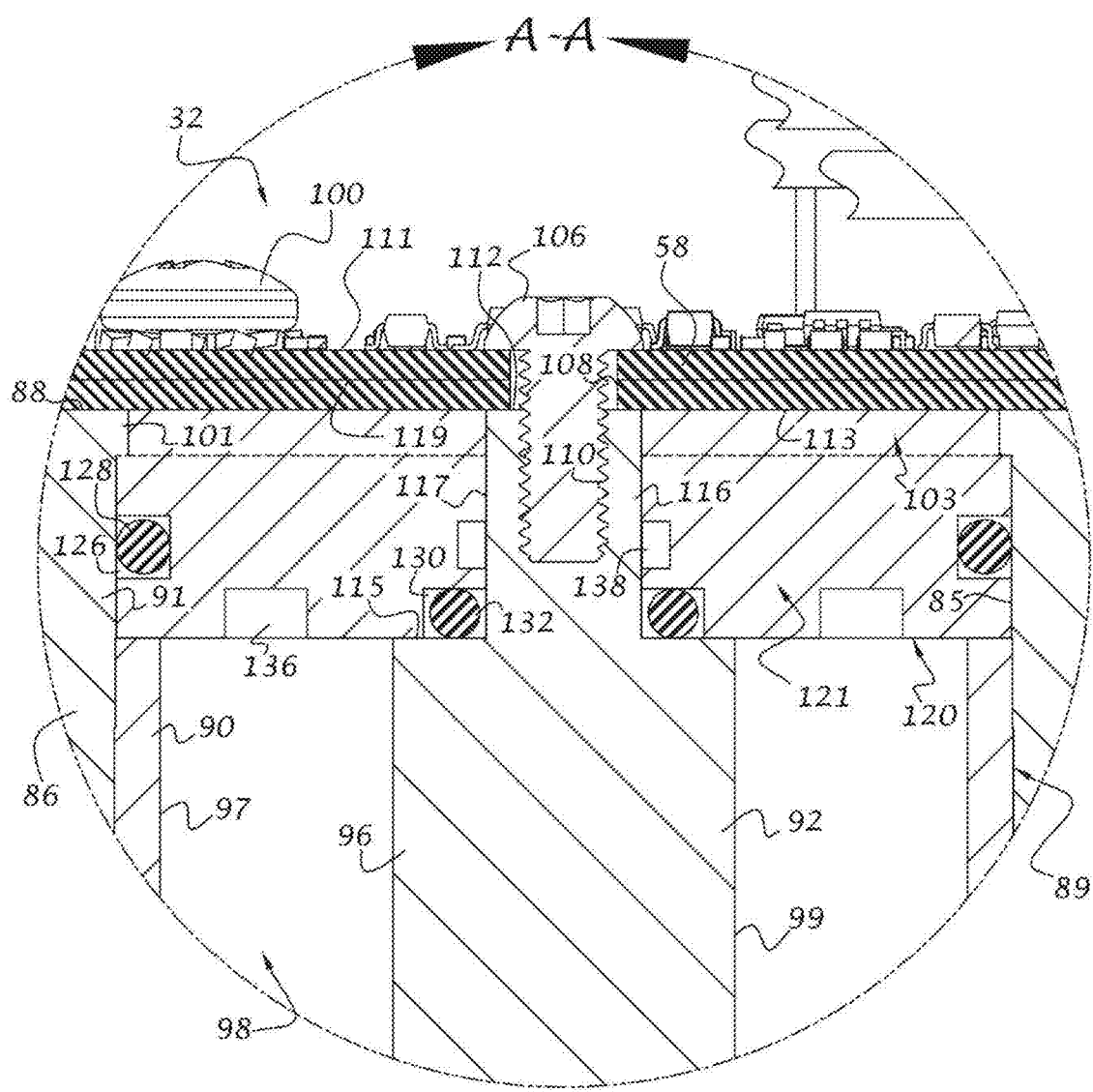

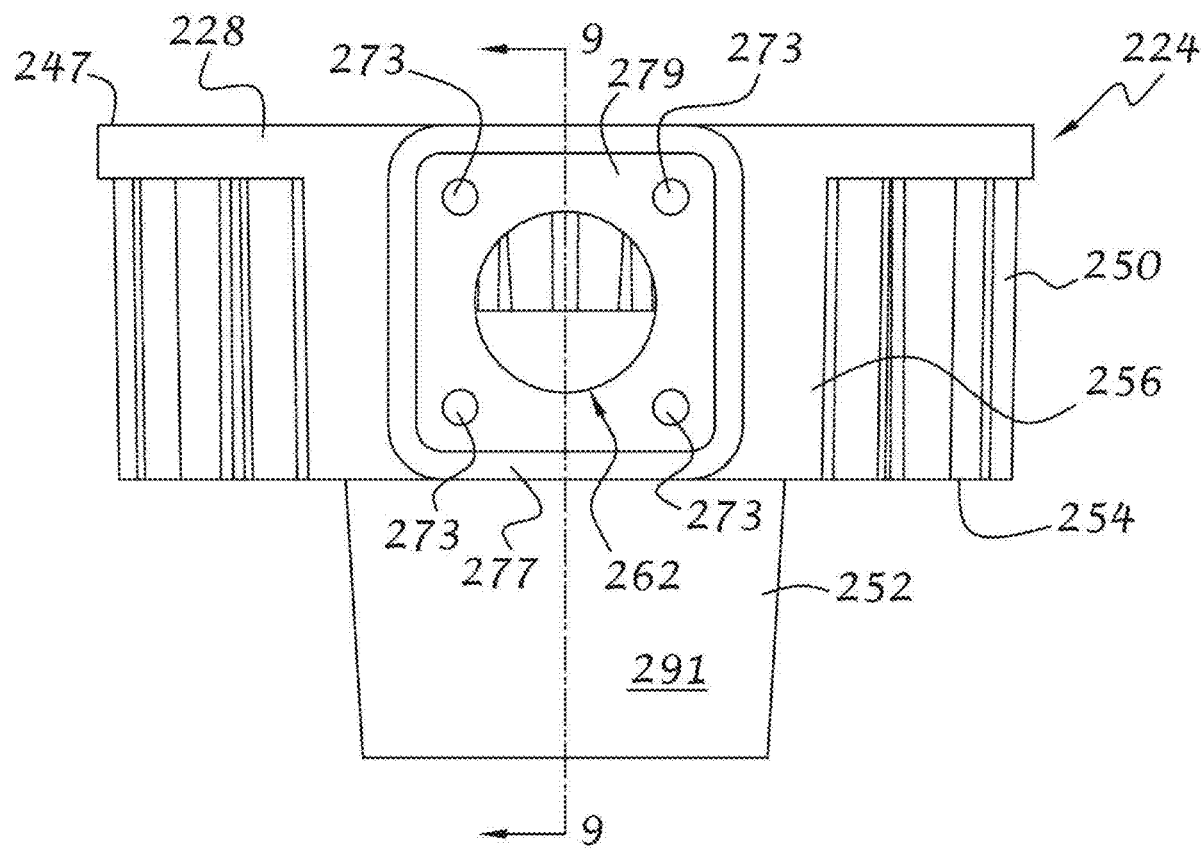

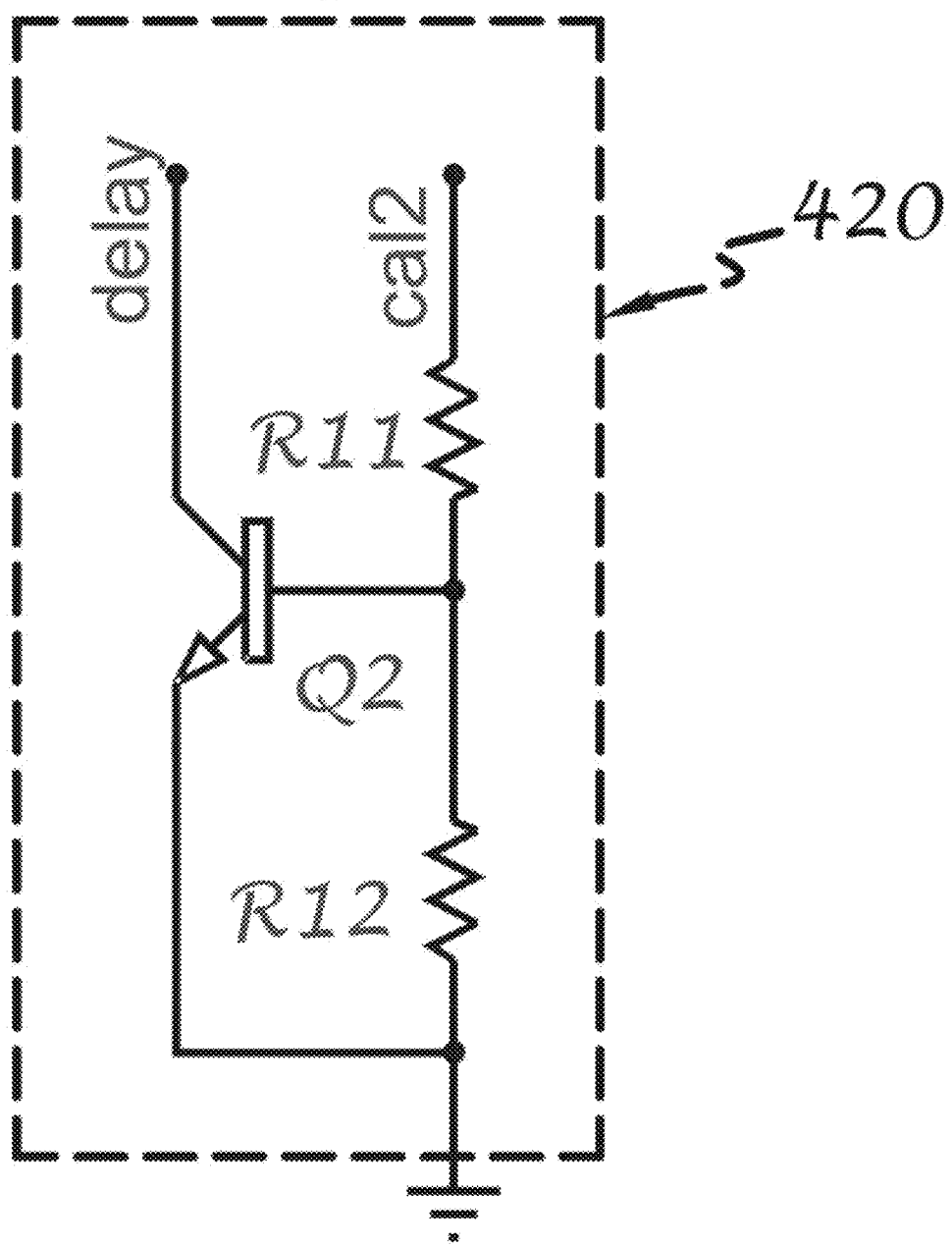

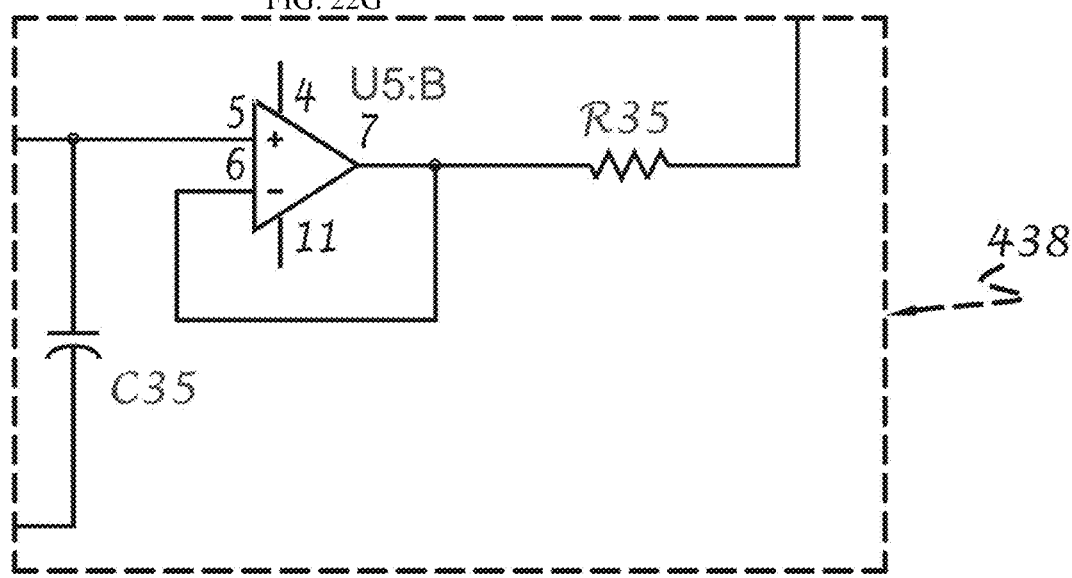

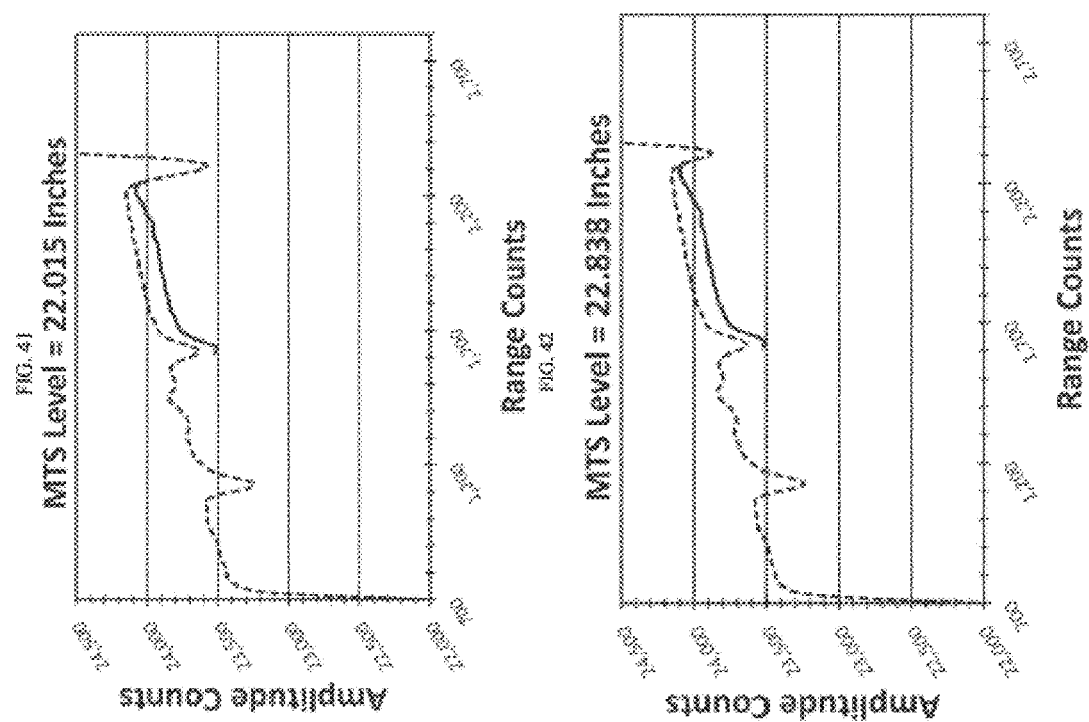

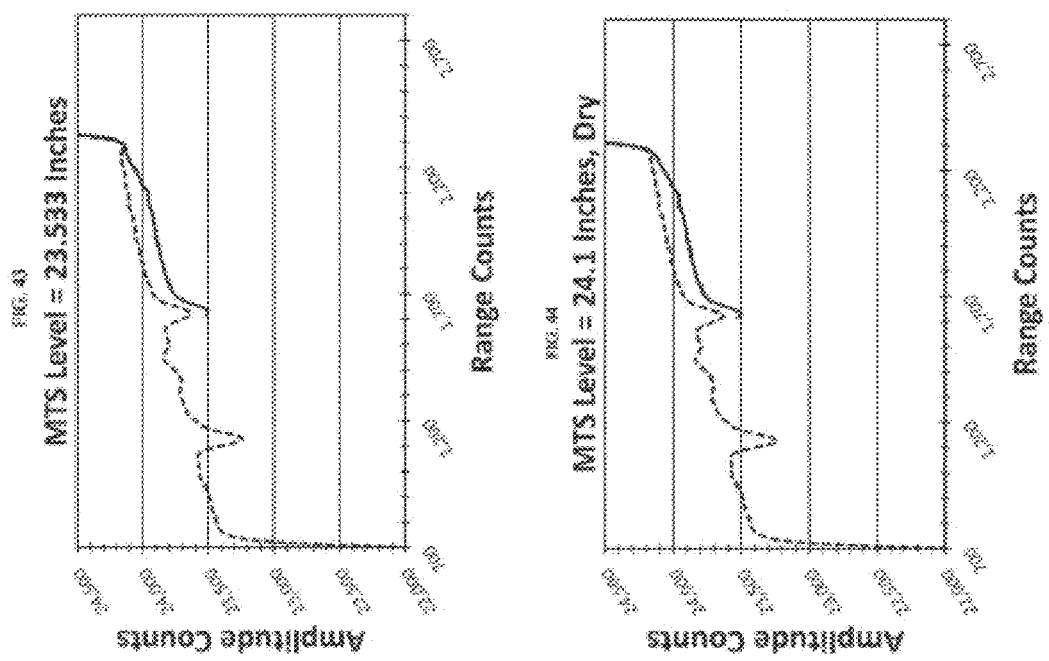

METHOD FOR GENERATING A TIME DELAY

PRIORITY TO PREVIOUS APPLICATIONS

This application is a divisional of U.S. application Ser. No. 16/173,933, and this specification is completely taken from that application, with no new material added.

BACKGROUND OF THE INVENTION

This invention relates generally to the measurement of one or more material properties, and more particularly to an apparatus and method using time domain reflectometry (TDR) for determining at least a level or height of a material within a container, or the position of one object with respect to another, and/or a dielectric constant, specific gravity, permittivity, or other property of the material of interest.

Prior art devices that employ time domain reflectometry (TDR) are typically very expensive and thus not feasible for low-cost devices required for certain products and markets that are cost-competitive. For example, known TDR sensors for determining liquid level within a container require high-cost high-precision electronic components, including high-precision temperature sensors, capacitors, resistors, and expensive microcontrollers with very high accuracy timers to determine liquid level with a relatively high degree of accuracy. Such TDR devices also employ expensive parts that interface with the measurement probe and the electronics, and can require more assembly and calibration time than desired, as well as the need for expensive calibration equipment during factory calibration, resulting in prohibitive costs that can rarely be justified except where the highest measurement accuracy is required.

It would therefore be desirous to provide a TDR measurement system that overcomes one or more of the disadvantages of prior art solutions. This can be done for example by implementing structures, systems, circuitry, and methods that eliminate or at least substantially reduce expensive interface parts, as well as high-cost high-precision electronic components.

SUMMARY OF THE INVENTION

In accordance with one aspect of the invention, a time domain reflectometry (TDR) measurement system for determining a position of a medium to be measured with respect thereto, includes a housing and an elongate measurement probe having a proximal end portion connected to the housing and a distal end portion. The elongate measurement probe includes: an outer elongate electrode connected to the housing and being generally cylindrical in shape with at least one inner conductive surface; an inner elongate electrode being generally cylindrical in shape and located coaxially within the outer elongate electrode. The inner elongate electrode comprises a first axially extending section having a first length with a first diameter and a first outer conductive surface that faces the at least one inner conductive surface; and a second axially extending section having a second length with a second diameter and a second outer conductive surface facing the at least one inner conductive surface, with the first diameter being smaller than the second diameter. A first inner space is located between the outer electrode and the first axially extending section of the inner electrode. A second inner space is located between the outer electrode and the second axially extending section of the inner electrode. A first spacer is located in the first inner space and has a first spacer bore for receiving the first axially extending section of the inner elongate electrode, the first spacer being constructed of a material with a first dielectric constant that, together with the smaller diameter of the first outer conductive surface and the at least one inner conductive surface, describe a first impedance. The second inner space together with the second outer conductive surface and the at least one inner conductive surface describe a second impedance in the absence of the medium to be measured and a third impedance when the medium occupies at least a portion of the second inner space. An electronics assembly includes a transmitter for transmitting an electromagnetic energy pulse along the elongate measurement probe and a receiver for receiving at least a return echo from the electromagnetic energy pulse upon encountering a change in the impedance with respect to the inner and outer electrodes to thereby determine the position of the medium located in the second inner space. In this manner, the first impedance at least approximates the second impedance in the absence of the material to be measured to thereby reduce or eliminate a return echo at an interface of the first spacer and the second inner space so that the material to be measured can be discerned in close proximity to the first spacer.

In accordance with another aspect of the invention, a TDR measurement system for determining a position of a medium to be measured with respect thereto includes a first electrode, a second electrode spaced from the first electrode to define a gap between them, with the gap being adapted to normally receive a first medium with a first dielectric constant to define a first impedance and a second medium with a second dielectric constant displacing the first medium to define a second impedance different from the first impedance. An electronics assembly is connected to the first and second electrodes; the electronics assembly includes a pulse generator for creating and transmitting an electromagnetic energy pulse for propagation along the first and second electrodes. The pulse generator has a first analog timing circuit for actuating a slow-rising function of voltage versus time, a second analog timing circuit operably associated with the first analog timing circuit for actuating a fast-rising function of voltage versus time, and a receive circuit electrically connected to the electrodes, the receive circuit being activated for receiving return echo data associated with the propagated electromagnetic pulse when the fast-rising function is equal to or greater than the slow-rising function to thereby collect the measurement data and determine the position of the second medium in the gap with respect to the electrodes.

Other aspects, objects and advantages of the invention will become apparent upon further study of the following description in conjunction with the attached drawings.

BRIEF DESCRIPTION OF THE DRAWINGS

The following detailed description of the preferred embodiments of the present invention will be best understood when considered in conjunction with the accompanying drawings, wherein like designations denote like elements throughout the drawing figures, and wherein:

FIG. 3A is an enlarged sectional view of an upper area of the elongate measurement probe and mounting head taken along line 3A-3A of FIG. 3, with an upper spacer thereof shown in different cross-hatching for demonstration of different materials that can be used and for clarity in numbering of the various elements.

FIG. 8 is an enlarged side elevational view of an exemplary housing of the TDR measurement system of FIG. 4 in accordance with the invention.

FIGS. 22A-22J are enlarged schematic diagrams of several of the modules of the electronic circuitry of FIG. 22.

FIGS. 33-44 are graphs similar to FIG. 28 showing valid intersections between measured data sets and processor-generated data sets for determining the level of diesel within a tank or other container in accordance with the invention.

Figure 1:
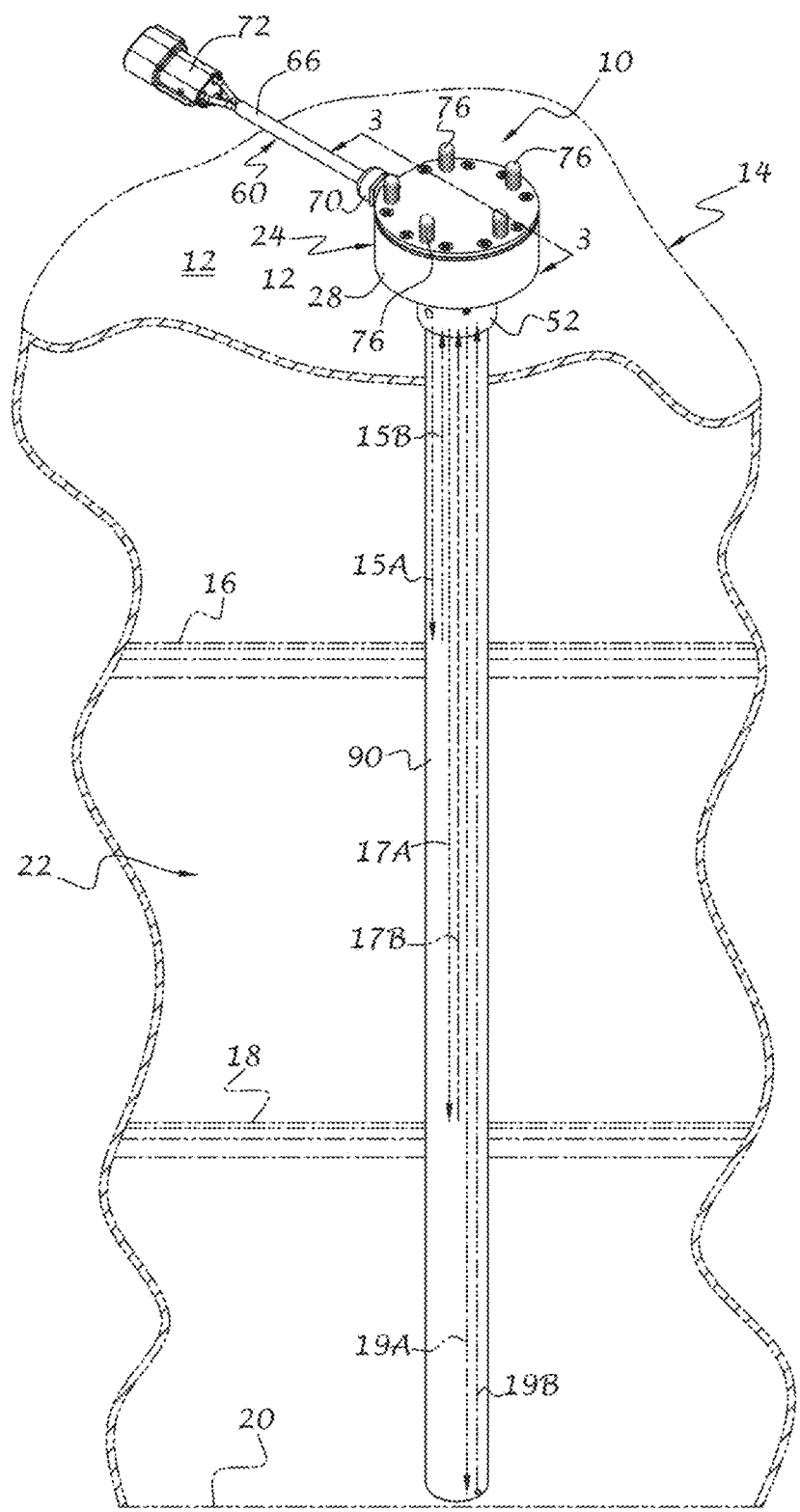
FIG. 1 is an isometric view of a time-domain-reflectometry (TDR) measurement system in accordance with the invention for measuring liquid level, linear position, as well as other material properties, the measurement system being mounted on a tank and showing for example various levels of material therein as represented by phantom line.

It is noted that the drawings are intended to depict only exemplary embodiments of the invention and therefore should not be considered as limiting the scope thereof. It is further noted that the drawings may not necessarily be to scale. The invention will now be described in greater detail with reference to the accompanying drawings.

DETAILED DESCRIPTION OF THE INVENTION

Referring now to the drawings, and to in particular, a time domain reflectometry (TDR) measurement system 10 in accordance with an exemplary embodiment of the invention is illustrated. The TDR measurement system 10 is shown schematically connected to the wall 12 of a tank or container 14 with various levels 16, 18, 20 of material 22 located therein, as represented by phantom line. The TDR measurement system 10 in accordance with one exemplary embodiment of the invention includes a mounting head 24 and an elongate measurement probe 26, which in accordance with one exemplary embodiment of the invention comprises a transmission line or probe with coaxial conductors that extend from the mounting head 24.

An electronics assembly 34 (FIG. 2) is located in the mounting head for propagating pulses of electromagnetic energy down the elongate measurement probe 26, as represented by arrows 15A, 17A, and 19A (FIG. 1), which serves as a portion of a waveguide in a guided wave radar (GWR) system, which directs pulsed electromagnetic energy radiation pulses more efficiently than radar measurement systems that propagate radar signals through air.

It will be understood that the term "pulse" as used herein refers to a distinguishable burst, ramp, wave, or other rapid change in electromagnetic energy, such as a change in amplitude or frequency of a signal imposed on a waveguide or transmission line of the TDR measurement system 10. The waveguide or transmission line comprises a calibration trace formed on a PCB and electrodes associated with the elongate measurement probe 26, as will be described in greater detail below.

For purposes of the present invention, the pulse can be in the form of a ramp-up of energy from a first value, such as a baseline value to a higher second value, with or without a ramp-down to the first value or other lower value. Likewise, the pulse can be in the form of a ramp-down of energy from a first value, such as a baseline value, to a lower second value, with or without a ramp-up to the first value or other higher value. Since the propagation of electromagnetic energy will occur at or near the speed of light when air is present between electrodes of the elongate measurement probe 26, and perhaps half of that velocity in the presence of materials to be measured (depending on the dielectric constants of the materials), in order to increase efficiency, allow the use of low-cost components, and simpler algorithms for control of the transmission and reception of the electromagnetic pulse, the wave or pulse of electromagnetic energy ramps up (or down) and does not return to the baseline value until the end of the elongate measurement probe 26 is reached in preparation for a new measurement cycle.

Accordingly, when an electromagnetic energy pulse, burst, ramp, etc. reaches an anomaly, i.e. a dielectric discontinuity in the probe 10 of sufficient difference to change the impedance of the probe at a particular location thereof, at least a portion of the electromagnetic energy pulse is reflected back along the waveguide to the electronics section as a return echo, as represented by arrows 15B, 17B, and 19C, respectively. Characteristics of the return echo depend largely on the type of anomaly, such as a difference between dielectric properties of two materials. Non-limiting examples would include: a) a vapor-to-liquid interface; b) an interface between two liquids with different densities; c) an interface between a fluid, such as air or liquid and a hard surface; d) the top of a plunger for distance measurement; or e) the bottom of the probe or other purposely placed feature.

The return echo is received, recorded and analyzed by the electronics assembly to ultimately determine the location along the probe 26 where one or more anomalies occurred or is occurring. The anomalous location can represent any discontinuity of materials; non-limiting examples include: a) the level of liquid in a tank or container; b) the position of a rod or plunger with respect to a stationary support; c) the interface between two liquids (including air or a vapor); d) the level of granular material within a storage silo; e) the location of predefined anomalies such as apertures, thinner or thicker areas; f) spacers or supports at certain positions within the elongate measurement probe 26; as well as g) anomalies that may occur at one or more locations in the elongate measurement probe 26, e.g., film build-up on the measurement surfaces, contaminant deposits, the location of foreign material within the probe 26, etc.

The speed or velocity at which the electromagnetic energy pulse travels through the liquid, solid or gaseous state of different materials can also be recorded and analyzed to determine other properties of the material being measured between the elongate electrodes, such as the dielectric constant, and so on. When the electromagnetic energy pulse or burst comprises a radar signal, the velocity at which the energy pulse travels through air approaches the speed of light. Depending on the dielectric constant of various materials, the velocity can be slowed to less than half the speed of light, more or less. Accordingly, a very fast clock pulse is needed.

The TDR measurement system 10 can be associated with stationary containers 14 at fixed locations, as well as with transportable containers associated with vehicles or the like for measuring one or more properties of the material located within the container. The TDR measurement system 10 can also be associated with linear transducers for measuring relative position or displacement between two objects. Materials to be measured can be in gaseous, liquid, or solid states. Although the present invention will be described in conjunction with measuring the level of liquid within a tank, linear transducers and the dielectric constant of liquids, it will be understood that the invention is not limited thereto, but may be used for measuring the heights of several different liquids with different densities within a single tank, the dielectric constants of such liquids, as well as the level, height, or other properties of any material that creates a measurable echo during operation of the TDR measurement system 10.

Figure 2:
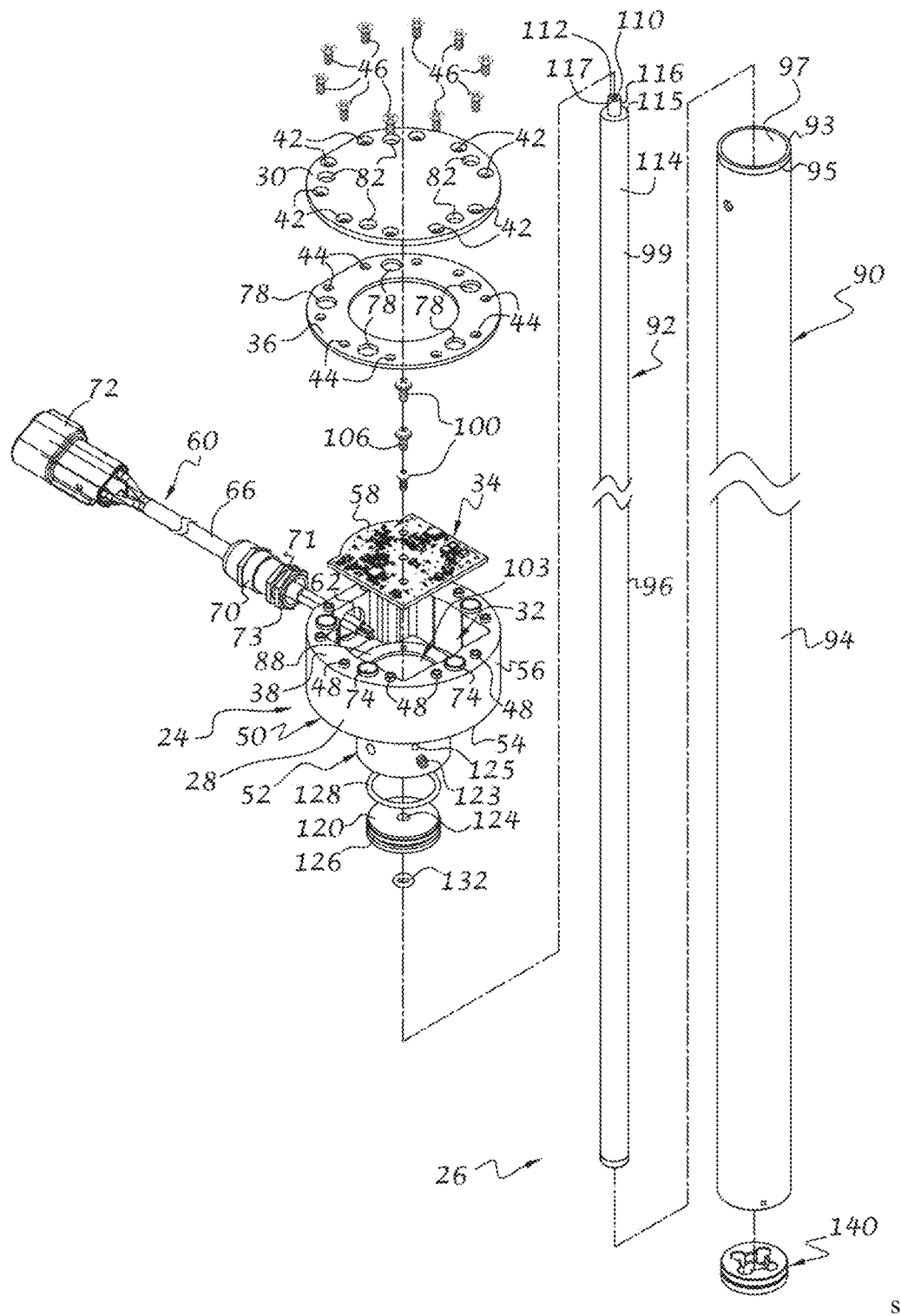
FIG. 2 is an isometric exploded view of the TDR measurement system including a mounting head and elongate measurement probe.
Figure 3:
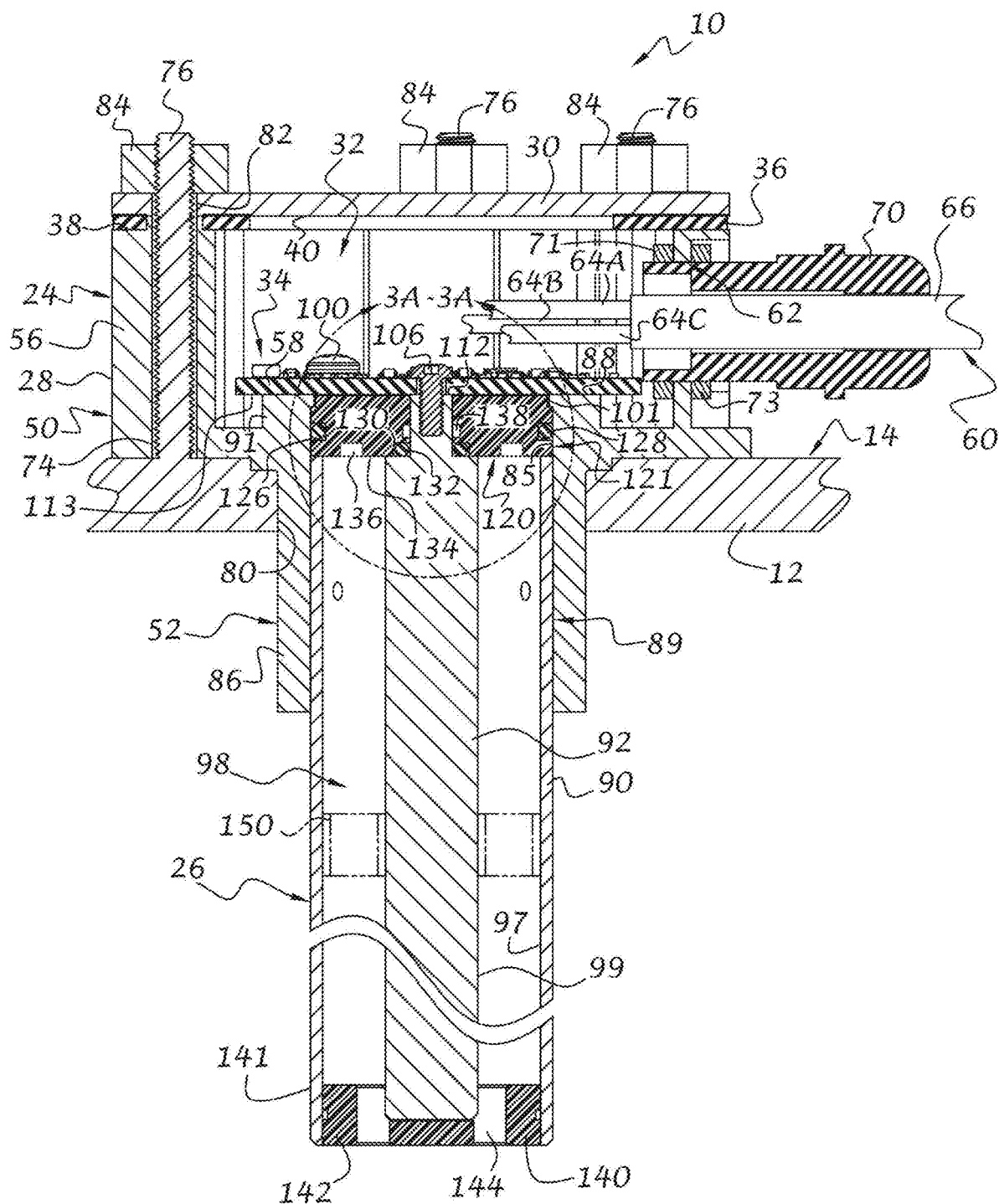
FIG. 3 is an enlarged longitudinal sectional view of the TDR measurement system taken along line 3-3 of FIG. 1.

With particular reference to FIGS. 1-3, the mounting head 24 preferably includes a housing 28 and a cover 30 connected to the housing for creating an interior space or volume 32. The housing 28 and cover 30 can be constructed of any suitable material; known suitable materials include metals, plastics, ceramics, composites, elastomers, and combinations thereof, but these elements are not limited to those materials; nor do they need to be made of the same material. In accordance with a preferred embodiment of the invention, the housing 28 comprises an electrically conductive material, such as aluminum or stainless steel, for electrically connecting to the elongate measurement probe 26. An electronics assembly 34 (FIG. 2) is located within the interior space 32. A gasket 36 is sandwiched between an upper surface 38 of the housing 28 and a lower surface 40 of the cover 30 to seal the interior space 32 from the outside environment. The gasket 36 is preferably annular in shape and ensures a proper seal between the housing 28 and the cover 30.

A plurality of apertures 42 extend through the cover 30 and a corresponding number of apertures 44 extend through the gasket 36 for receiving threaded fasteners 46. The fasteners in turn thread into apertures 48 formed in the upper surface 38 of the housing 28 to thereby seal the interior space 32 when the fasteners are tightened. Preferably, the threaded apertures 48 are formed outside of the interior space and located at spaced positions around the periphery of the interior space 32. It will be understood that the housing 28 and cover 30 can be connected via other connecting means, including but not limited to cooperating snap-fit engagement members on the housing and cover, press-fitting the housing and cover together, adhesive bonding, welding, mechanical fastening, and so on.

The housing 28 has a first mounting portion 50 located outside of the tank or container 14 and a second mounting portion 52 that extends from the first mounting portion and into the tank. The first and second mounting portions of the housing 28 are preferably integrally formed as a single unit during manufacturing. However, it will be understood that the mounting portions can be formed separately and connected together using well-known connecting means without departing from the spirit and scope of the invention.

The first mounting portion 50 is generally cylindrical in shape and includes the upper surface 38 for receiving the cover 30, a lower wall 54 adapted for contacting the wall 12 of a container 14 when connected thereto, and a continuous side wall 56 that extends between the upper surface 38 and lower wall 54. The interior space or volume 32 is formed in the upper surface 38 and bounded by the side wall 56 and lower wall 54.

As best shown in FIG. 2, the interior space is generally square-shaped or rectangular-shaped for receiving a printed circuit board (PCB) 58 of the electronics assembly 34. A wiring harness 60 is located in the interior space 32 and extends through an opening 62 formed in the side wall 56. The harness 60 includes three electrically conductive wires 64A, 64B, 64C (FIG. 3) insulated from each other and located within a sheath 66. The wires 64A, 64B, and 64C are in turn electrically connected to the PCB 58 through well-known connection means and extend outwardly from the first mounting portion 50 through the opening 62 in the side wall 56. A terminal 72, comprising a receptacle or plug, is connected to the wires 64A, 64B, and 64C via termination pins (not shown) in a well-known manner. The receptacle or plug 72 is adapted for connection to a mating plug or receptacle, respectively (not shown) associated with a vehicle, tank, system, or machine (not shown). One of the wires 64A, 64B, and 64C is electrically connected to a power supply 75 (FIG. 20), such as the power supply of a vehicle, external battery, line power, and so on, for example, for providing electrical power to the electronics assembly 34 (FIG. 2) and related components. Likewise, another of the wires is electrically connected to ground on the PCB 58 or other grounded component of the measurement system or vehicle, system or machine associated therewith. Another of the wires is electrically connected to a microcomputer 83 (FIG. 20), processing circuitry, or the like, associated with the electronics assembly 34, for providing signals to a remote location indicative of one or more measured properties of the material being measured by the elongate measurement probe 26, as determined by the electronics assembly 34.

The transmission of signals related to the measured properties can be via the receptacle or plug 72 and wiring harness 60 to a hard-wired display 77 (FIG. 20) associated with the TDR measurement system, vehicle, machine, system, etc. Signals can also, or alternatively, be sent wirelessly via a radio-frequency (RF) transceiver 79 (FIG. 20) to an independent external display 81 (FIG. 21) associated with a vehicle, machine, system, a portable device such as a smartphone, tablet, computer, and so on, in a well-known manner. The signals can be indicative of one or more conditions inside the tank or container 14 (FIG. 1), e.g., liquid level, material level, specific gravity, liquid or material type, vapor space, temperature, pressure, density, or ambient conditions outside of the tank, e.g., temperature, humidity, atmospheric pressure, and vehicle tilt.

Although discussion of the present invention is predominantly related to liquid level measurement within a tank and associated properties, it will be understood that any gas, vapor, liquid or material property that can be measured or otherwise determined using the system and method of the present invention falls within the spirit and scope of the invention.

Moreover, although three electrical wires are schematically shown for providing power, ground, and signal, it will be understood that the TDR measurement system 10 can comprise more or fewer electrical wires or conductors depending on the information transmitted and the remote device, machine, or system that receives and displays the material information.

A grommet 70 or the like is mounted in the opening 62 with the cable 60 extending therethrough. The grommet 70 presses against both the opening 62 and the cable 60 to both seal the interior space 32 and provide strain relief for the cable 60. Opposing nuts 71 and 73 are threaded onto the grommet 70 on either side of the side wall 56 for securing the grommet 70 to the first mounting portion 50.

A plurality of mounting holes 74 (FIG. 2) extend through the first mounting portion 50 from the lower wall 54 to the upper surface 38. The mounting holes 74 are larger than the apertures 48 previously described, and are also located at spaced positions around the periphery of the interior space 32 for receiving mounting studs 76. The mounting studs 76 are typically mounted on the wall 12 of the tank 14 and surround an opening 80 (FIG. 3) formed in the tank wall 12 through which the second mounting portion 52 extends. Mounting holes 78 are formed in the gasket 36 and correspond in size and position to the mounting holes 74. Likewise, corresponding mounting holes 82 are formed in the cover 30. When the TDR measurement system 10 is mounted to a tank 14 or the like, the mounting holes 74, 78, and 82 of the mounting head 24 are aligned with the studs 76 of the tank. The mounting head of the TDR measurement system 10 is then pressed or fitted onto the studs 76 until the lower surface 54 of the first mounting portion 50 is adjacent the tank wall 14 and the second mounting portion 52 is located in the tank opening 80 and extends into the tank. In this position, the studs 76 protrude outwardly from the cover 30. Nuts 84 (FIG. 3) or the like can then be threaded onto the studs 76 to secure the TDR measurement system 10 to the tank wall.

It will be understood that the means for mounting the TDR measurement system 10 to a container or the like is given by way of example only, and can vary without departing from the spirit and scope of the invention. For example, the tank may be provided with threaded openings for receiving bolts or other fasteners that extend the opposite direction through the mounting openings of the mounting head 24. In addition, many tanks have either a straight threaded opening or NPT threaded opening for receiving a liquid level transducer or the like. The type of threaded opening depends on the material, or liquid stored in the tank, and in order to accommodate such arrangements, corresponding threads (not shown) can be provided on the first mounting portion 50 and/or the second mounting portion 52 or other portion of the TDR measurement system 10 for mating with the threaded tank opening (not shown). Other known means for connecting the measurement system to a tank, container, wall, or the like can also be used without departing from the spirit and scope of the invention.

With particular reference to FIGS. 2 and 3, the second mounting portion 52 of the housing 28 is generally cylindrical in shape and includes a continuous annular side wall 86 with a first wall section 87 that extends from the lower wall 54 of the mounting head and through the opening 80 formed in the wall 12 of the tank 14. The first wall section 87 forms a generally cylindrical inner space or volume 89 (FIG. 3) bordered by an inner surface 85 for receiving the elongate measurement probe 26. The housing 28, and thus the inner surface 85, is preferably electrically conductive so that the second mounting portion 52 of the housing 28 becomes a longitudinal extension of the elongate measurement probe 26. The annular side wall 86 also includes an upper extension 91 (FIG. 3) that extends into the interior space 32 above the lower wall 54 and has an upper annular surface 88 for supporting the PCB 58 of the electronics assembly 34. The surface 88 is also preferably constructed of an electrically conductive material to form an electrical connection between the housing 28 and the PCB 58, and thus an electrical connection between the PCB 58 and an elongate outer electrode 90 of the measurement probe 26 via the housing 28. An opening 103 (FIG. 3A) is located centrally in the upper extension 91 of the annular side wall 86 and is circumscribed by a circular inner ledge 101 (best shown in FIG. 3A) formed in the upper extension 91. The opening 103 communicates with a first annular space or volume 121 between the inner and outer electrodes, and the inner space 89 of the first wall section 87.

The elongate measurement probe 26, in accordance with an exemplary embodiment of the invention, comprises a coaxial transmission line having the first, or outer, elongate electrode 90 and a second, or inner, elongate electrode 92 spaced from, and coaxial with, the outer elongate electrode 90. As shown, the outer elongate electrode 90 comprises an outer hollow electrically conductive cylinder or tube 94. The inner elongate electrode 92 comprises an inner solid electrically conductive rod 96 that extends coaxially inside the outer elongate electrode 90 to form a coaxial-style transmission line for the elongate measurement probe 26. The coaxial transmission line can be used for measuring the impedance of whatever may be located in an annular inner measurement space or volume 98 (FIG. 3) formed between the inner conductive surface 97 of the outer elongate electrode 90 and the outer conductive surface 99 of the inner elongate electrode 92.

Although the elongate measurement probe 26 is described herein as a coaxial conductor or transmission line, it will be understood that the electrodes can be of any suitable shape or size and spaced at any suitable distance so long as one or more properties or conditions of liquid or other material or medium located in a space between the electrodes can be measured or determined utilizing the system and methods of the present invention. Depending on the type of liquid or other medium being measured, a thin, insulative coating can be applied to one or both electrodes to both protect the electrodes from corrosion and finely adjust the nominal impedance value (NIV) by adjusting the thickness of the insulative coating, the surface area, and the distance between the outer and inner electrodes.

The outer elongate electrode 90 is received and secured in the annular side wall 86 by press-fitting as one preferred method of assembly. To that end, the outer elongate electrode 90 can include a knurled section 95 or the like formed at or near an upper edge or face 93 of the outer elongate electrode 90 for biting into the inner conductive surface 85 of the annular side wall 86 during assembly, so that the side wall 86 becomes an extension of the outer elongate electrode 90.

However, it will be understood that the outer elongate electrode can be connected to the housing 28 through other well-known connection means, such as mechanical fastening as shown in FIG. 2 for example, where a threaded fastener 123 engages a threaded opening 125 formed in the second mounting portion 52 of the mounting head 24 for engaging the surface 95 of the outer elongate electrode 90 to hold the elongate electrode 90 in the second mounting portion 52 through frictional engagement with the fastener. Other means for connecting the outer electrode 90 to the housing 28 can include, but is not limited to, welding, adhesive bonding, clamping, snap-fit engagement, threading, heat-shrinking, and so on. In accordance with a further embodiment of the invention, the outer elongate electrode 90 can be integrally formed with the annular side wall 86.

No matter what connection means is used, the outer elongate electrode 90 is preferably in electrical contact with the inner conductive surface 85 of the annular side wall 86, which is in turn electrically connected to ground associated with the PCB 58 and/or the wall 14 of the tank 12 or other grounding location associated with the TDR measurement system 10, the tank 12, and/or the machine or system associated with the tank. It will be understood that electrical ground of the TDR measurement system 10 can be electrically connected to, or isolated from, the electrical ground of the tank and/or machine or system associated with the tank without departing from the spirit and scope of the invention.

Figure 18A:
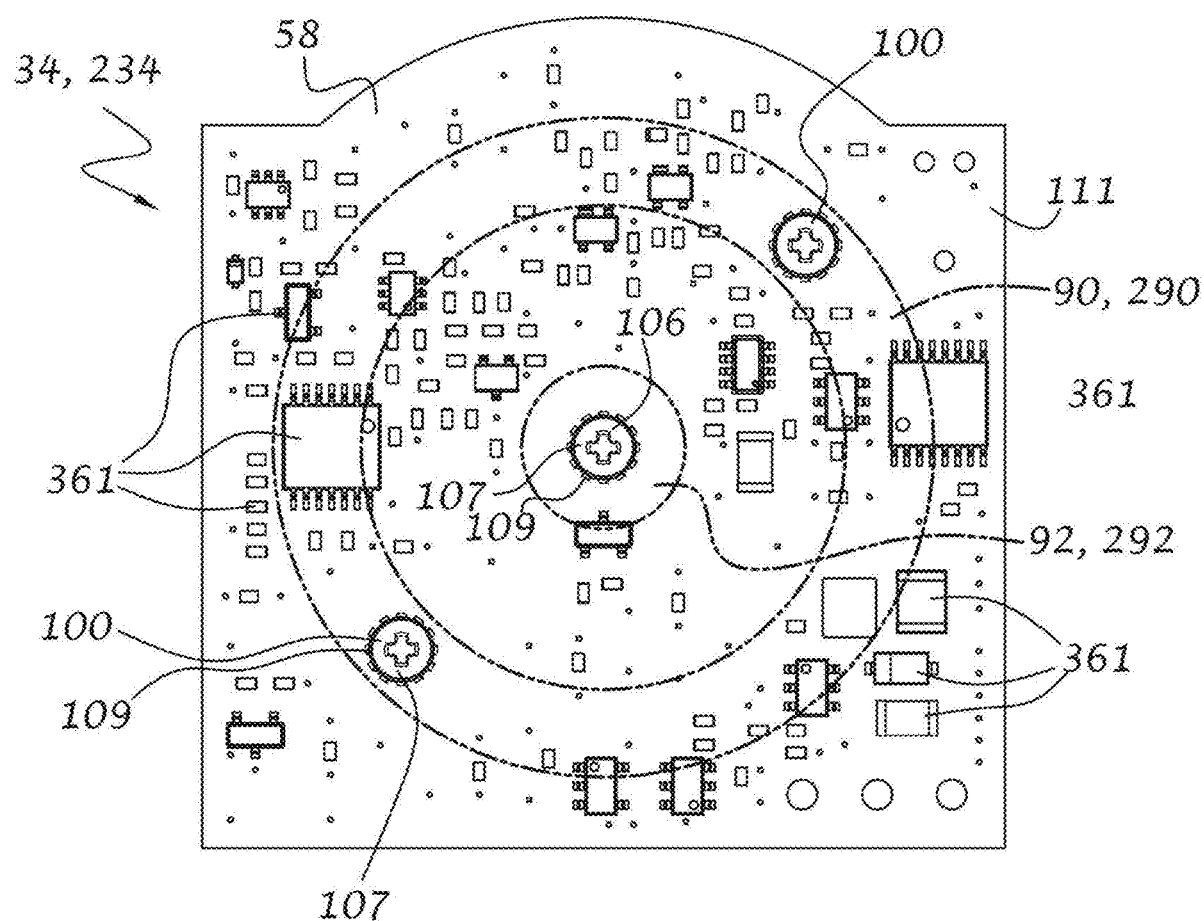
FIG. 18A is a top plan view of an electronics assembly having a printed circuit board (PCB) in accordance with an exemplary embodiment of the invention and showing exemplary electronic components connected to the PCB and an exemplary connection means for electrically and mechanically connecting the PCB to the elongate measurement probe of the TDR measurement system.
Figure 18B:
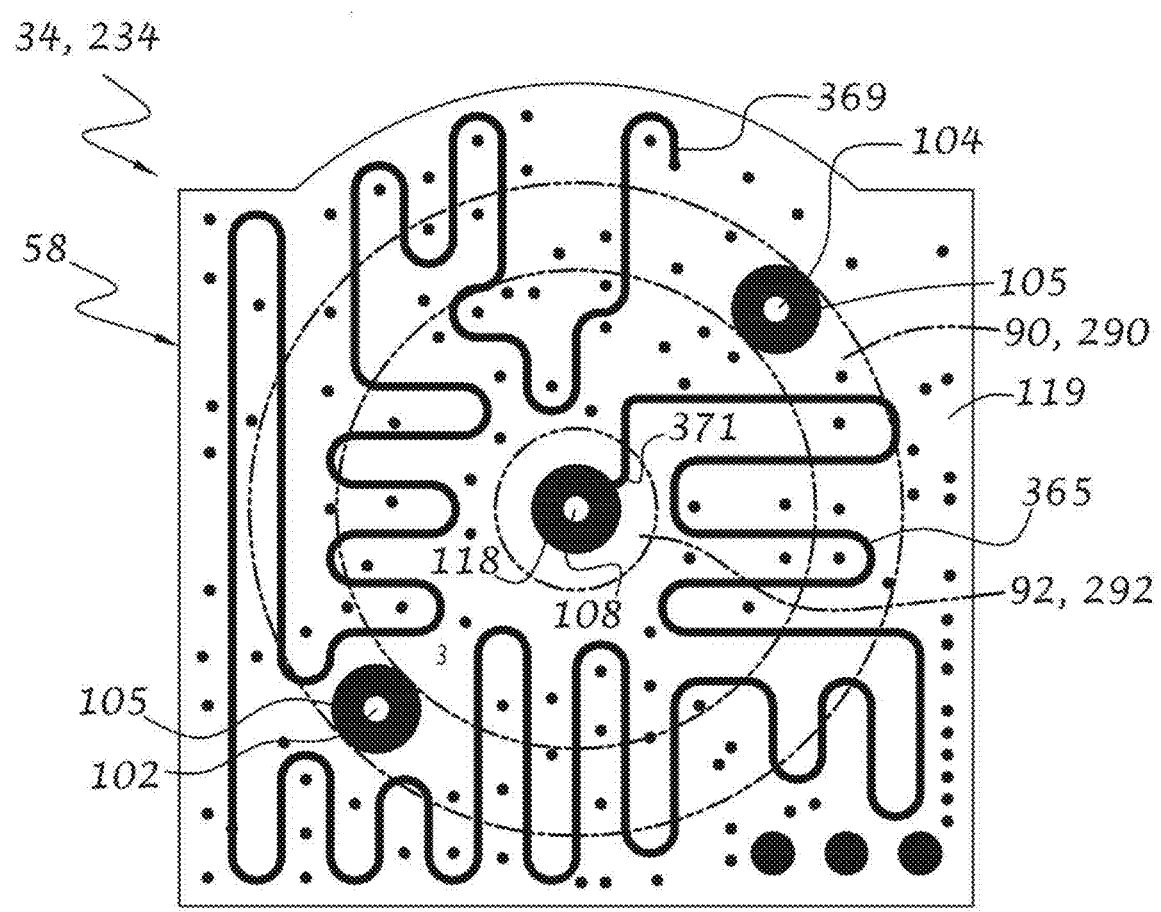
FIG. 18B is a top plan view of one of the layers of the PCB in accordance with an exemplary embodiment of the invention showing a PCB calibration trace portion of a transmission line and various other features.

As shown in FIGS. 3, 18A and 18B, the PCB 58 is multi-layered in the current embodiment and includes an upper surface 111 (FIG. 3), a lower surface 113, and at least one intermediate surface 119 located between the upper and lower surfaces, with first and second conducting openings or thru-holes 102 and 104, respectively (FIG. 18) extending through the thickness of the PCB 58 between the upper and lower surfaces thereof. The PCB 58 is mechanically and electrically connected to the annular side wall 86 by a pair of fasteners, such as self-locking screws 100 (FIG. 18A), that extend through the first and second conductive openings or thru-holes 102, 104 (FIG. 18B) of the PCB 58 and thread into threaded openings (not shown) formed in the upper annular surface 88 of the annular side wall 86 (shown in phantom line in FIG. 18A). A circular trace 105 can be formed on the PCB 58 for surrounding each conductive opening 102, 104 for electrical contact with either a head 107 of the fasteners 100 or a self-locking washer 109 associated with the fasteners. In this manner, the PCB is both mechanically and electrically connected to the annular side wall 86 of the housing 28. The inner conductive surface 85 of the side wall 86 is in turn mechanically and electrically connected to the outer elongate electrode 90, preferably through press-fitting, so that the PCB 58 is electrically connected to the outer electrode 90 via the annular side wall 86.

Preferably, the outer elongate electrode 90 is connected to ground on the PCB 58 via the annular side wall 86. Although it is preferred that the mounting head be constructed of electrically conductive material, such as stainless steel, aluminum, and the like, it will be understood that the mounting head can be constructed of electrically insulating material and provided with conductive surfaces through well-known surface treatment techniques, without departing from the spirit and scope of the invention. It will be further understood that the mounting head can be completely non-conductive, and the measurement probe can be electrically connected to the electronics assembly 34 without the mounting head acting as an intermediate conductor between the measurement probe and the PCB 58.

The inner elongate electrode 92 is mechanically and electrically connected to the PCB 58 via a self-locking screw 106 (FIG. 18A) that extends through a third conductive opening or thru-hole 108 (FIGS. 3A, 18B) of the PCB 58 and threads into a threaded opening 110 (FIG. 3A) formed in a top surface 112 (FIGS. 2, 3A) of the inner elongate electrode 92 (shown in phantom line in FIG. 18A). The upper end 114 of the inner elongate electrode 92 has a step 115 (FIGS. 2, 3A) that defines a reduced section 116 with an outer conductive surface 117 that is also cylindrical in shape to ensure that the impedance as measured between the inner and outer elongate electrodes remains substantially the same with the addition of an upper spacer 120 (FIG. 3), thereby eliminating or at least minimizing a return echo from electrical electromagnetic energy pulses transmitted along the coaxial measurement probe. With this construction, the TDR measurement system is not subjected to large return echo signals at the interface between the PCB and the elongate electrodes, and is therefore capable of measuring levels or heights of liquids or other materials in close proximity to the upper spacer 120 so long as the return echo associated with the top surface of the liquid or other material is greater than any return echo that may be generated at the interface, thereby increasing the measurement range and accuracy of the actual level or height of material in the elongate measurement probe.

Preferably, the third conductive opening 108 (FIG. 18B) is centered between the first and second conductive openings 102 and 104, respectively, to ensure that the inner elongate electrode 92 is coaxial with the outer elongate electrode 90. The PCB openings 102, 104 are preferably connected to electrical ground of the PCB while the PCB opening 108 is connected to other electronics and electronic circuitry for sending electromagnetic energy pulses down the inner elongate electrode 92 and receiving data reflective of the electromagnetic energy pulse at predetermined locations along the length of the elongate measurement probe via the outer elongate electrode 90 or vice-versa, including return echoes due to one or more anomalies along the PCB and/or measurement probe that causes a measurable change in impedance, such as the interface between two or more materials having different dielectric constants, such as air and liquid within the measurement probe, the interface between two liquids, a probe marker signifying the beginning and/or end of the elongate measurement probe, calibration markers, and so on.

A first upper spacer 120 is annular in shape and located in a first inner annular space or volume 121 located between the outer conductive surface 117 of the inner electrode 92 and the inner conductive surface 85 of the annular side wall 86 of the housing 28, and between the upper edge or face 93 of the outer elongate electrode 90 and the lower surface 113 (FIG. 3A) of the PCB 58. The upper spacer 120 is sandwiched between the upper edge or face 93 (FIG. 2) of the outer elongate electrode 90 and the ledge or flange 101 that extends radially inwardly from the inner surface 85 (FIG. 3). The upper spacer 120 also includes a portion that extends beyond the flange 101 so that the upper spacer abuts, or is in close proximity to, the PCB 58 to minimize changes in impedance during operation.

Although not shown, a resilient layer can be provided between the PCB 58 and the upper spacer 120 to ensure a snug fit of the upper spacer within the first inner annular space 121 while accommodating manufacturing tolerances. As with the first upper spacer 120, the resilient layer can have features and/or be constructed of one or more materials with one or more dielectric constants and features that are intended to minimize any changes in impedance during operation.

A central bore 124 extends through the upper spacer 120 for receiving the reduced cylindrical section 116 of the inner elongate electrode 92. The upper spacer 120 also includes an outer annular groove 126 formed in an outer side surface 127 for receiving an outer O-ring or seal 128 to seal the upper spacer 120 against the inner surface 85 of the annular side wall 86. An inner annular groove 130 (FIG. 3) is formed in a lower surface 134 of the upper spacer 120 and intersects with the central bore 124 for receiving an inner O-ring or seal 132 to thereby seal the upper spacer 120 against the reduced section 116 of the inner elongate electrode 92.

The upper spacer 120 can include other features, such as a bottom annular groove 136 (FIG. 3) formed in the lower surface 134 of the upper spacer, and a second inner annular groove 138 formed within the upper spacer and intersecting the bore 124, to minimize or eliminate a measurable change in the impedance, due to the outer O-ring 128, as the electrical electromagnetic energy pulse transitions between the electronics assembly and the upper spacer 120, and between the upper spacer 120 and the second annular space or gap 98 (FIG. 3) formed between the inner conductive surface 97 of the outer elongate electrode 90 and the outer conductive surface 99 of the inner elongate electrode 92. The annular gap, in the absence of liquid or other material being measured, is normally filled with air or other material(s) in the gaseous phase. For a liquid level transducer, material above the liquid can be in a gaseous state, for example, when a single liquid level is being measured. In addition, the material above the liquid can be in a liquid state for measuring the level of two or more immiscible liquids. As an example, it may be desirable to measure the level of both diesel fuel and water that may be located in a fuel tank. Likewise, it is within the purview of the invention to measure the level or height of materials having different dielectric constants, as well as measuring the dielectric constants of known or unknown materials based on the velocity of the electrical electromagnetic energy pulse traveling through the material(s) being measured.

The default reference material and phase of that material between the elongate electrodes will largely determine the nominal impedance value (NIV) of the elongate measurement probe that is used as a reference at any particular location along the probe length absent any anomalies that may occur to change that value, such as the presence of liquids, solids, powders, and so on. Accordingly, the upper spacer 120 is preferably formed with various features, along with the reduced cylindrical section 116 and O-ring material, to thereby ensure that the NIV of the upper spacer 120 and related features approximates the NIV of the measurement probe in the absence of measurable materials and material states, to thereby substantially reduce or eliminate any return echo from such an anomaly, and allow the measurement of liquid or material height in close proximity to the upper spacer 120.

In accordance with one aspect of the invention, the NIV can range between above 0 (zero) Ohms and below 377 Ohms for the elongate measurement probe 26 coaxial transmission line. The upper limit is the impedance of free space, and therefore it is expected that the TDR measurement system 10 of the invention would operate below that level. However, in order to facilitate development, testing, and calibration of the TDR measurement system 10, an NIV of 50 Ohms has been selected by way of example and practicality, since this value is the standard transmission line impedance for RF devices as well as the testing equipment for such devices. Since the majority of RF test equipment employs a nominal impedance of 50 Ohms, the test equipment can be directly connected to the electronics assembly of the TDR measurement system without the need for impedance transformation adaptors during development, testing, and calibration.

With an NIV of 50 Ohms, the upper spacer 120 is preferably constructed of one or more materials that approximate(s) the impedance of air (or other material within the space between the electrodes). When it is anticipated that air will normally be located within the space 98 between the elongate electrodes, a suitable acetal resin, such as polyoxymethylene or acetal homopolymers, sold under the trade name Delrin™ by DuPont, for example, can be used along with the various features described above to ensure that the average NIV is sufficiently constant, to minimize and/or eliminate any echoes that may occur along the length or height of the upper spacer 120.

It will be understood that the upper spacer 120 can be constructed of other materials or a combination of materials without departing from the spirit and scope of the invention, so long as any echo caused by the upper spacer 120 is sufficiently small to ensure that echoes caused by different materials being measured between the electrodes can be recognized, even in close proximity to the upper spacer. By way of example, when it is desirous to measure liquid level within a tank or container, the use of a material for the upper spacer 120 that minimizes or eliminates a return echo caused by the upper spacer and any components, such as the O-rings, connected to the upper spacer, ensures that a return echo caused by an upper surface of the liquid proximal to the upper spacer 120 can be recognized. In this manner, the total probe length or height for measuring liquid level is maximized, while manufacturing costs are significantly reduced over prior art solutions.

Although the preferred embodiment of the upper spacer 120 substantially reduces or eliminates a return echo so that further return echoes are not rejected or overpowered by a return echo at the upper end of the measurement probe 26, in some applications, it may be desirable to create an anomaly, such as a change in impedance caused by a change in material construction at or along the upper spacer 120 that will in turn generate a return echo having a repeatable signature, when it is desirous, for example, to calibrate a distance between the PCB-inner electrode transition and a point along the length of the upper spacer, or locate the bottom of the upper spacer or any other axial position along the upper spacer for calibration of the measurement system, marking a particular point along the elongate measurement probe, and so on.

It will be further understood that a particular NIV or range of NIV's can be used without departing from the spirit and scope of the invention. For example, the use of 33 Ohms as the nominal impedance value of the elongate measurement probe 26 allows the greatest power handling capability, while the use of 75 Ohms as the nominal impedance value results in the least amount of signal loss. Accordingly, the particular nominal impedance value can greatly vary without departing from the spirit and scope of the invention.

As shown in FIG. 3, a second, or lower, spacer 140 is located in the second inner annular space 98 of the elongate measurement probe 26 at a lower end 141 thereof between the inner surface 97 of the outer electrode 90 and the outer surface 99 of the inner electrode 92. In accordance with one embodiment of the invention, the lower spacer 140 is constructed of a conductive or semi-conductive material and configured to create a short across the inner and outer electrodes to thereby produce a large anomaly and thus a return echo with a large negative slope during operation to signify the end of the measurable length of the probe 26.

In accordance with another embodiment of the invention, the lower spacer 140 is constructed of an insulative material and configured to isolate the inner and outer electrodes, to thereby produce a large anomaly and thus a return echo with a large positive slope during operation to signify the end of the probe.

In accordance with yet a further embodiment of the invention, the lower spacer 140 is constructed of a material similar to the upper spacer and configured to minimize or eliminate any anomalies and thus minimize or eliminate the creation of any return echo that might signify the end of the measurement probe. In accordance with another embodiment of the invention, the lower spacer 140 is constructed of a semi-conductive material and configuration to create a small anomaly and thus a small return echo with a small positive or negative return echo to signify the end of the measurement probe. With this last embodiment, measurement of liquid or material level in close proximity to the lower end of the measurement probe can be realized without interference from a larger end-of-probe return echo.

The lower spacer 140 includes an annular body 142 with an annular opening 144 that extends axially through the annular body so liquid or other material from a container 14 (FIG. 1) can enter the second inner annular space 98 for monitoring liquid level and/or other properties by the TDR measurement system 10. Apertures 146 (FIG. 3) located at the upper end of the measurement probe extend through the outer elongate electrode 90 and the annular wall 86 to allow air or other material in the gaseous phase within the second inner annular space 98 to vent into the container 14 as fluid fills the inner annular space through the opening 144.

It will be understood that the lower spacer 140 can be configured many different ways to accommodate a particular material to be measured, a desired return echo profile or elimination of a return echo at the lower end of the measurement probe. It will be further understood that the lower spacer 140 can be eliminated without departing from the spirit and scope of the invention, so long as the inner and outer electrodes are adequately supported.

To that end, as shown in phantom line in FIG. 3, one or more intermediate spacers 150 can be positioned at different locations along the second inner annular space or volume 98 of the measurement probe 26 to add support to the inner and outer electrodes. In accordance with one embodiment of the invention, each intermediate spacer 150 provides a predetermined impedance value different from the impedance value when the electrodes are in air or liquid. Since the different impedance value will result in an echo of a predetermined profile (depending on the material being measured in the inner annular space 98), this can be used to further calibrate the probe since the echo will occur at the known installed location of the intermediate spacer 150, thereby ensuring that the probe is always calibrated during operation. Each intermediate spacer 150, in accordance with a further embodiment of the invention, is arranged so that the impedance across the annular space does not significantly change to thereby minimize or eliminate any echoes that may occur because of the intermediate spacer 150.

Figure 4:
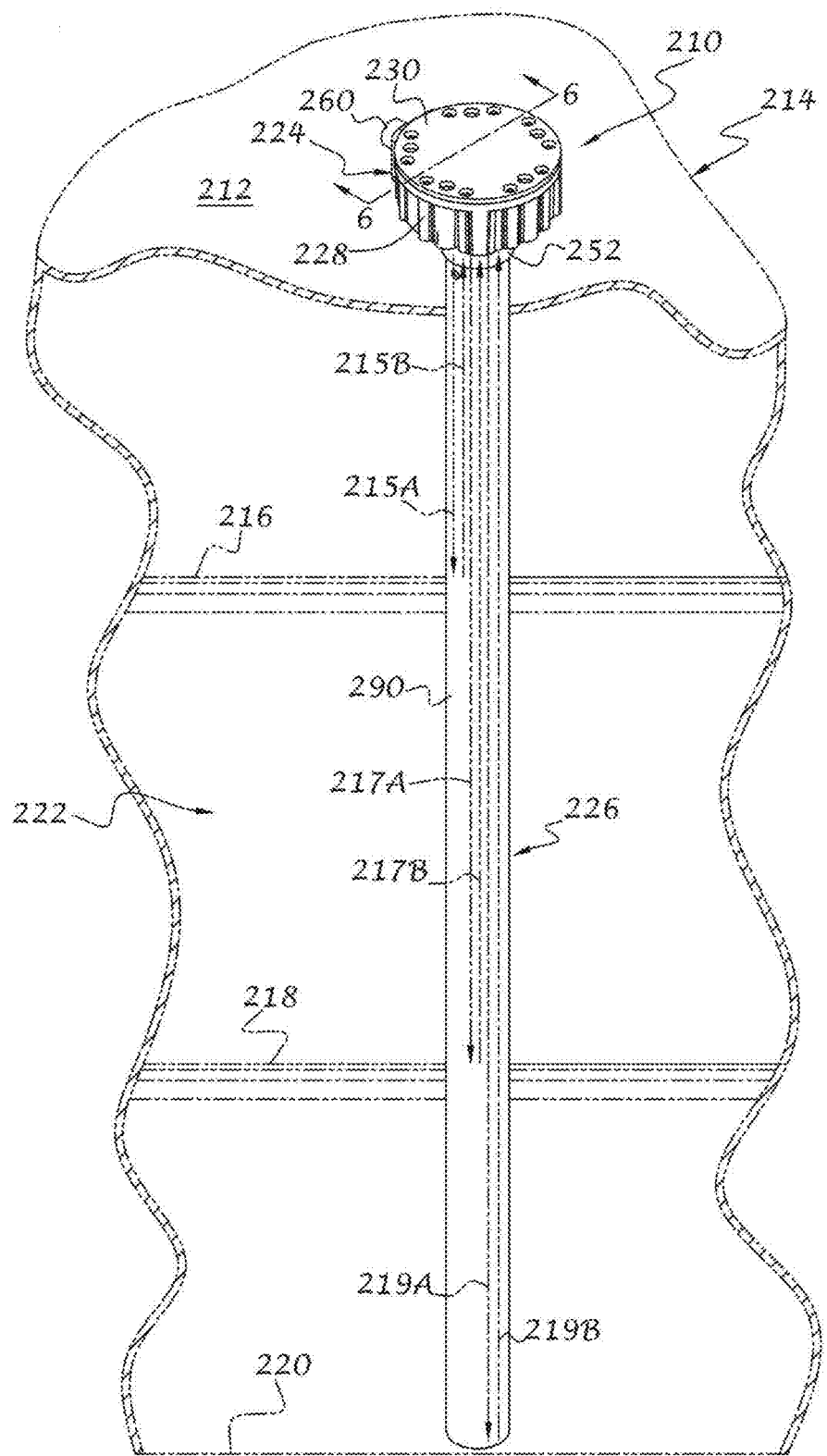
FIG. 4 is an isometric view of a time-domain-reflectometry (TDR) measurement system with a mounting head and elongate measurement probe in accordance with a further embodiment of the invention mounted on a tank having various levels of material therein as represented by phantom line.
Figure 5:
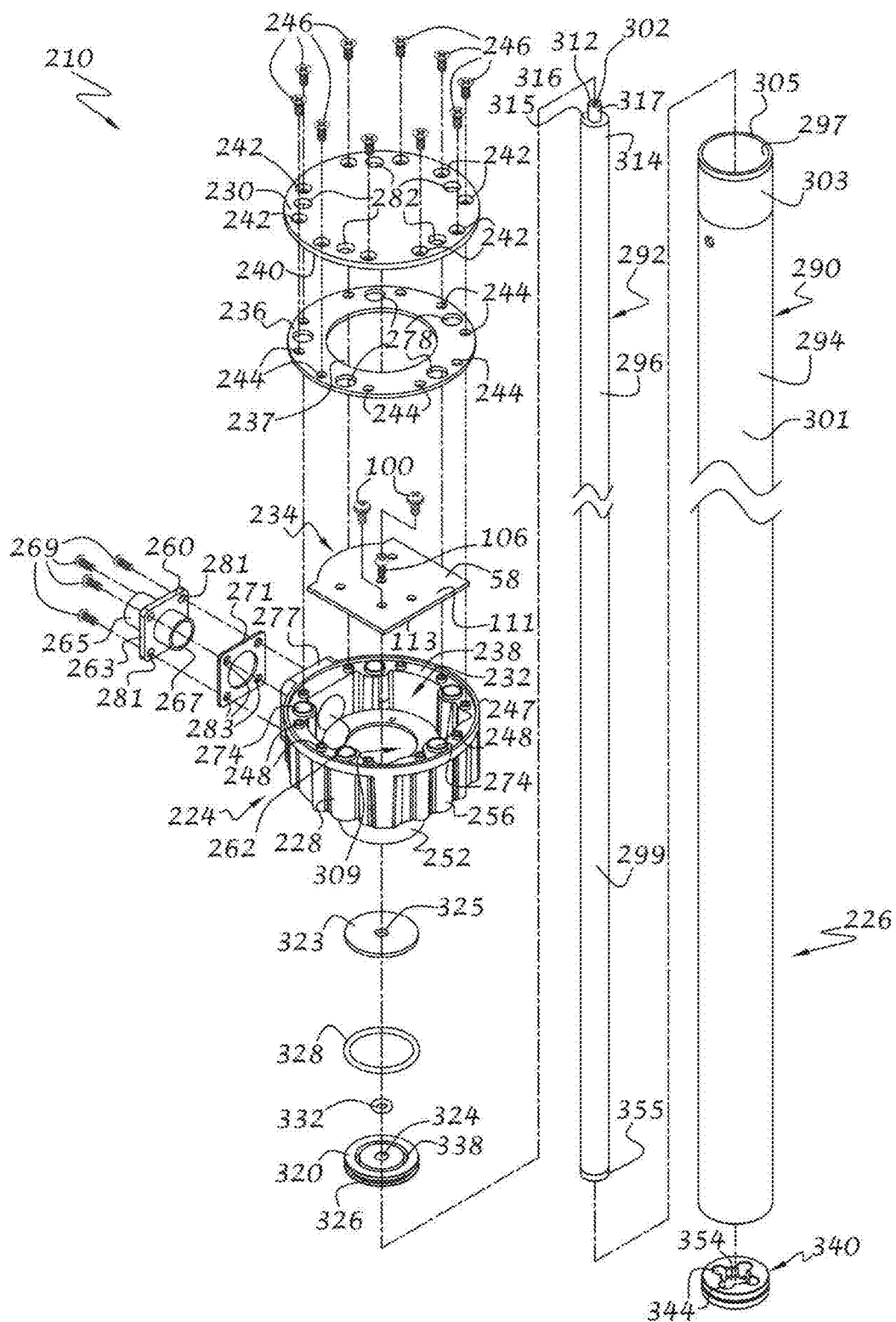
FIG. 5 is an isometric exploded view of the second embodiment of the TDR measurement system of FIG. 4.
Figure 6:
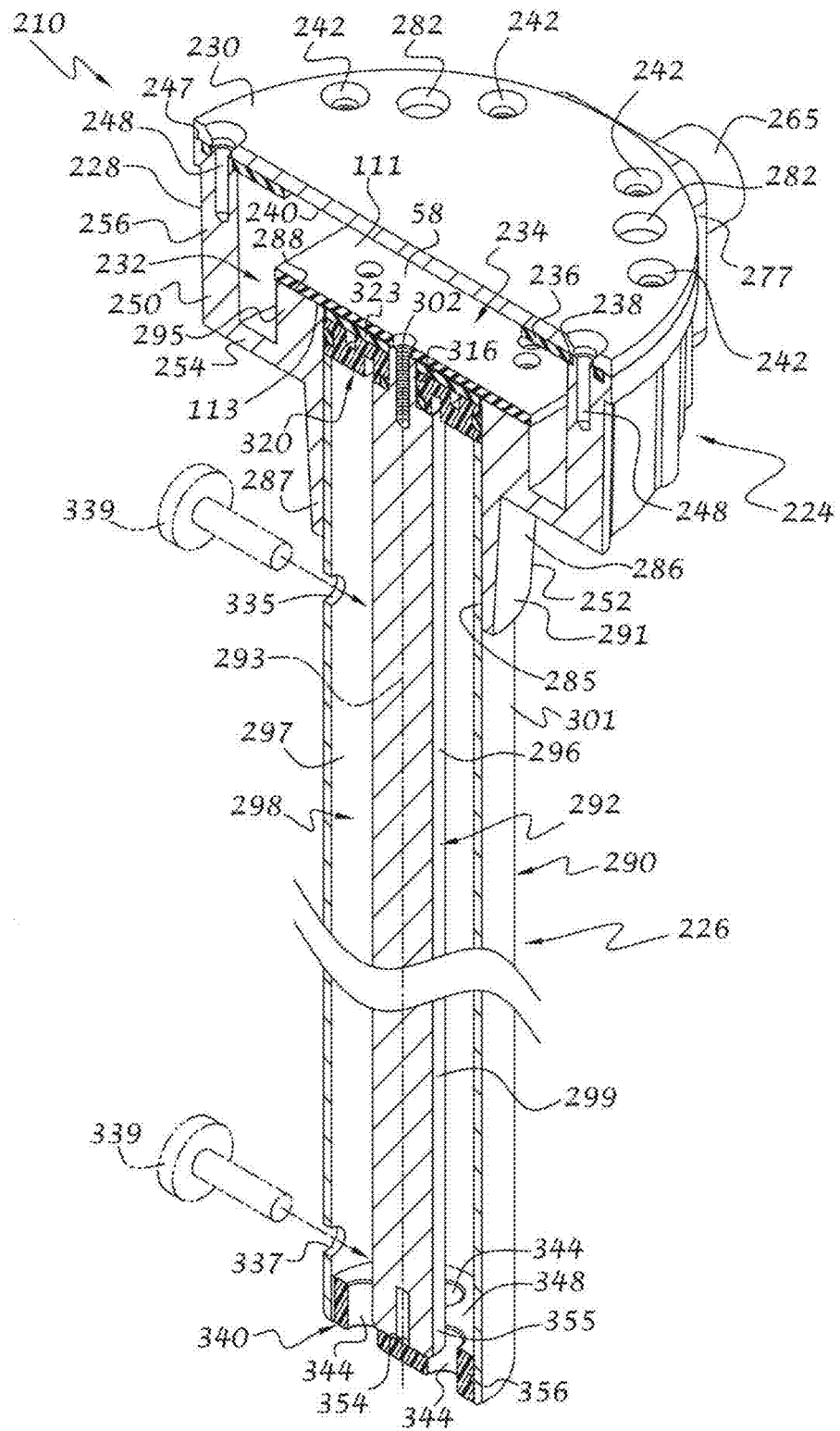
FIG. 6 is an enlarged isometric longitudinal sectional view of the second embodiment of the TDR measurement system taken along line 6-6 of FIG. 4, with fasteners removed for clarity, and showing removable calibration pins in phantom line associated with the elongate measurement probe for calibrating the TDR measurement system in accordance with an exemplary embodiment of the invention.

With reference now to FIGS. 4-6, a second embodiment of the TDR measurement system 210 is further illustrated, which is somewhat similar to the TDR measurement system 10 previously described, with fastening elements being removed in FIGS. 4 and 6 for clarity. The TDR measurement system 10 is shown schematically connected to the wall 212 (FIG. 4) of a tank or container 214 (shown in phantom line) with one or more levels 216, 218, 220 of material 222 located therein, as represented by phantom lines. The TDR measurement system 210 in accordance with one exemplary embodiment of the invention includes a mounting head 224 and an elongate measurement probe 226, which in accordance with one exemplary embodiment of the invention, comprises a transmission line or probe with coaxial conductors that extend from the mounting head 224.

An electronics assembly 234 (FIG. 5) is located in the mounting head for sending pulses of electromagnetic energy down the elongate measurement probe 226, as represented by arrows 215A, 217A, and 219A for example. The electronics assemblies 34 and 234 are similar in construction and therefore will be described with respect to the electronics assembly 234. When an electromagnetic energy pulse is transmitted through the electronics assembly 234 and down the elongate measurement probe 226, one or more anomalies that change(s) the impedance of the probe at a particular location within the space between the elongate electrodes along the length of the probe, causes at least a portion of the transmitted electromagnetic energy pulse to be reflected back to the electronics section as a return echo, as represented by arrows 215B, 217B, and 219B, respectively, and a portion of the energy step or pulse may continue to propagate down the length of the elongate measurement probe 226. Characteristics of the return echo depend largely on the type of anomaly, such as an air/liquid interface, a vapor/liquid interface, a liquid-liquid interface, an air/solid interface, a liquid/solid interface, and a solid/solid interface, each with different densities or dielectric properties to thereby create a return echo for determining a location or position of the interface(s). The return echo is then recorded and analyzed by the electronics assembly to ultimately determine the location along the probe 26 where one or more anomalies occurred or is occurring. The location can represent for example, the level of liquid in a tank or container, the position of a rod or plunger with respect to a stationary support, the interface between various materials and their gaseous, liquid and/or solid phases, as well as the level of granular material within a storage silo, and so on.

The speed or velocity at which the electromagnetic energy pulse travels through the liquid, solid or gaseous phase(s) of different materials can also be recorded and analyzed to determine other properties of the material being measured between the elongate electrodes, such as the dielectric constant, and so on.

As with the TDR measurement system 10, this second embodiment can be associated with stationary containers 214 at fixed locations, as well as with transportable containers associated with vehicles or the like for measuring one or more properties of the material located within the container. The TDR measurement system 210 can also be associated with linear transducers (FIG. 7) for measuring relative position and/or displacement between two objects, as will be described below. As in the previous embodiment, the material(s) to be measured can be in gaseous, liquid, and/or solid phase(s), and can be used for measuring the level of liquid within a tank, relative displacement between objects, the dielectric constant of liquids, locations of anomalies along the length of the transducer 210, measuring the heights of several different liquids with different densities within a single tank, the dielectric constants of such liquids, as well as the level, height, or other properties of any material and/or material interface that creates a measurable echo during operation of the TDR measurement system 210.

With particular reference to FIGS. 5, 6, and 7-9, the mounting head 224 includes a housing 228 and a cover 230 connected to the housing for creating an interior space or volume 232. The housing 228 and/or cover 230 can be constructed of any suitable material as aforementioned with respect to the first embodiment. In accordance with a preferred embodiment of the invention, the housing 228 comprises an electrically conductive material, such as aluminum or stainless steel, for direct electrical connection to the elongate measurement probe 226. An electronics assembly 234 (FIG. 5), similar to the electronics assembly 34 previously described, is located within the interior space 232. A gasket 236 with a central opening 237 (FIGS. 5, 7) is sandwiched between an upper surface 238 of the housing 228 and a lower surface 240 of the cover 230 to seal the interior space 232 from the outside environment. The gasket 236 is preferably annular in shape and constructed of an elastomeric material, felt, cork, or other known materials that exhibit resiliency and compressibility for ensuring a proper seal between the housing 228 and the cover 230.

A plurality of apertures 242 extend through the cover 230 and a corresponding number of apertures 244 extend through the gasket 236 for receiving threaded fasteners 246 (FIG. 5). The fasteners 246 are in turn threaded into apertures 248 formed in the upper surface 238 of the housing 228 to thereby seal the interior space 232 when the fasteners are tightened. Preferably, the threaded apertures 248 are formed outside of the interior space and located at spaced positions around the periphery of the interior space 232. Each threaded aperture 248 is bordered by an annular wall or rim 249 (FIG. 9) that extends upwardly from the upper surface 238. An annular wall or rim 247 (FIG. 8) borders the upper wall 238 and is at the same height as the annular walls 249. The wall 249 and rim 247 rest against the lower surface 240 of the cover 230 to ensure proper alignment of the gasket 236 with the housing 228 and to provide a predetermined distance between the lower surface 240 of the cover 230 and the upper surface 238 of the housing 228. In this manner, the cover and housing will always be consistently spaced during assembly and limit compression of the gasket 236. It will be understood that the housing 228 and cover 230 can be connected via other connecting means, including but not limited to cooperating snap-fit engagement members on the housing and cover, press-fitting the housing and cover together, adhesive bonding, welding or brazing, mechanical clamping, fastening, and so on.

The housing 228 has a first mounting portion 250 located outside of the tank or container 214 (FIG. 4) and a second mounting portion 252 that extends from the first mounting portion and into the tank. The first and second mounting portions 250, 252 of the housing 228 are preferably integrally formed as a single unit during manufacturing. However, it will be understood that the mounting portions can be formed separately and connected together using well-known connecting means without departing from the spirit and scope of the invention.

The first mounting portion 250 is generally cylindrical in shape and includes the upper surface 238 for receiving the cover 230, a lower wall 254 adapted for contacting the wall 212 of a container 214 (FIG. 4) when connected thereto, and a continuous side wall 256 that extends between the upper surface 238 and lower wall 254. The interior space or volume 232 is bounded by the side wall 256 and lower wall 254.

As best shown in FIG. 5, the interior space is generally configured for receiving a printed circuit board (PCB) 58 of the electronics assembly 234. Electric wires (not shown) are located in the interior space 232 and extend between the PCB 58 and a receptacle 260 extending into an opening 262 formed in the side wall 256. The receptacle 260 has a base plate 263 with a first projection 265 extending forwardly therefrom and a second projection 267 extending rearwardly therefrom and into the opening 262 in the side wall 256. The forward projection includes a predetermined pinout of electrical contact pins (not shown) in electrical communication with the PCB 58 via the electric wires (not shown) in a well-known manner for receiving a complementary plug (not shown) associated with a wiring harness (not shown) of a vehicle, system, or the like, to communicate information from the TDR measurement system 210 and provide electrical power thereto. The base plate 263 fits within a square-shaped mounting frame 277 integrally formed with and extending from the side wall 256. A gasket 271 similar in shape to the base plate 263 and mounting frame 277 is sandwiched between a flat section 279 of the side wall 256 within the frame 277 and the base plate 263. For mounting the receptacle 260 to the housing 228, fasteners 269 extend through mounting apertures 281 in the base plate 263, corresponding mounting apertures 283 in the gasket 271, and thread into threaded mounting apertures 273 (FIG. 8) formed in the mounting frame 277. It will be understood that the receptacle 260, gasket 271, and mounting frame 277 are not limited to the square-shaped configuration as described and shown, but can be of any suitable shape or configuration to accommodate a large variety of wiring harnesses and/or electrical plugs. Accordingly, a wiring harness (not shown) is connected to a power supply 75 (FIG. 20), such as the power supply of a vehicle, external battery, line power, and so on, for example, for providing electrical power to the electronics assembly 234 (FIG. 5) and related components. The wiring harness is also connected to ground on the PCB and/or other grounded component, as well as signal out, representing one or more measured properties of the liquid, air or vapor space, solid material, and so on, being measured by the elongate measurement probe 226 and/or determined by the electronics assembly 234. As in the previous embodiment, the electronics assembly 234 is also capable of transmitting signals to a hard-wired display 77 (FIG. 20) associated with the transducer 210, vehicle, machine, system, etc.

Figure 20:
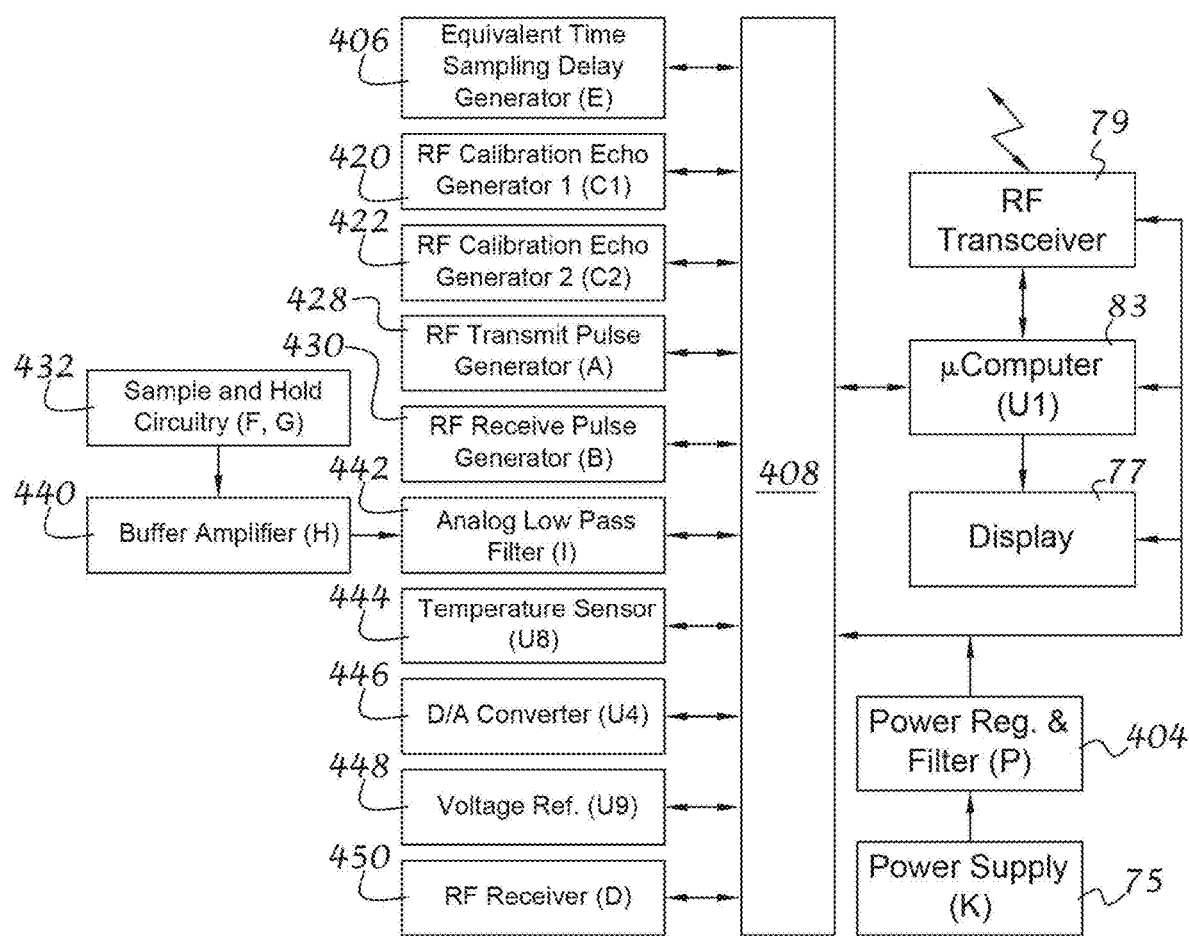
FIG. 20 is a block diagram of electronic circuitry of the TDR measurement system in accordance with an exemplary embodiment of the invention.
Figure 21:
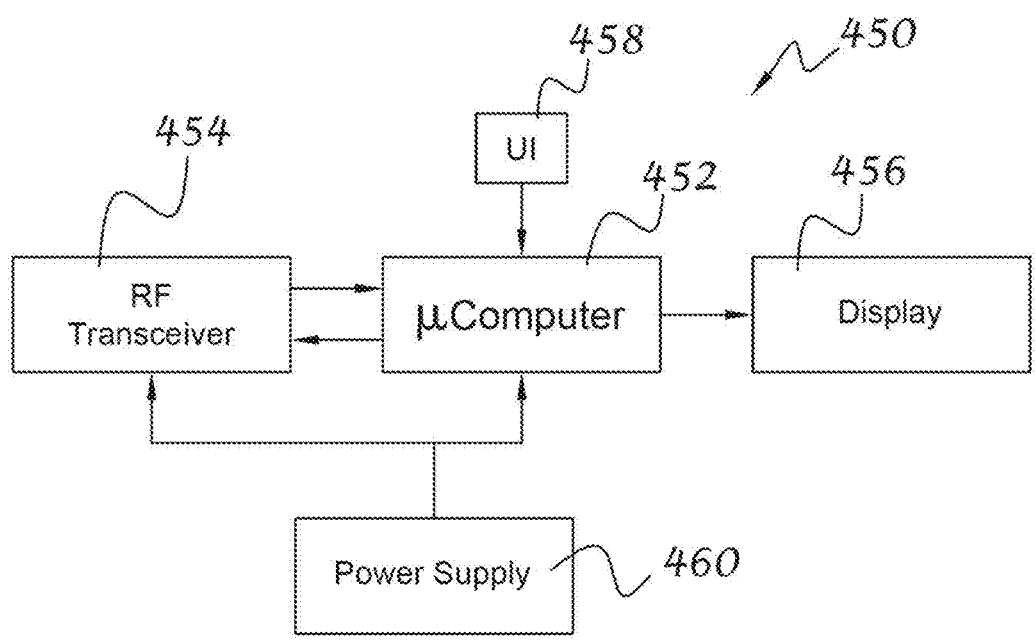
FIG. 21 is a block diagram of a communication device for receiving and displaying measurement data from the TDR measurement system.

Referring now to FIG. 21, signals can also, or alternatively, be sent wirelessly via a radio-frequency (RF) transceiver 79 (FIG. 20) to an independent external display 456 (FIG. 21) associated with a user interface means 450, including a portable device (FIG. 21), such as a vehicle, machine, system, a remote smart device such as a smartphone, tablet, laptop computer, as well as stationary devices such as desktop computers, generators and other machinery, and so forth. The signals can be indicative of one or more conditions inside the tank or container 14 (FIG. 1) including liquid level, material level, specific gravity, liquid or material type, vapor space, temperature, pressure, density, and so on, ambient conditions outside of the tank such as temperature, humidity, atmospheric pressure, vehicle tilt, and so on, as well as other conditions and so forth. The RF transceivers 79, 454 can comprise any suitable device or combination of devices transmitting and/or receiving signals representative of the one or more conditions, information related to tank geometry including strapping information and look-up tables (for liquid level measurement), information for the particular liquid to be measured in the tank, program updates and instructions to the TDR measurement system, and so on.

When the remote device 450 is embodied as a smartphone or tablet that can communicate via Bluetooth™ technology and/or other wireless frequencies, information from the TDR measurement system can be associated with a user-specific application (app) downloaded onto the smart device. The smart device can include a user input 458 in the form of a touch-screen, push-button switches responsive to touch or pressure, a wireless or hardwired keyboard, and so on, to select information related to the TDR measurement system and/or the liquid level, material condition, other material properties, as well as other functions, including but not limited to, wirelessly coupling with the TDR measurement system, selecting information to be displayed on both devices, selecting information to be transmitted to the TDR measurement system for programming the transducer for a particular tank geometry, when the transducer is configured to measure liquid level, liquid properties, look-up tables, and so on, for use by the processor 83. The power supply 460 is connected to the processor 452 and transceiver 454 and can include one or more rechargeable batteries so that the smart device has portability.

Figure 9:
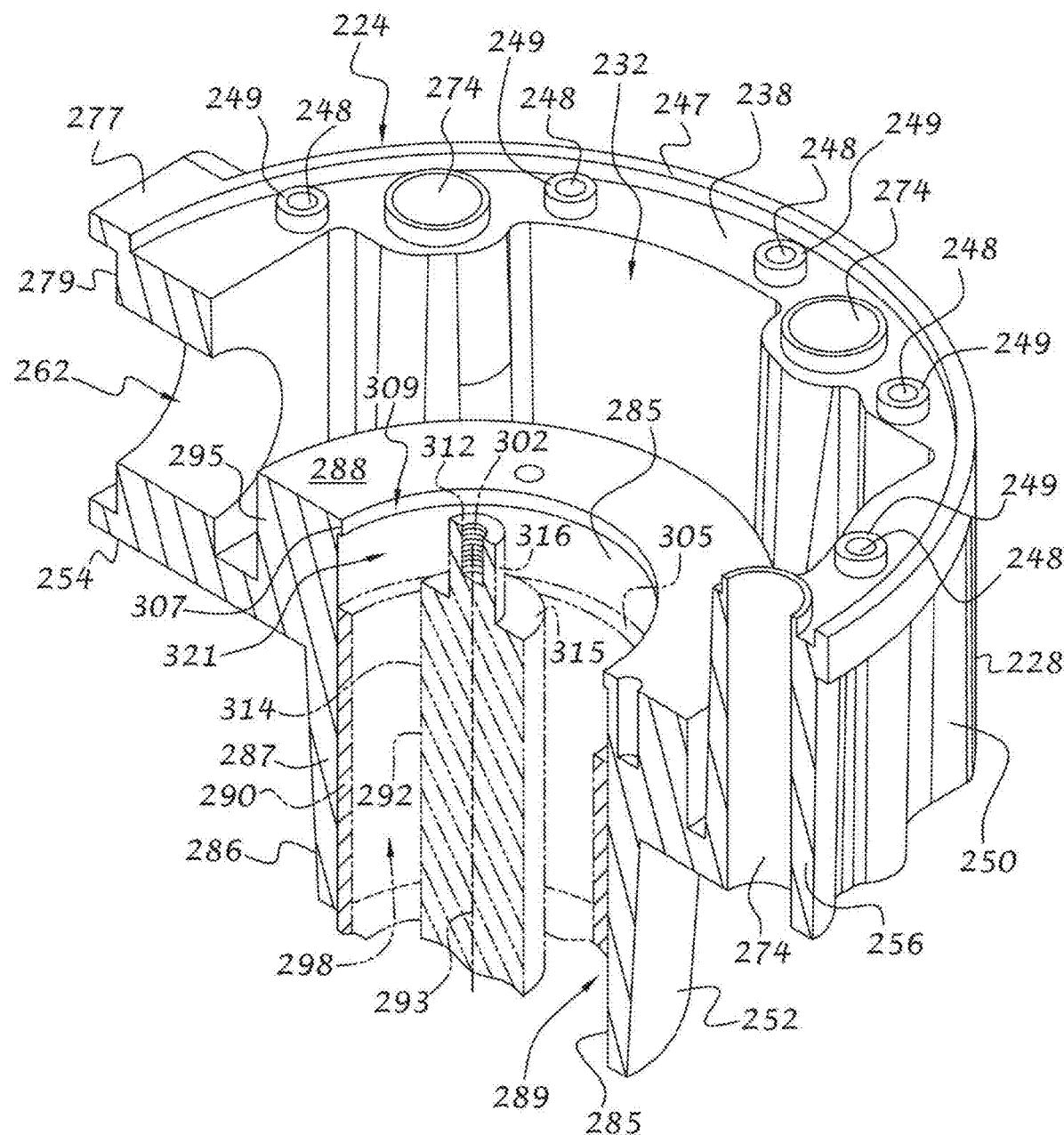
FIG. 9 is an isometric sectional view taken along line 9-9 of FIG. 8 and showing inner and outer electrodes of the measurement probe in phantom line.
Figure 10:
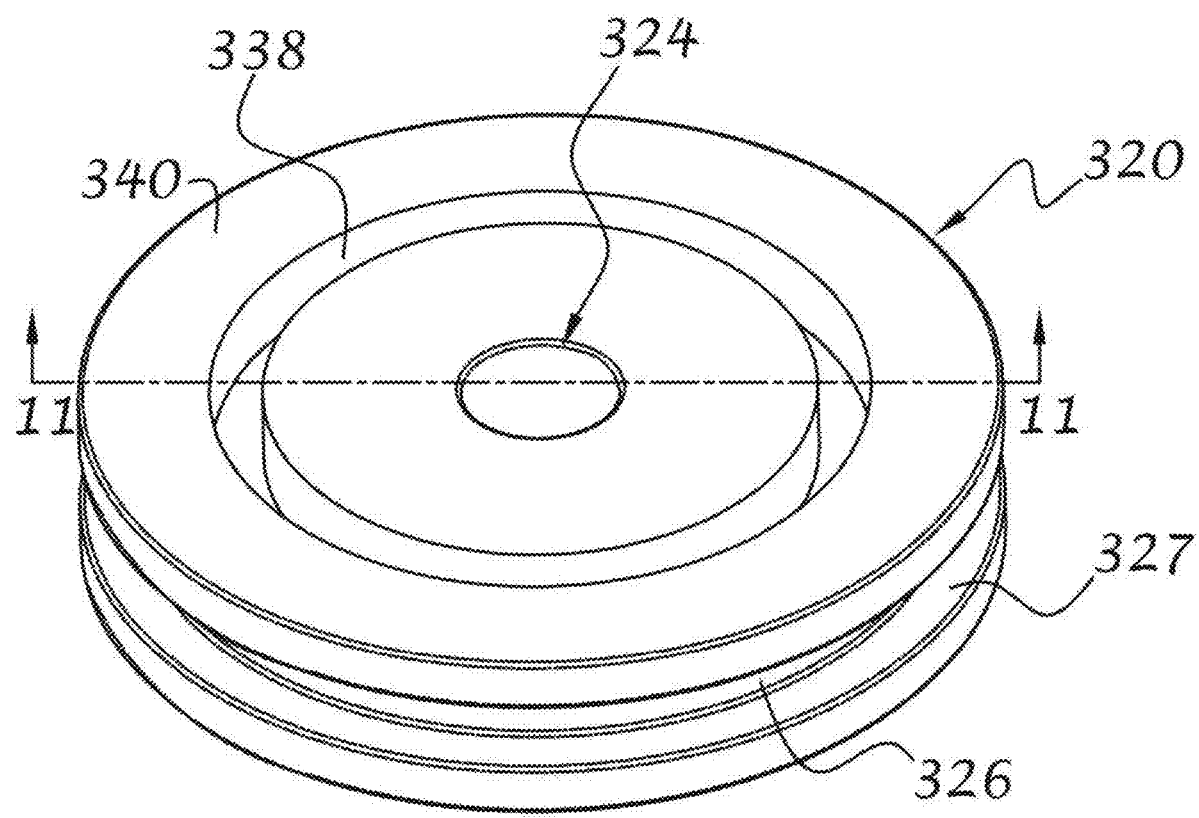
FIG. 10 is an enlarged top isometric view of an exemplary upper spacer of the TDR measurement system.

As best shown in FIGS. 4, 5 and 9, a plurality of mounting holes 274 extend through the first mounting portion 250 from the lower wall 254 to the upper surface 238. Each mounting hole 274 is bordered by an annular wall or rim 275 that extends upwardly from the upper surface 238 and is at the same height as the annular rims 247 and 249 to ensure proper alignment of the gasket 236 with the housing 228 and to provide a predetermined distance between the lower surface 240 of the cover 230 and the upper surface 238 of the housing 228, as previously described.

The mounting holes 274 are larger than the apertures 248, and are also located at spaced positions around the periphery of the interior space 232 for receiving mounting studs 76 (such as shown in FIGS. 1 and 3) that are typically mounted on the wall 212 of the tank 214 and surround an opening 280 (FIG. 7) formed in the tank wall 212 through which the second mounting portion 252 extends. Mounting holes 278 (FIG. 5) are formed in the gasket 236 and correspond in size and position to the mounting holes 274. Likewise, corresponding mounting holes 282 are formed in the cover 230. When the TDR measurement system 210 is mounted to a tank 214 or the like, the mounting holes 274, 278, and 282 of the mounting head 224 are aligned with the studs 76 (FIG. 1) of the tank. The mounting head of the TDR measurement system 210 is then pressed onto or fitted over the studs 76 until the lower surface 254 of the first mounting portion 250 is adjacent the tank wall 214 and the second mounting portion 252 is located in the tank opening 280 and extends into the tank. In this position, the studs 76 protrude outwardly from the cover 230. Nuts 84 (FIG. 3) or the like can then be threaded onto the studs 76 to secure the TDR measurement system 210 to the tank wall.

It will be understood that the means for mounting the TDR measurement system 210 to a container or the like is given by way of example only, and can vary without departing from the spirit and scope of the invention. For example, the tank may be provided with threaded openings for receiving bolts or other fasteners that extend the opposite direction through the mounting openings of the mounting head 224. In addition, many tanks have either a straight threaded opening or NPT threaded opening for receiving a liquid level transducer or the like. The type of threaded opening depends on the material, or liquid stored in the tank, and in order to accommodate such arrangements, corresponding threads (not shown) can be provided on the first mounting portion 250 and/or the second mounting portion 252 or other portion of the TDR measurement system 210 for mating with the threaded tank opening (not shown). Other known means for connecting the transducer to a tank, container, wall, or the like can also be used without departing from the spirit and scope of the invention.

Figure 7:
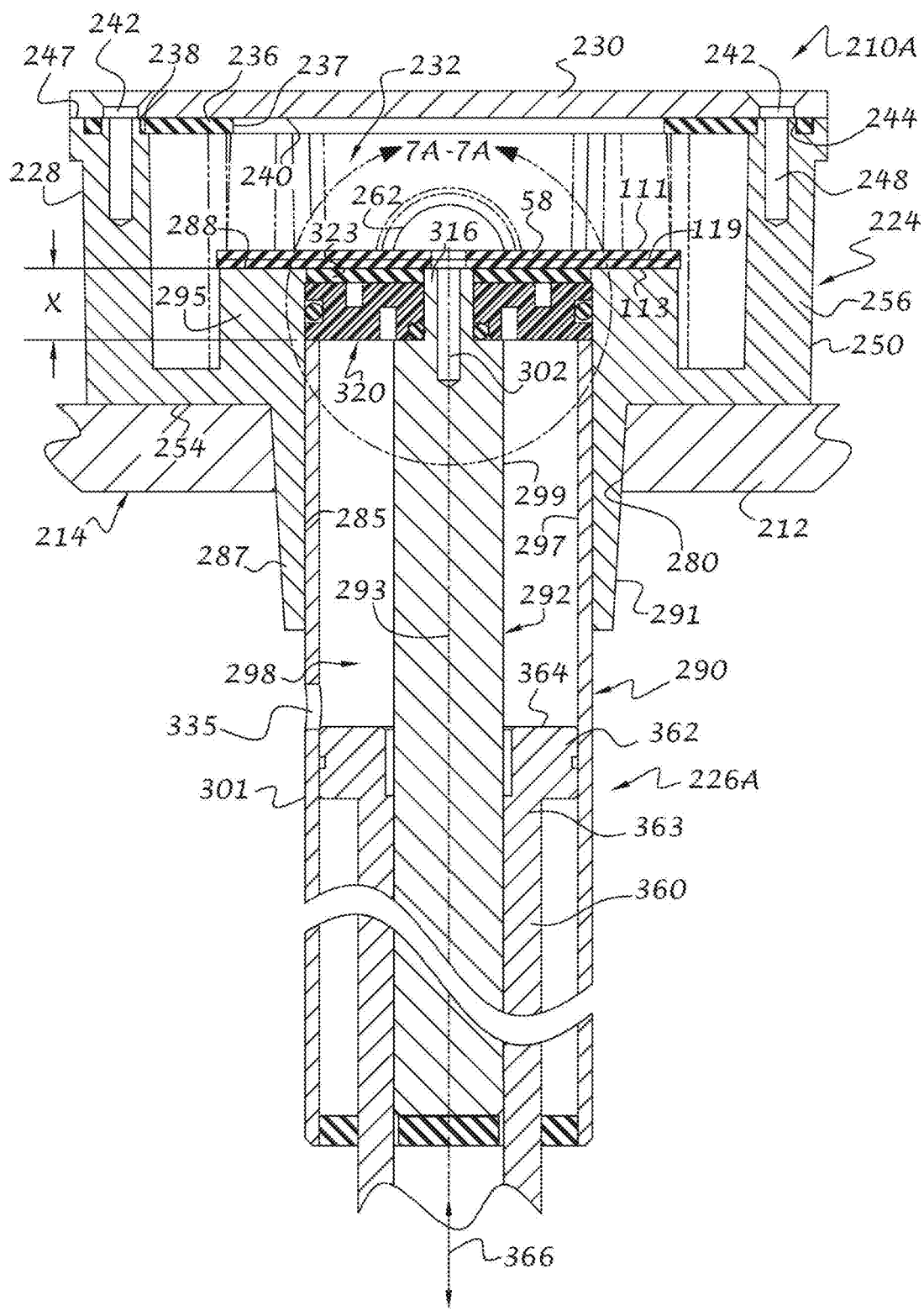
FIG. 7 is an enlarged longitudinal sectional view of a TDR measurement system in accordance with a further embodiment of the invention with an elongate measurement probe for measuring linear movement between a probe body and plunger of the TDR measurement system.

With particular reference to FIGS. 7-9, the second mounting portion 252 of the housing 228 is generally of frustoconical shape and includes an annular side wall 286 with a first wall section 287 that extends from the lower wall 254 of the mounting head and through the opening 280 formed in the wall 212 of the tank 214, and a second wall section 295 that extends upwardly into the interior space 232 from the lower wall 254. The first wall section 287 has an inner surface 285 that forms a generally cylindrical inner space or volume 289 (FIG. 9) for receiving the elongate measurement probe 226 (FIG. 7). The first wall section 287 also has an outer surface 291 that slopes inwardly toward a central axis 293 of the cylindrical inner space 289 to complement the shape of the opening 280 in the wall 212 of the tank 214.

The second wall section has an upper annular surface 288 for supporting the PCB 58 of the electronics assembly 234. The housing 228, and thus the inner surface 285, is preferably electrically conductive so that the second mounting portion 252 of the housing 228 becomes an extension of the elongate measurement probe 226. The surface 288 is also preferably electrically conductive to form an electrical connection between the housing 228 and the PCB 58, and thus an electrical connection between the PCB 58 and an elongate outer electrode 290 (shown in phantom line in FIG. 9) of the measurement probe 226 (FIG. 6) via the housing 228.

The elongate measurement probe 226, in accordance with an exemplary embodiment of the invention, comprises a coaxial transmission line having a first, or outer, elongate electrode 290 and a second, or inner, elongate electrode 292 spaced from, and coaxial with, the outer elongate electrode 290. The outer elongate electrode 290 comprises an outer hollow electrically conductive cylinder or tube 294 with a conductive inner surface 297. The inner elongate electrode 292 comprises an inner solid electrically conductive rod 296 with an outer conductive surface 299 that extends coaxially inside the outer elongate electrode 290 to form the coaxial transmission line. The coaxial transmission line can be used for measuring the impedance of whatever may be located in an annular inner measurement space or volume 298 (FIGS. 6, 7) formed between the inner conductive surface 297 of the outer elongate electrode 290 and the outer conductive surface 299 of the inner elongate electrode 292.

Although the elongate measurement probe 226 is described herein as a coaxial conductor, it will be understood that the electrodes can be of any suitable shape and/or size and spaced at any suitable distance so long as one or more properties and/or conditions of liquid or other material or medium located in a space between the electrodes can be measured and/or determined utilizing the system and/or method(s) of the present invention. Depending on the type of liquid or other medium being measured, a thin, insulative coating can be applied to one or both electrodes 290, 292 to both protect the electrodes from corrosion and finely tune the NIV by adjusting the thickness of the insulative coating, the surface area, and the distance between the outer and inner electrodes.

The outer elongate electrode 290 is received and secured in the inner annular measurement space 289 by frictionfitting the outer surface 301 (FIG. 6) of the tube 294 with the inner surface 285 of the of the first wall section 286 for example. To that end, the outer elongate electrode 290 can include a knurled section 303 (FIG. 5) or the like formed at or near an upper edge or face 305 of the outer elongate electrode 290 for biting into the inner conductive surface 285 of the annular side wall 286 during assembly, so that the side wall 286 becomes an electrically conductive extension of the outer elongate electrode 290.

However, it will be understood that the outer elongate electrode can be connected to the housing 228 through other well-known connection means, such as welding, adhesive bonding, mechanical fastening, threading, heat-shrinking, and so on. In accordance with a further embodiment of the invention, the outer elongate electrode 290 can be integrally formed with the annular side wall 286.

No matter what connection means is used, the outer elongate electrode 290 is preferably in electrical contact with the inner conductive surface 285 of the annular side wall 286, which is in turn electrically connected to ground associated with the PCB 58 and/or the wall 214 of the tank 212 or other grounding location associated with the TDR measurement system 210, the tank 212, and/or the machine or system associated with the tank or TDR measurement system 210. It will be understood that electrical ground of, of the transducer 210 can be electrically connected to, or isolated from, the electrical ground of the tank and/or machine, frame, or system without departing from the spirit and scope of the invention.

As in the previous embodiment, the PCB 58 is mechanically and electrically connected to the annular side wall 286 by a pair of fasteners, such as self-locking screws 100 (FIG. 18A), that extend through first and second conductive openings or thru-holes 102, 104 (FIG. 18B) of the PCB 58 and thread into threaded openings (not shown) formed in the upper annular surface 288 of the annular side wall 286 (shown in phantom line in FIG. 18A). A circular trace 105 can surround each conductive opening 102, 104 for electrical contact with either a head 107 of the fasteners 100 or a self-locking washer 109 associated with the fasteners. Likewise, a circular trace 118 (FIG. 18B) can surround the conductive opening 108 for electrical contact with either a head 107 of the fastener 106 or a self-locking washer 109. In this manner, the PCB is both electrically and mechanically connected to the annular side wall 286 of the housing 228 and the inner electrode 92, 292. The inner conductive surface 285 of the side wall 286 is in turn mechanically and electrically connected to the outer elongate electrode 290, preferably through press-fitting, so that the PCB 58 is electrically connected to the outer electrode 290 via the annular side wall 286.

In accordance with a further embodiment of the invention, the outer electrode 90, 290 can have a wall thickness or flange wide enough to receive the fastener 100 or other connection means for direct electrical and mechanical connection to the PCB, thereby bypassing the annular side wall 86, 286 of the housing 28, 228.

Preferably, the outer elongate electrode 290 is connected to ground on the PCB 58 via the annular side wall 286. Although it is preferred that the mounting head be constructed of electrically conductive material, such as stainless steel, aluminum, brass, and so on, it will be understood that the mounting head can be constructed of electrically insulating material and provided with conductive surfaces through well-known surface treatment techniques, without departing from the spirit and scope of the invention.

As in the previous embodiment, the inner elongate electrode 292 is mechanically and electrically connected to the PCB 58 via the self-locking screw 106 (FIG. 18A) that extends through a third conductive opening or thru-hole 108 (FIG. 18B) of the PCB 58 and threads into a threaded opening 302 (FIGS. 5-7) formed in a top surface 312 (FIGS. 5, 9) of the inner elongate electrode 292.

The upper end 314 of the inner elongate electrode 292 has a step 315 that defines a reduced section 316 with an outer conductive surface 317 that is also cylindrical in shape to ensure that the impedance as measured between the inner and outer elongate electrodes remains substantially the same with the addition of an upper spacer 320 (FIG. 7) with a dielectric constant that is different than the dielectric constant of the air, vapor or other fluid in the inner annular measurement space 298, thereby eliminating or at least minimizing a return echo from electrical electromagnetic energy pulses transmitted along the coaxial measurement probe as the electromagnetic energy ramp or pulse propagates through the transition area between the upper spacer 320 and the inner measurement space 298. With this construction, the TDR measurement system is capable of measuring levels or heights of liquids or other materials in close proximity to the upper spacer 320, thereby increasing the measurement range and accuracy of the actual level or height of material in the elongate measurement probe.

With the third conductive opening 108 (FIG. 18B) being centered between the first and second conductive openings 102 and 104, respectively, the inner elongate electrode 292 is coaxial with the outer elongate electrode 290. As in the previous embodiment, the PCB openings 102, 104 are connected to electrical ground of the PCB while the PCB opening 108 is connected to other electronics and electronic circuitry for sending electromagnetic energy ramps or pulses down the inner elongate electrode 292 and receiving data reflective of the electromagnetic energy pulse at predetermined locations along the length of the elongate measurement probe via the outer elongate electrode 290 or vice-versa, including return echoes due to one or more anomalies along the PCB and/or measurement probe, such as the interface between air and liquid within the measurement probe, the interface between two liquids having different dielectric constants, a probe marker signifying the beginning and/or end of the elongate measurement probe, and so on.

Although the invention is described in terms of mechanical fasteners for ultimately electrically and mechanically connecting the outer and inner electrodes to the PCB, it will be understood that other connection means can be used, including but not limited to, adhesive bonding with conductive adhesive, soldering, brazing, surface welding, and so on.

As best shown in FIGS. 5, 7, and 9-13, the upper spacer 320 is annular in shape and located in a first inner annular space or volume 321 (best shown in FIG. 9) which is a portion of the cylindrical inner space or volume 289 previously described. The first inner annular space 321 is located between the outer conductive surface 317 of the reduced section 316 of the inner electrode 292 and the inner conductive surface 285 of the annular side wall 286 of the housing 228, and between an upper edge 305 of the outer elongate electrode 290 and an annular flange 307 (FIG. 9) of the upper annular surface 288. The annular flange 307 circumscribes an opening 309 located centrally in the upper extension 295 of the annular side wall 86 and intersects with the first inner annular space 321. The flange 307 functions as a stop member for the upper spacer 320 during assembly. The upper spacer 320 is sandwiched between the upper edge or face 305 of the outer elongate electrode 290 and the flange 307.

A resilient, circular-shaped layer or sheet 323 is provided between the PCB 58 and the upper spacer 320 to ensure a snug fit of the upper spacer within the first inner annular space 321 to eliminate any air gaps or empty spaces that may occur between the upper spacer 320 and the PCB 58 due to manufacturing tolerances, small differences in orientation between the upper spacer 320 and the PCB 58 that may occur during assembly, and so on. In this manner, relatively large echoes that might otherwise occur in the air gaps or empty spaces are eliminated. A central bore 325 extends through the layer 323 for receiving the reduced cylindrical section 316 of the inner elongate electrode 292. As with the first upper spacer 320, the resilient layer 323 can comprise one or more materials having one or more dielectric constants and/or features to minimize changes in impedance during operation, as well as one or more materials and/or layers of materials with different resiliencies.

A central bore 324 extends through the upper spacer 320 between a lower surface 334 and an upper surface 340 thereof for receiving the reduced cylindrical section 316 of the inner elongate electrode 292. The upper spacer 320 also includes an outer side surface 327 that extends between the lower surface 334 and upper surface 340, with an outer annular groove 326 formed therein for receiving an outer O-ring or seal 328 to thereby seal the upper spacer 320 against the inner surface 285 of the annular side wall 286. An inner annular groove 330 (FIGS. 12 and 13) is formed in the lower surface 334 of the upper spacer 320 and intersects with the central bore 324 for receiving an inner O-ring or seal 332 (FIGS. 5 and 7) to thereby seal the upper spacer 320 against the reduced section 316 of the inner elongate electrode.

The O-rings 328 and 332 can be constructed of any suitable resilient and/or flexible material capable of sealing the upper spacer 320 with the annular side wall 286. Likewise, the resilient sheet or layer 323 can be constructed of any suitable resilient and/or flexible material that seals against the upper spacer 320 and the PCB 58. Such materials can include, but are not limited to, rubbers, elastomers, silicones, fluorocarbons, compounds and/or combinations thereof, and so on. The selection of a particular material for the O-rings and resilient layer 323 will depend on the material selection for the upper spacer 320 and any impedance-modifying features to thereby create a reference nominal impedance value that at least approximates the NIV of the inner annular measurement space or volume 298 in the presence of air or vapor, i.e. in the absence of material to be measured.

Figure 11:
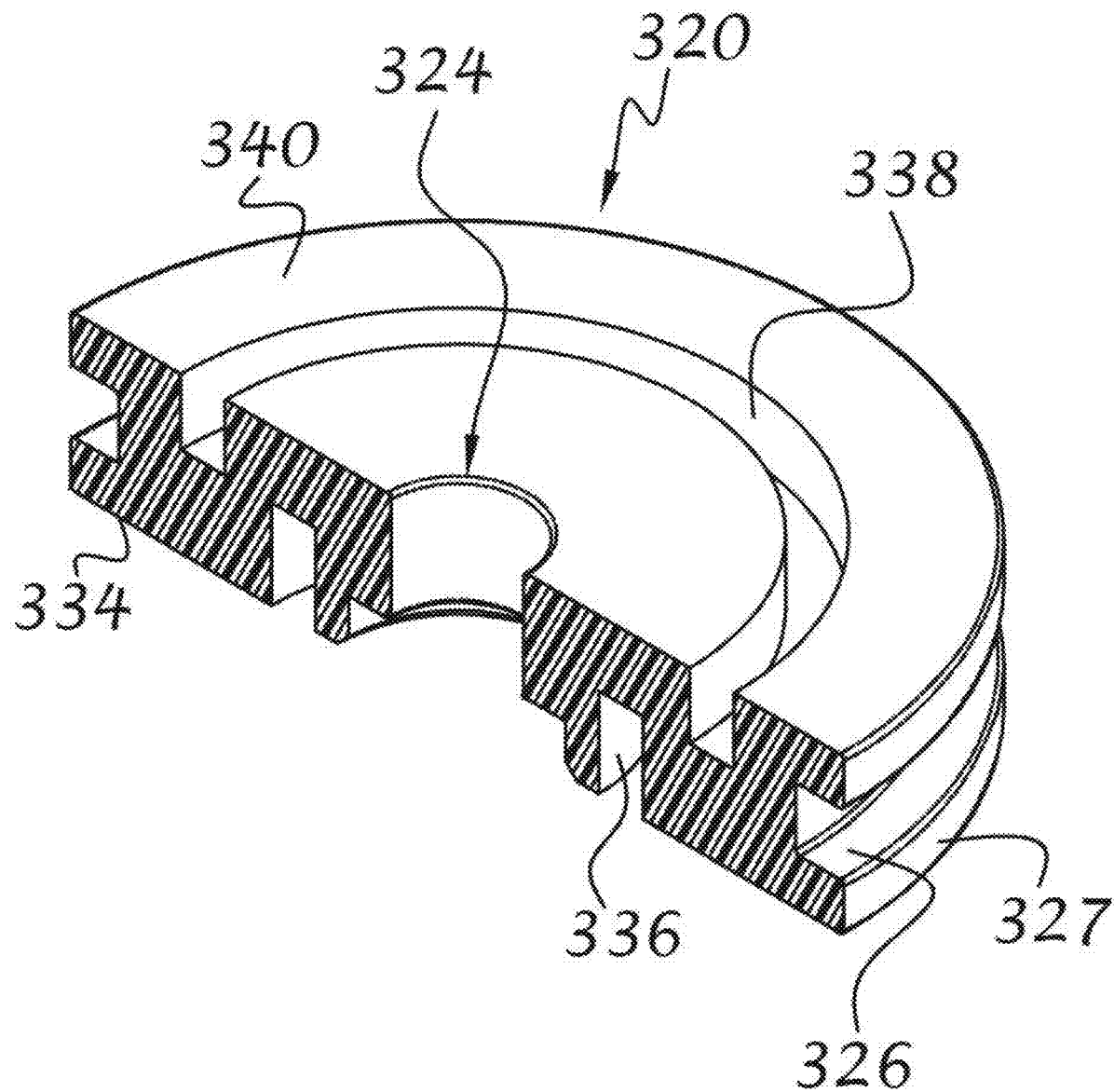
FIG. 11 is a sectional view thereof taken along line 11-11 of FIG. 10.
Figure 12:
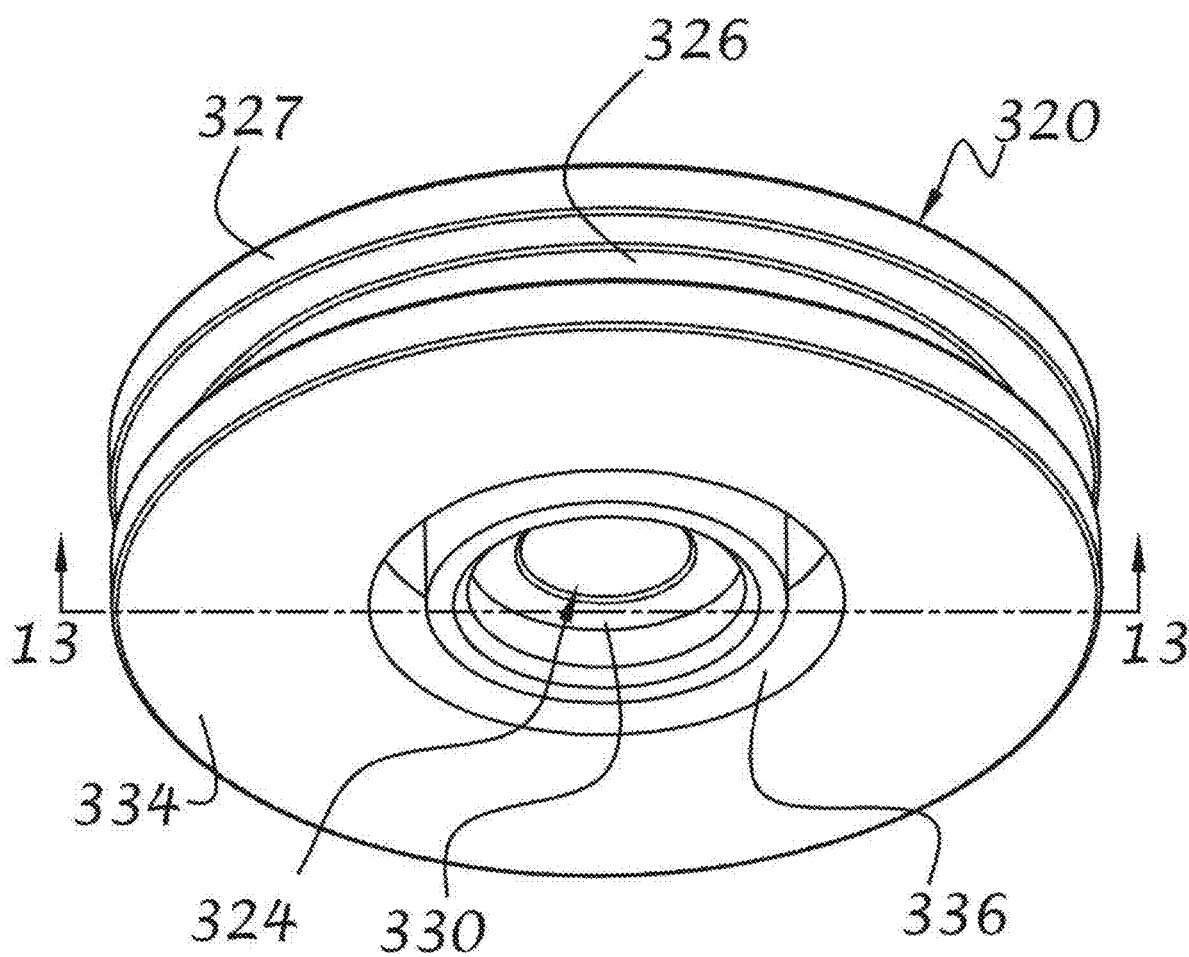
FIG. 12 is an enlarged bottom isometric view of the upper spacer.
Figure 13:
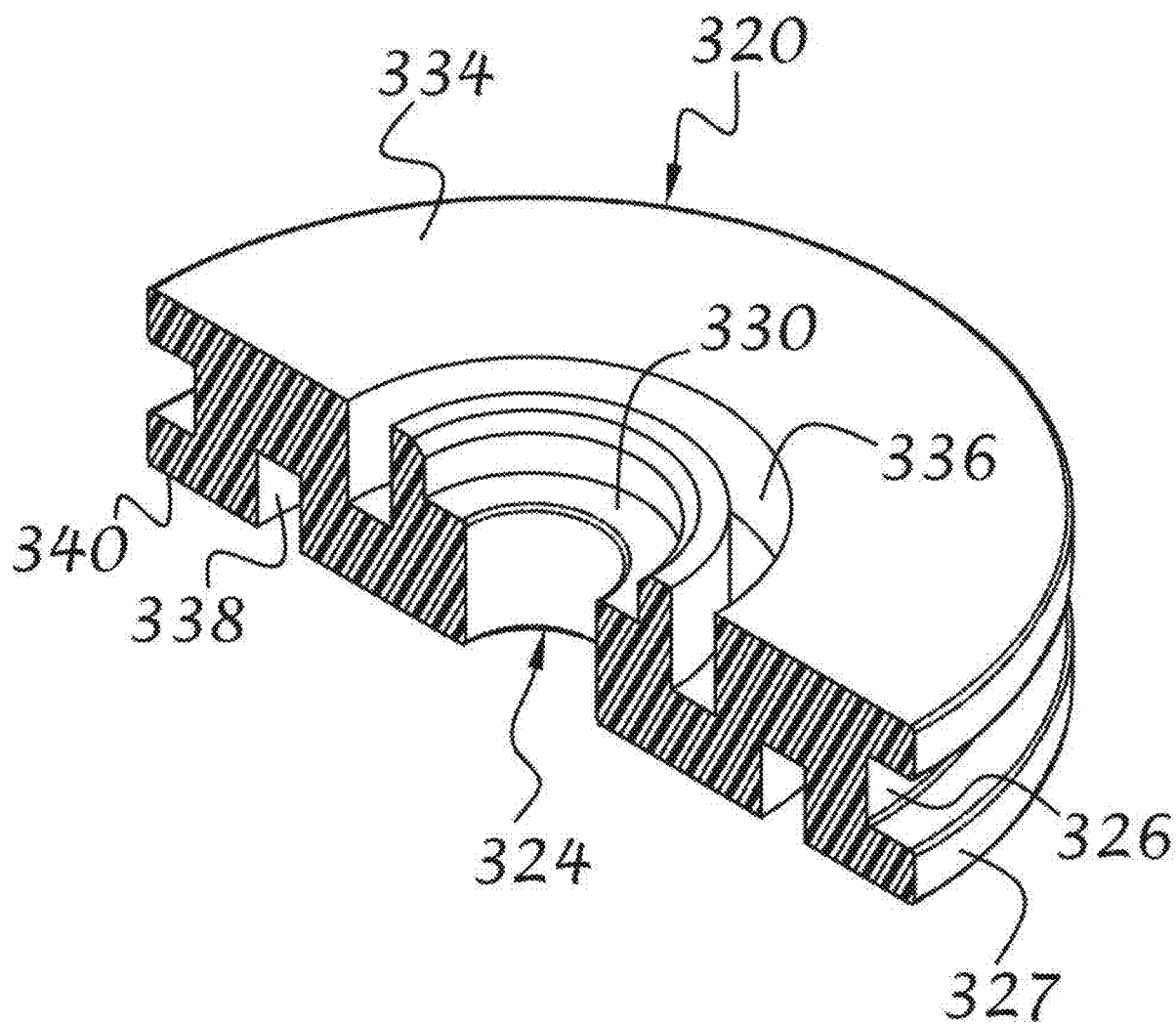
FIG. 13 is a sectional view thereof taken along line 13-13 of FIG. 12.
Figure 14:
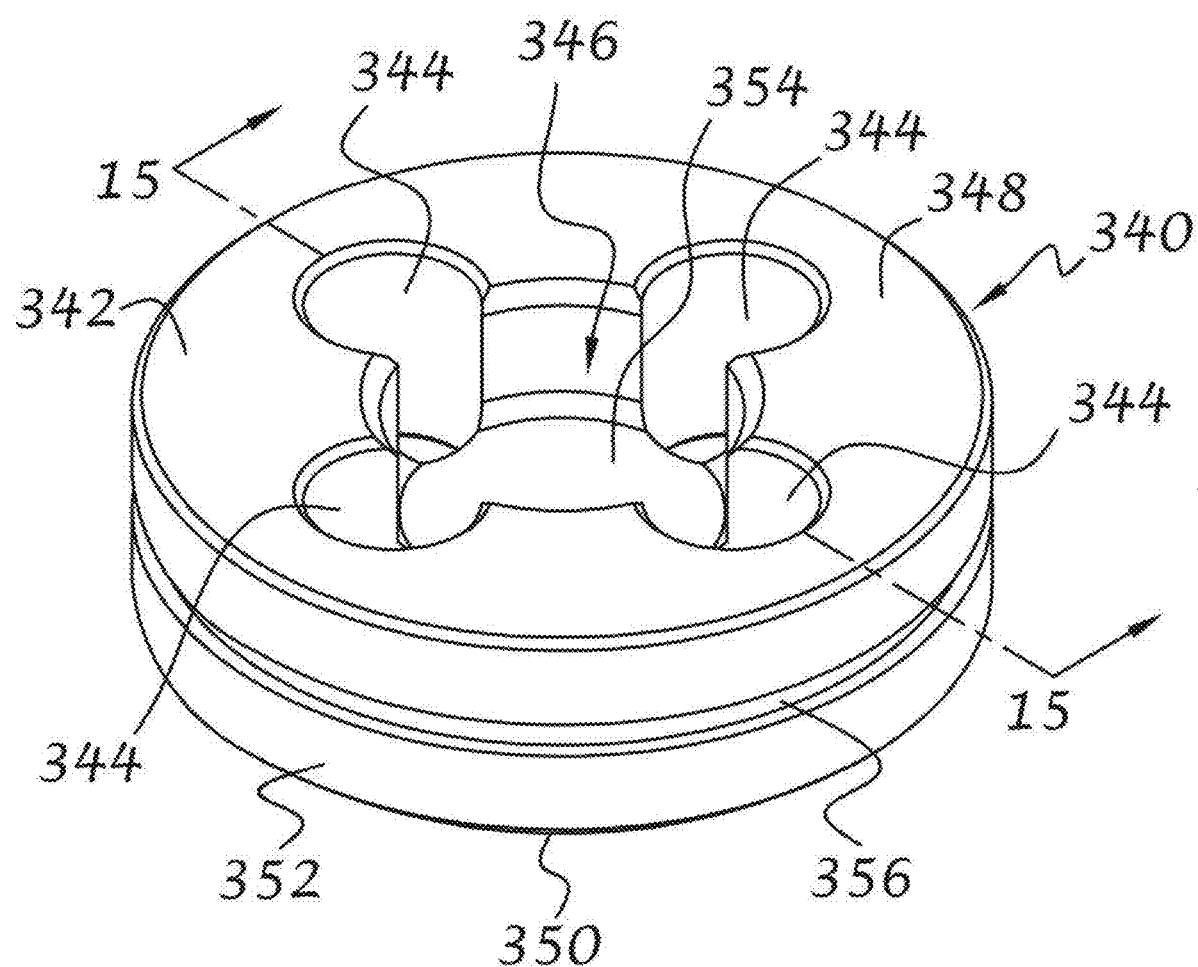
FIG. 14 is an enlarged top isometric view of an exemplary lower spacer of the TDR measurement system.
Figure 15:
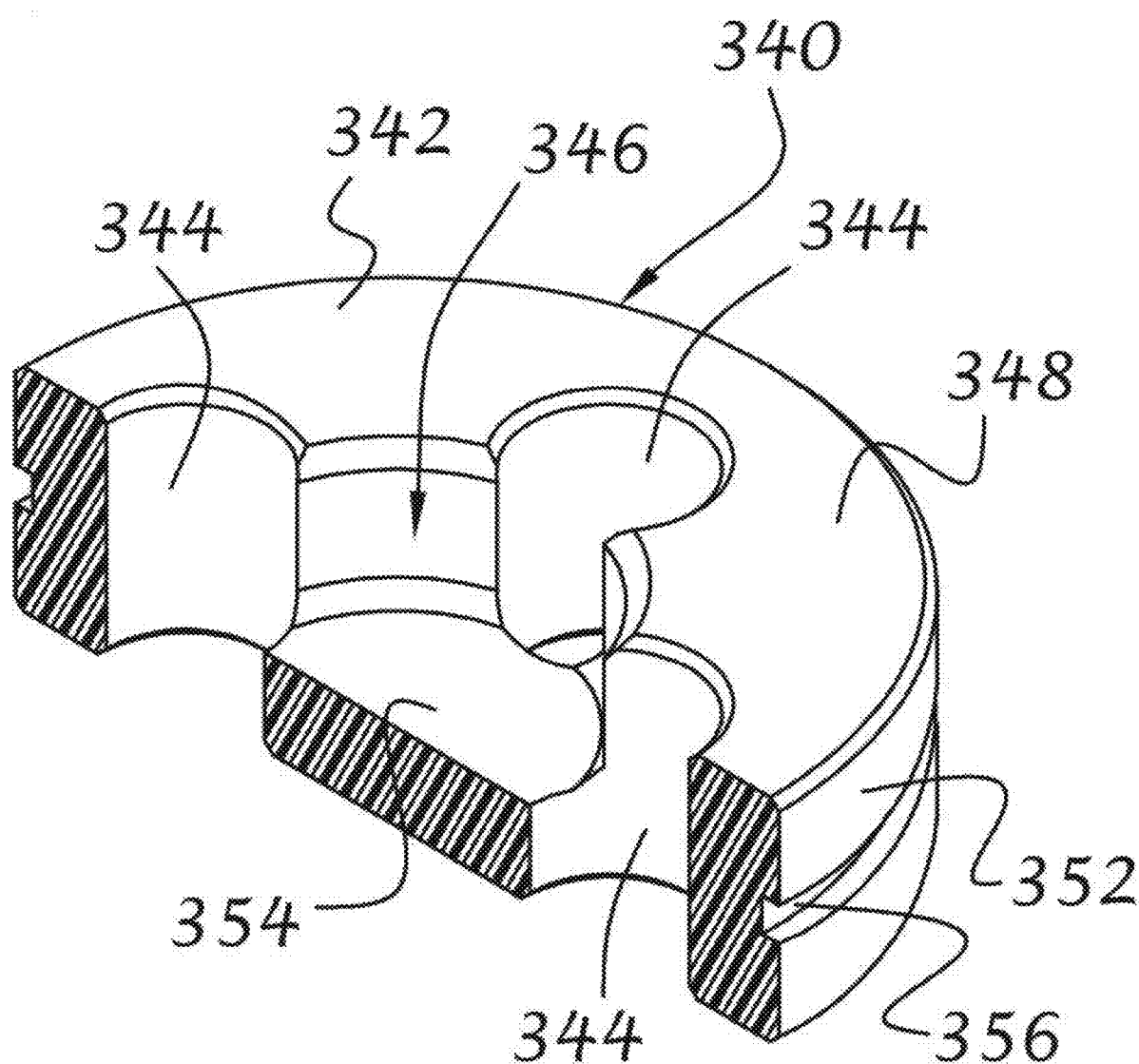
FIG. 15 is a sectional view thereof taken along line 15-15 of FIG. 14.
Figure 16:
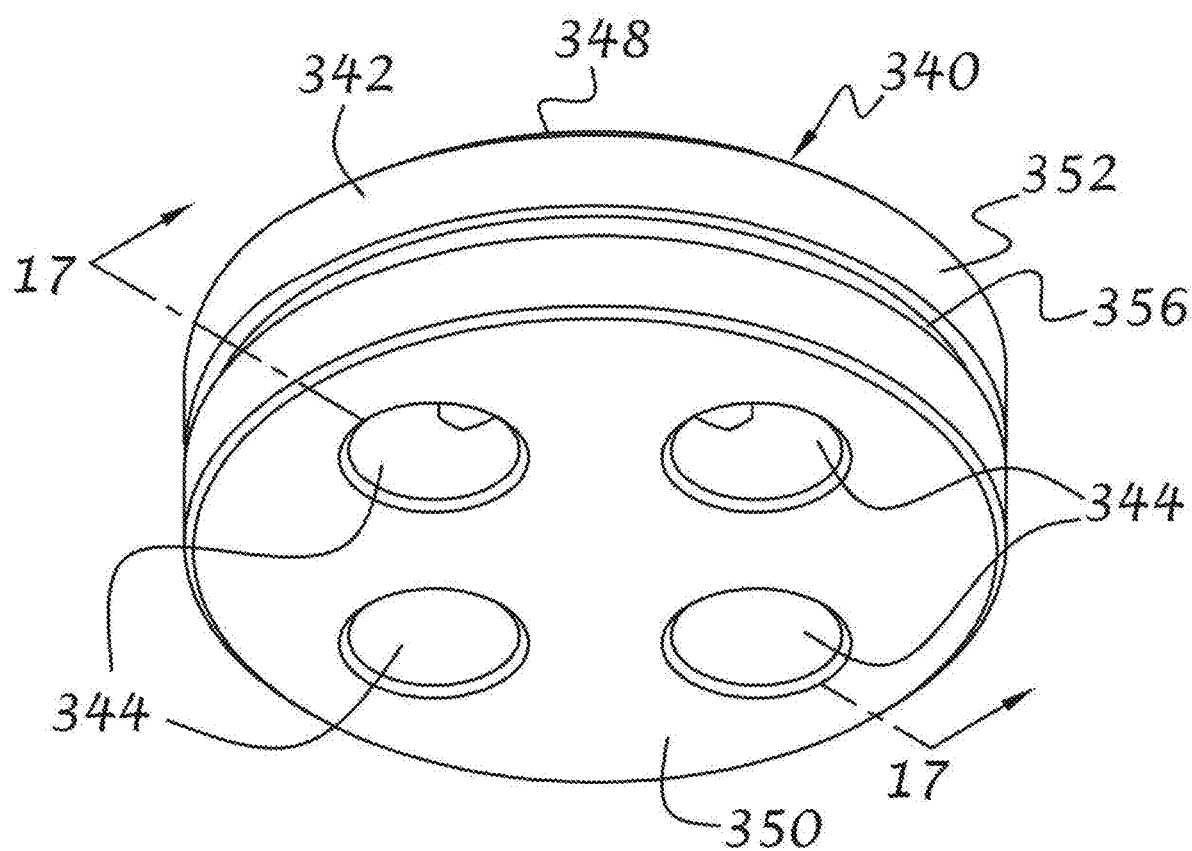
FIG. 16 is an enlarged bottom isometric view of the lower spacer.
Figure 17:
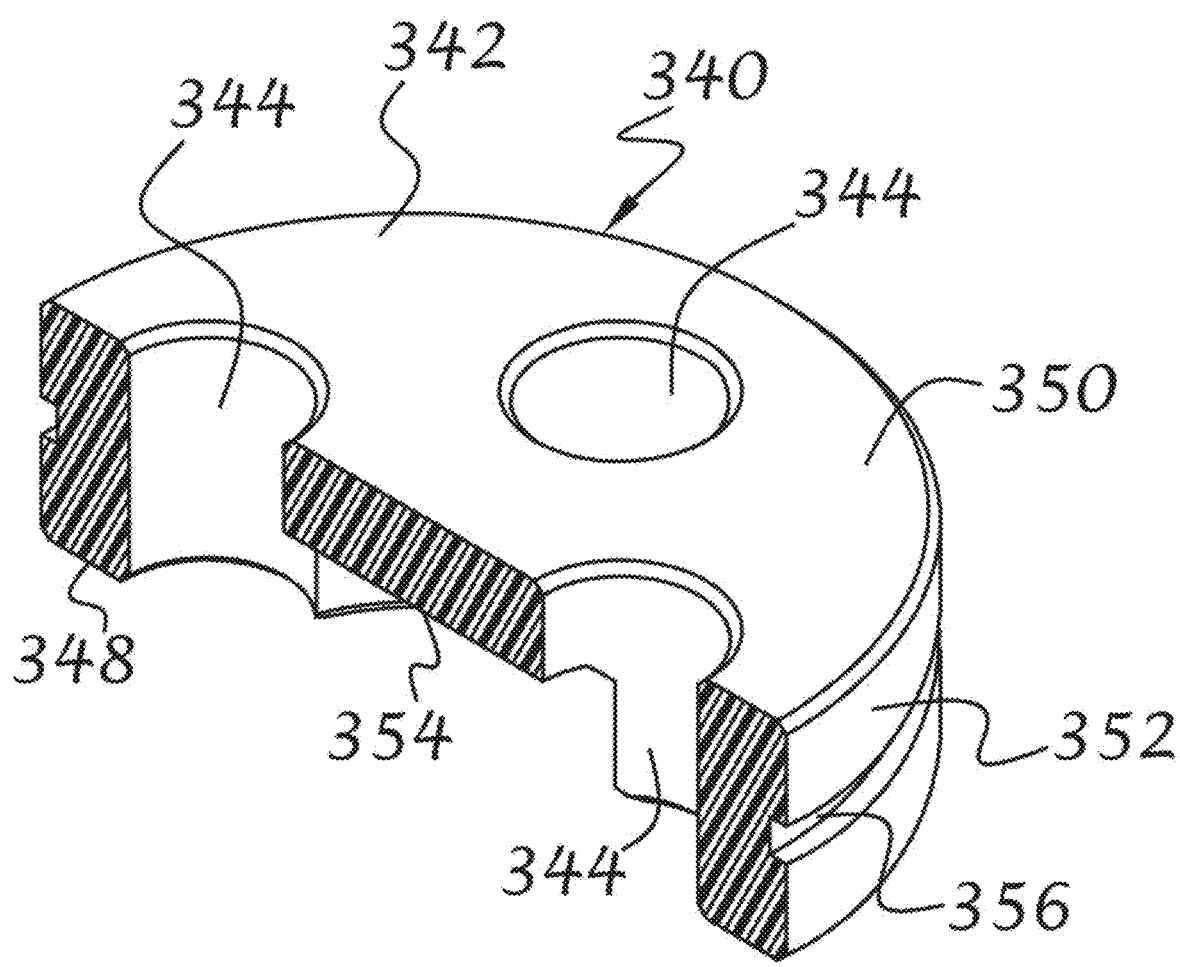
FIG. 17 is a sectional view thereof taken along line 17-17 of FIG. 16.

The upper spacer 320 can include other features, such as a lower annular groove 336 (FIGS. 12 and 13) formed in the lower surface 334 of the upper spacer, and an upper annular groove 338 (FIGS. 10 and 11) formed in the upper surface 340 of the spacer 320. The lower and upper annular grooves have a diameter, depth, and width that serve to minimize or eliminate a measurable change in the impedance as the electromagnetic energy ramp, burst or pulse transitions between the electronics assembly and the upper spacer 320, and between the upper spacer 320 and the inner annular measurement space or volume 298 (FIG. 7) between the inner surface 297 of the outer elongate electrode 290 and the outer surface 299 of the inner elongate electrode 292. As shown in FIGS. 11 and 13, each annular groove 336 and 338 have a different diameter, but are similar in width and in depth. Preferably, the depth of each annular groove is approximately half the thickness of the upper spacer 320, as measured between the upper surface 340 and lower surface 334. In this manner, the combination of the dielectric constants of the upper spacer material, the air or vapor in the empty grooves, the reduced diameter of the inner electrode, as well as other impedance modifying features, ensure that changes in impedance from the reference nominal value in the annular space 298 are minimized in the area occupied by the upper spacer 320 to thereby minimize or eliminate return echoes during measurement.

The second annular measurement space or volume 298 (FIG. 6) formed between the inner surface 297 of the outer elongate electrode 290 and the outer surface 299 of the inner elongate electrode 292, in the absence of liquid or other material being measured, is normally filled with air or the gas(es) present in the atmosphere within which the elongate measurement probe 226 is immersed or located. For a liquid level transducer, the annular measurement space 298 can be filled with a combination of liquid and gas. The liquid normally would fill up the annular measurement space 298 from a lower end of the measurement probe 226 with air and/or a gaseous phase of the liquid filling in the annular measurement space 298 above the liquid.

An upper opening 335 and a lower opening 337 (FIG. 6) can be formed in the outer electrode 290 at upper and lower ends of the elongate measurement probe 226 for permitting the ingress and egress of liquid and/or gas into the inner annular measurement space 298 from a space or volume associated with a container, tank, or the like. The upper opening 335 serves to purge the annular measurement space 298 of gas as the probe fills up with liquid. The openings 335 and 337 can also be used for calibration purposes by inserting conductive or semi-conductive pins 339 (shown in phantom line) into the openings for example, to short the elongate electrodes 290, 292 or otherwise vary the impedance of the elongate measurement probe 226. With the distance between the calibration pins 339 being known, calibration and/or recalibration of the elongate measurement probe 226 can be obtained both at the place of manufacture and in the field by comparing a measured electronic distance between the pins 339 (dependent on the initial or calibrated time pulses between return echoes at the calibration pin locations) and the actual physical distance between the calibration pins, then adjusting system clock timing pulses to correspond with the actual physical measurement. In this manner, the TDR measurement system can be calibrated to a high degree of accuracy without the need for expensive calibration equipment. A method of calibrating the TDR measurement system will be described in greater detail below.

As with the first embodiment, it is within the purview of the invention to allow the measurement of two or more immiscible liquids, such as the level of both diesel fuel and water that may be located in a fuel tank. Likewise, the present invention can measure the level or height of materials having different dielectric constants, measuring the dielectric constants of materials based on the velocity of the electrical electromagnetic energy pulse traveling through the material(s) being measured, as well as linear movement between two objects, as will be described in greater detail below.

The default reference material and phase of that material (such as air for example) within the inner measurement space between the elongate electrodes will largely determine the nominal impedance value (NIV) of the elongate measurement probe used as a reference against any anomalies that may occur to disturb that value, such as the presence of liquids, solids, powders, and so on. Accordingly, the upper spacer 320 is preferably formed with various features, along with the reduced cylindrical section 316 and O-ring material, to thereby ensure that the NIV of the upper spacer 320 and related features approximates the NIV of the measurement probe in the absence of measurable materials and material states, to thereby substantially reduce or eliminate any return echo from such an anomaly, and allow the measurement of liquid or material height in close proximity to the upper spacer 320. The ranges of suitable nominal impedance values as discussed above are also applicable to the present embodiment and therefore will not be further elaborated on.

It will be understood that the upper spacer 320 can be constructed of other materials or a combination of materials without departing from the spirit and scope of the invention, so long as any echo caused by the upper spacer 320, the O-ring material, and other impedance-modifying features, is sufficiently small to ensure that echoes caused by different materials being measured between the electrodes in the inner annular measurement space 298 can be recognized, even in close proximity to the upper spacer 320. By way of example, when it is desirous to measure liquid level within a tank or container, the use of a material for the upper spacer 320 that minimizes or eliminates a return echo caused by the upper spacer and any components, such as the O-rings, connected to the upper spacer, ensures that a return echo caused by an upper surface of the liquid proximal to the upper spacer 320 can be recognized. In this manner, the amount of probe length for measuring liquid level is maximized, while manufacturing costs associated with the transition area between the electronics assembly and the elongate electrodes, including the upper spacer 320, O-rings, and other impedance modifying features, are significantly reduced over prior art solutions.

Although the preferred embodiment of the upper spacer 320 substantially reduces or eliminates a return echo so that further return echoes are not rejected or overpowered by a return echo at the upper end of the measurement probe 226, in some applications, it may be desirable to create an anomaly in the vicinity of the upper spacer 320 that will in turn generate a return echo having a repeatable signature, when it is desirous, for example, to calibrate a distance between the PCB-inner electrode transition and a point along the height or axial extent of the upper spacer 320, such as the top and/or bottom of the upper spacer for calibrating the probe 226 for example. Since the height of the spacer 320 between the upper and lower surfaces is known, calculating a value "X" as shown in FIG. 7 for example, which includes the height or thickness of the spacer 320 as well as any resilient layer 323, which also has a known thickness, it is possible to adjust a clock timing associated with a processor, by comparing a calculated distance with the known physical distance between return echoes from the top of the resilient layer and/or upper spacer, and the bottom surface of the upper spacer. Since a known number of clock cycles can be determined between the return echoes associated with the distance "X", it is possible to determine a clock calibration factor so that the measured distance equals the known distance. It is also possible to subtract the distance "X" (FIG. 7) from a liquid height measurement within the measurement probe 226, for example, in order to determine a distance between the lower surface of the upper spacer and the liquid surface.

As shown in FIGS. 5, 6, and 14-16, a second, or lower, spacer 340 is located in the inner annular measurement space 298 of the elongate measurement probe 226 at a lower end thereof between the inner surface 297 (FIG. 6) of the outer electrode 290 and the outer surface 299 of the inner electrode 292.

In accordance with one embodiment of the invention, the lower spacer 340 is constructed of a conductive or semi-conductive material and configured to create a short across the inner and outer electrodes 290, 292 to thereby produce a large anomaly and thus a return echo with a large negative slope during operation to signify the end of the measurable length of the probe 226.

In accordance with a further embodiment of the invention, the lower spacer 340 is constructed of an insulating material and configured to isolate the inner and outer electrodes, to thereby produce a large anomaly and thus a return echo with a large positive slope during operation to signify the end of the probe.

In accordance with yet a further embodiment of the invention, the lower spacer 340 is constructed of a material similar to the upper spacer 320 and configured to minimize or eliminate any anomalies and thus minimize or eliminate the creation of any return echo that might signify the end of the measurement probe.

In accordance with another embodiment of the invention, the lower spacer 340 is constructed of a semi-conductive material and configuration to create a small anomaly and thus a small return echo with a small positive or negative return echo to signify the end of the measurement probe. With this last embodiment, measurement of liquid or material level in close proximity to the lower end of the measurement probe can be realized without interference from a larger end-of-probe return echo.

The lower spacer 340 includes a circular body 342 with an upper surface 348, a lower surface 350, and a side surface 352 that extends between the upper and lower surfaces. Openings 344 extend generally axially through the body 342 between the upper surface 348 and lower surface 350. The openings 344 surround a center depression 346 that is formed in the upper surface 348 and has a lower depression surface 354 that receives the lower end 355 (FIGS. 5, 6) of the inner electrode 292. The openings 344 are preferably arranged so liquid or other material from a container 214 (FIG. 4) or the like can enter the inner annular measurement space 98 for monitoring liquid level and/or other properties of the liquid by the TDR measurement system 210. An annular groove 356 is formed in the side surface 352 for receiving an O-ring (not shown) to seal the lower spacer 340 against the inner surface 297 of the outer electrode 290. The lower spacer 340 can be installed in the outer electrode 290 and over the inner electrode 292 through press-fitting, mechanical fastening, adhesive bonding, or other known connecting means.

Although one configuration of the lower spacer 340 has been shown, it will be understood that the lower spacer 340 can have many different configurations to accommodate a particular material to be measured, a desired return echo profile or elimination of a return echo at the lower end of the measurement probe, as discussed above. It will be further understood that the lower spacer 340 can be eliminated, so long as the inner and outer electrodes are adequately supported, for example as previously described with the provision of one or more intermediate spacers 150 (FIG. 3).

Referring now to FIG. 7, a TDR measurement system 210A is configured as a linear measurement probe with the elimination of the lower spacer 340 of the TDR measurement system 210, and the addition of a hollow shaft 360 that surrounds the inner electrode 292 and fits within the inner measurement space 298 of the elongate measurement probe 226A, which is similar in construction to the elongate measurement probe 226. A plunger 362 can be provided at the upper or inner end 363 of the shaft for creating a large anomaly within the measurement space 298, which in turn creates a return echo large enough to be recognized as the position of the top surface 364 of the plunger 362. The shaft 360 and plunger 362 can be integrally formed during manufacture and constructed of a material, such as a conductive or semi-conductive material that has a dielectric different than the air or other fluid within the measurement space 298. In this manner, the change in dielectric constants between the air and the plunger that causes the creation of a sufficiently large return echo, which can be identified as a valid return echo. It will be understood that the plunger 362 can be eliminated, especially when the shaft itself causes a sufficiently large return echo.

In use, as the shaft moves in and out of the inner measurement space 298, as represented by the double arrow 366 in FIG. 7 the location of the return echo will change accordingly. Such location can be monitored in real time and used to control relative movement of two objects. For example, the outer electrode or the mounting head can be adapted for mounting to one object, and the shaft can be adapted for mounting to another object. When movement between the objects occurs, the Transducer 210A can identify the movement to a very high degree of accuracy and relay information related to the movement such as distance, speed, and acceleration, which can be used for machine control in automated assembly lines and robotics, for example, or anywhere the measurement of linear motion is desired, to be identified.

With particular reference to FIGS. 18A and 18B, the PCB 58 includes various electronic components 361, such as capacitors, resistors, inductors, one or more processors, amplifiers, diodes, transistors, comparators, and so on, as will be described in further detail below, arranged at various positions on the upper surface 111 and/or lower surface 113 (FIGS. 3, 6 and 7) of the PCB 58. As shown in FIG. 18B, a calibration trace 365 is formed on one of the surfaces 111, 113, and/or intermediate surface(s) or layer(s) 119 of the PCB 58, it being understood that the intermediate layer 119 can represent one or more internal layers and/or surfaces associated with one or more intermediate layers between top and bottom layers in a multi-layer PCB. When formed on one or more internal surfaces or layers 119 (FIG. 3), the calibration trace can be isolated from other electronic traces, so that a dedicated surface or layer for the calibration trace 365 is provided. In accordance with one exemplary embodiment of the invention, the calibration trace 365 extends across a substantial area of the PCB between a first end 369 and a second end 371 of the calibration trace, so that the calibration trace is approximately the same length of the measurement probe 26. With the calibration trace being approximately equal in length to the measurement probe 26, the actual distance measurement can be determined without the cumulative errors associated with a much shorter calibration trace. By way of example, if the elongate measurement probe is approximately two feet in length, it is preferred that the calibration trace also be approximately two feet in length. If the measurement probe is one foot in length however, a two-foot long calibration trace will increase the accuracy of measurement even more. In this manner, high accuracy can be achieved with the measurement of liquid level, granular material level, linear movement or distance between the plunger 362 (FIG. 7) and the measurement probe 226, the dielectric constant of the material being measured, and so on.

With the size of the PCB being limited to fit within a housing or chamber of a particular size, the length of the calibration trace can greatly vary, and need not be approximately equal to the length of the measurement probe. By way of example, the calibration trace can range between about 0.1 inch to over 100 inches or even much greater lengths depending on the dimensional constraints of the PCB, how many intermediate or other layers the calibration trace is divided between and connected via conductive thru-holes to maximize the length of the calibration trace, as well as the width of the calibration trace, and the spacing between rows of the calibration trace. Likewise, the length of the measurement probe can range anywhere from 0.25 inch to over 100 yards or even extend to much greater lengths. Accordingly, although in one exemplary embodiment it is preferred that the calibration trace length and measurement probe length be approximately equal, it will be understood that the invention is not limited thereto, but the overall length of the entire waveguide or transmission line, which includes both the calibration trace and the elongate electrodes, can greatly vary depending on the measurement constraints of a particular installation or application of the TDR measurement system and the size limitations of the PCB as dictated by the configuration of the mounting head or other housing or structural limitations for receiving the PCB.

In order to facilitate description of the invention, the calibration trace 365 will be described as being associated with the intermediate layer or surface 119 (FIG. 3), it being understood that the configuration of the calibration trace can greatly vary. The first end 369 of the calibration trace 365 is connected to the electromagnetic pulse generating circuitry of the electronics assembly 34 so that the electromagnetic pulse is transferred onto the calibration trace 365 and travels along its length toward the second end 371. The second end 371 of the calibration trace 365 is connected to the third conductive opening or thru-hole 108 so that the electromagnetic pulse travels along the length of the inner electrode 92, 292 and returns along the outer electrode 90, 290. The calibration trace together with the inner and outer electrodes defines a waveguide or transmission line along which the electromagnetic pulse propagates during transmission thereof.

The physical length of the calibration trace is known and can be used in conjunction with the measured electronic length of the calibration trace to calibrate the clock cycle of the microcomputer 83 (FIG. 20) or other processing means, and thus the electronic length of the calibration trace so that accurate distance to an anomaly (such as the change in dielectric constants between media) within the elongate measurement probe 26, 226 can be determined. One or more predefined anomalies can be inserted or created at one or more locations along the calibration trace to thereby create one or more calibration trace return echoes for calibrating the transducer to a high degree of precision.

In accordance with one embodiment of the invention, the inserted anomalies or discontinuities can be mechanical in nature, such as a change in the width or thickness of the calibration trace, a transition between the calibration trace and one or more of the elongate electrodes (and thus a discernible change in dielectric properties), and the inclusion of one or more spacers in the volume between the inner and outer electrodes at predetermined locations, which will change the dielectric constant whether immersed in air or liquid.

In accordance with a further embodiment of the invention, the inserted anomalies or discontinuities can comprise one or more electronic components, such as transistors, biased diodes, switches, and the like, associated with the calibration trace and/or electrodes that can be selectively activated and deactivated either manually or automatically through processor control, at intermediate and/or end locations along the calibration trace 365 and/or electrodes to thereby create one or more identifiable return echoes that can be used for calibrating a clock or the like associated with the microcomputer.

No matter what embodiment is used for identifying one or more points along the transmission line, including the calibration trace and/or the electrodes, including a combination of mechanically- and electrically-induced calibration anomalies, the one or more calibration anomalies can be used for calibrating the clock or the like associated with the microcomputer, as well as timing circuitry associated with generating transmit and receive signals, as will be described in greater detail below, for electronically determining a start point, intermediate point, and/or end point of the calibration trace 365, as well as the distance(s) therebetween. The start, intermediate, and/or end point(s) of the electrodes can also or alternatively be calibrated to correlate the actual length of the calibration trace (or electrodes) with the measured electrical length. In this manner, the physical length between the known induced calibration anomalies, which can include a predefined length of the waveguide or transmission line, such as a portion of the calibration trace or the entire length thereof, the combination of the calibration trace and electrodes or portions thereof, and so on, is correlated with the electronically measured length between the induced anomalies (the "electronic length") as determined by the distance between the return calibration echoes, to ultimately attain high accuracy and repeatability in measurement of the medium between the elongate electrodes.

In accordance with a preferred embodiment of the invention, the physical length of the calibration trace is approximately equal to the physical length of the elongate electrodes. In this manner, greater measurement accuracy of the medium under consideration over prior art transducers can be achieved. However, it will be understood that the length of the calibration trace is not limited to the length of the measurement probe or electrodes, but can be of any reasonable length to obtain acceptable measurement accuracy in accordance with standards dictated by different industries. For example, measurement of liquid level within a fuel tank may be held to a lower level of accuracy than measurement of linear movement between critical components in machining operations. Accordingly, the length of the calibration trace and/or the distance between induced anomalies associated with the calibration trace can be selected to meet, exceed, or even greatly exceed industry standards without an increase in manufacturing costs.

Figure 7A:
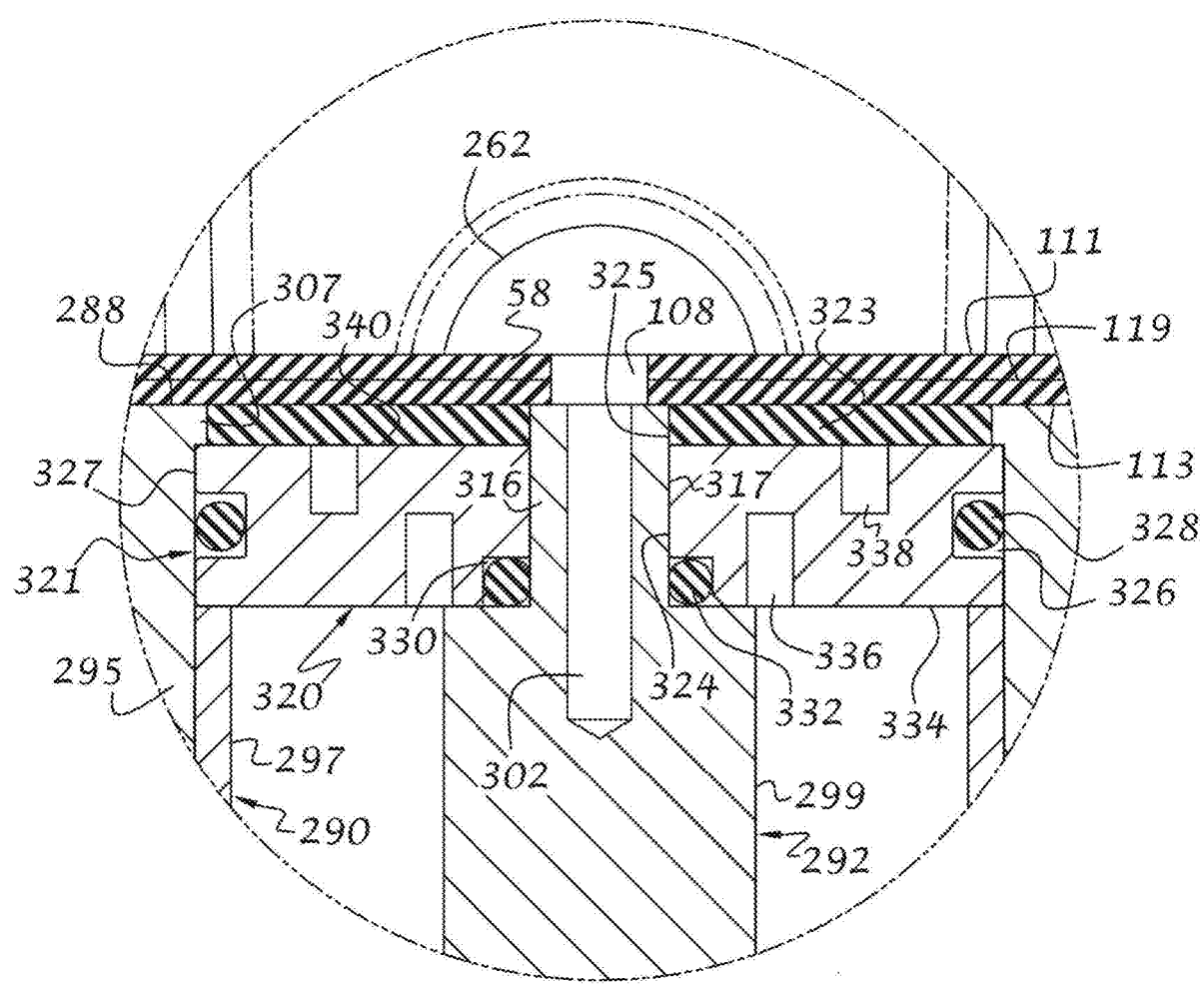
FIG. 7A is an enlarged sectional view of an upper area of the elongate measurement probe and mounting head taken along line 7A-7A of FIG. 7, with an upper spacer thereof shown in different cross-hatching for demonstration of different materials that can be used and for clarity in numbering of the various elements.
Figure 19:
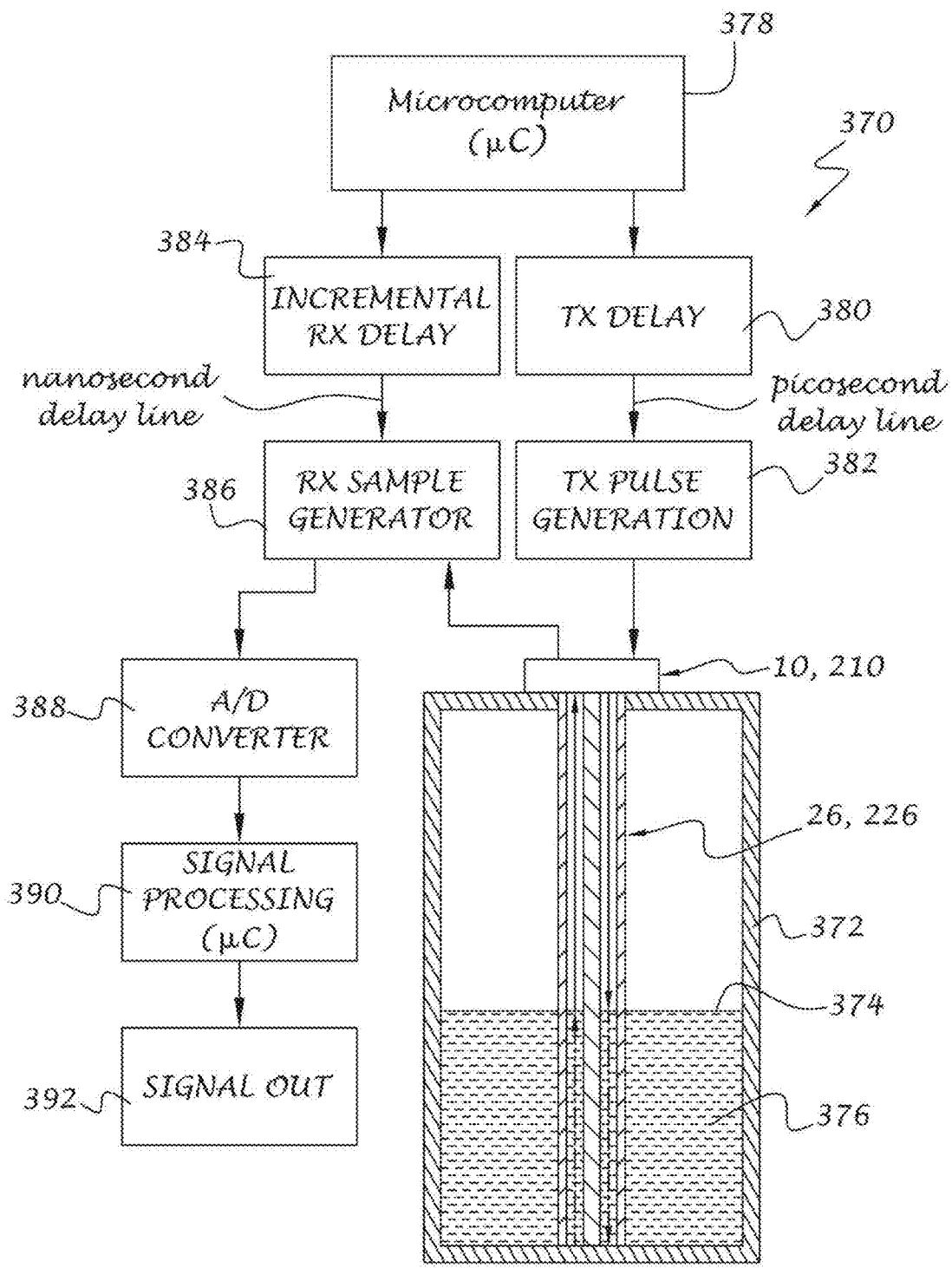
FIG. 19 is a schematic block diagram illustrating the relationship between the electronic circuitry and the measurement probe of the TDR measurement system mounted in a tank or container for determining liquid level and/or other conditions in accordance with the invention.

Referring now to FIG. 19, a simplified schematic block diagram 370 showing the basic relationship between components of the electronics assembly 34 and the measurement probe 26 and 226 of the TDR measurement system 10 and 210, respectively, mounted in a tank or container 372 for determining the level 374 of liquid 376 within the container, as well as other conditions, in accordance with the invention is illustrated. As shown, block 378 is representative of a microcomputer (U1 in FIG. 22) which includes the microcomputer 83 (FIG. 20). The microcomputer is in turn connected to analog circuitry 380 associated with the generation of a transmit (TX) pulse delay (block 380) and the generation and transmission of an electromagnetic pulse (block 382), along the length of the measurement probe 26, 226 for the purpose of determining material height or liquid level within the inner annular measurement space or volume 98, 298. As will be described in greater detail below, the transmit pulse occurs with picosecond resolution, which can be performed by the calibrated clock timing of low-cost processors, microcomputers, or the like. The processor is also connected to analog circuitry (block 384) for generating an incremental receive (RX) delay signal upon receipt of a RX generation signal from the microcontroller with nanosecond resolution. The Incremental RX Delay circuitry is in turn connected to analog circuitry (block 386) for generating a sample receive (RX) signal which in turn collects a sample reading or signal from the electromagnetic pulse traveling along the calibration trace 365 associated with one of the layers of the PCB 58, such as intermediate layer or surface 119 (FIGS. 7, 7A, 18B) and along the measurement probe 26, 226 (FIGS. 1, 4). The nanosecond resolution is preferably generated by the analog circuitry associated with block 384 to permit the use of a low-cost microcomputer. Once an analog measurement signal is received at block 386, an analog to digital (A/D) converter (block 388) associated with the microcomputer converts the signal into digital form for further signal processing at block 390. Signals indicative of liquid level or other material level, linear movement, and so on, can then be stored in memory associated with the microcomputer and sent to a display or further processing circuitry and/or routines for displaying and/or analyzing the signal, as represented by block 392.

It will be understood that the term "microcomputer" as used herein is not limited to a single system on a chip (SoC) device with one or more central processing unit(s) (CPU's), onboard memory (RAM, ROM, etc.), timers, ports, D/A converters, and so on, but can include a separate processor or processing unit that interfaces with analog and/or digital components required to execute one or more instructions of a software program for operating the TDR measurement system, including the generation of one or more analog and/or digital signals associated with electromagnetic pulse transmission and/or reception at various times (and thus locations) along the length of the TDR measurement system for determining liquid level, material height, linear movement, and so on.

Accordingly, the present invention is not limited to a single type of processing unit but can include any suitable processing means including microprocessors, microcontrollers, microcomputers, processors, programmable logic chips (PLC's), ASIC devices, and/or processing systems in digital and/or analog form so long as one or more of the various tasks associated with measuring the impedance at various locations along the calibration trace and/or along the measurement probe of the TDR measurement system and translating the resultant return echo signals into measurement values can be performed at least in part. Electronic components such as internal and external memory for storing program instructions and data, external and internal timers, D/A converters, and so on, can be provided as integral and/or separate components and connected in a well-known manner for operation of TDR measurement system. Hence, it will be understood that the invention is not limited to one type of processor or processing means for executing one or more instructions and/or timer and/or control functions, but may include any equivalent structure and/or programming that changes the structure of the processor, memory, and/or processor components to accomplish, at least in part, one or more of the required tasks.

Figure 22:
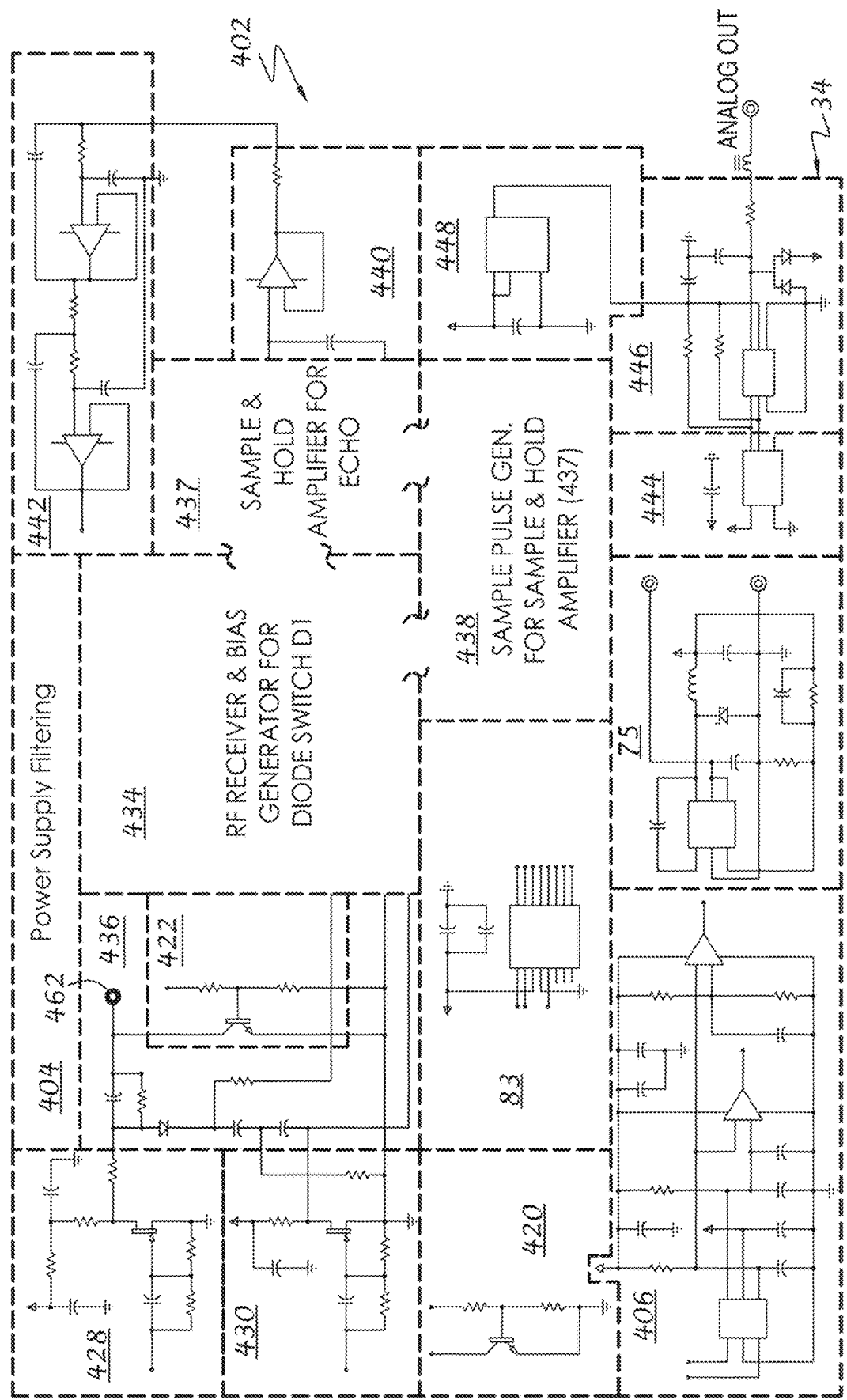
FIG. 22 is a schematic of electronic circuitry of the TDR measurement system in accordance with an exemplary embodiment of the invention divided into modules or sections in broken line to facilitate the description thereof.

Referring now to FIGS. 20 and 22, a more detailed block diagram 400 (FIG. 20) and schematic 402 (FIG. 22) of the electronics assembly 34 of the TDR measurement system in accordance with an exemplary embodiment of the invention is illustrated. In FIG. 20, the electronics assembly 34 includes a plurality of different electronics modules that interface with the microcomputer 83 (U1) for operating the TDR measurement system. One of the modules includes the power supply 75 which, in accordance with an exemplary embodiment of the invention, receives an approximate range of power supply inputs between about 7 VDC and about 32 VDC, which is typically provided by the vehicle, machine, system, or other mechanism associated with the TDR measurement system, and converts the input supply voltage to 5 VDC operating output voltage to power the various electronic components of the electronics assembly 34. It will be understood that the power supply module 75 is not limited to the particular supply ranges or the operating voltage as described, but may greatly vary depending on the power available from the vehicle, machine, system, or other device, as well as the required operating voltage of the various electronic components associated with the electronics assembly 34 of the invention.

Since the TDR measurement system may be used by vehicles or machines with undesirable electrical noise, such as voltage spikes and variations, transient voltages, EMI, back EMF, and so on, that could render inoperative one or more modules of the electronics assembly 34, a power regulator and filtering module 404 can be provided along with the power supply 75 to ensure a stable supply voltage to the electronics and protect the electronics from the undesirable electrical noise. Since the electronics of the power regulator and filtering module 404 are known and may greatly vary depending on the particular vehicle, machine or system associated with the TDR measurement system and the presence or absence of undesirable electrical noise, the power regulator and filtering module will not be further described. However, where electrical noise is filtered elsewhere, and/or a stable power supply is available, the module 404 or portions thereof can be eliminated.

An Equivalent Time Sampling (ETS) Delay Generator module 406 is connected to the microcomputer 83 (U1) via a general interface module 408. The interface module 408 can include bus strips (or the like) for providing power to one or more of the modules, communication between the microcomputer 83 and one or more of the modules, direct and/or indirect communication between modules, as well as passive and/or active components for amplifying, filtering, buffering, converting signals between analog and digital states, or otherwise modifying signals associated with the modules and the microcomputer.

Figure 26:
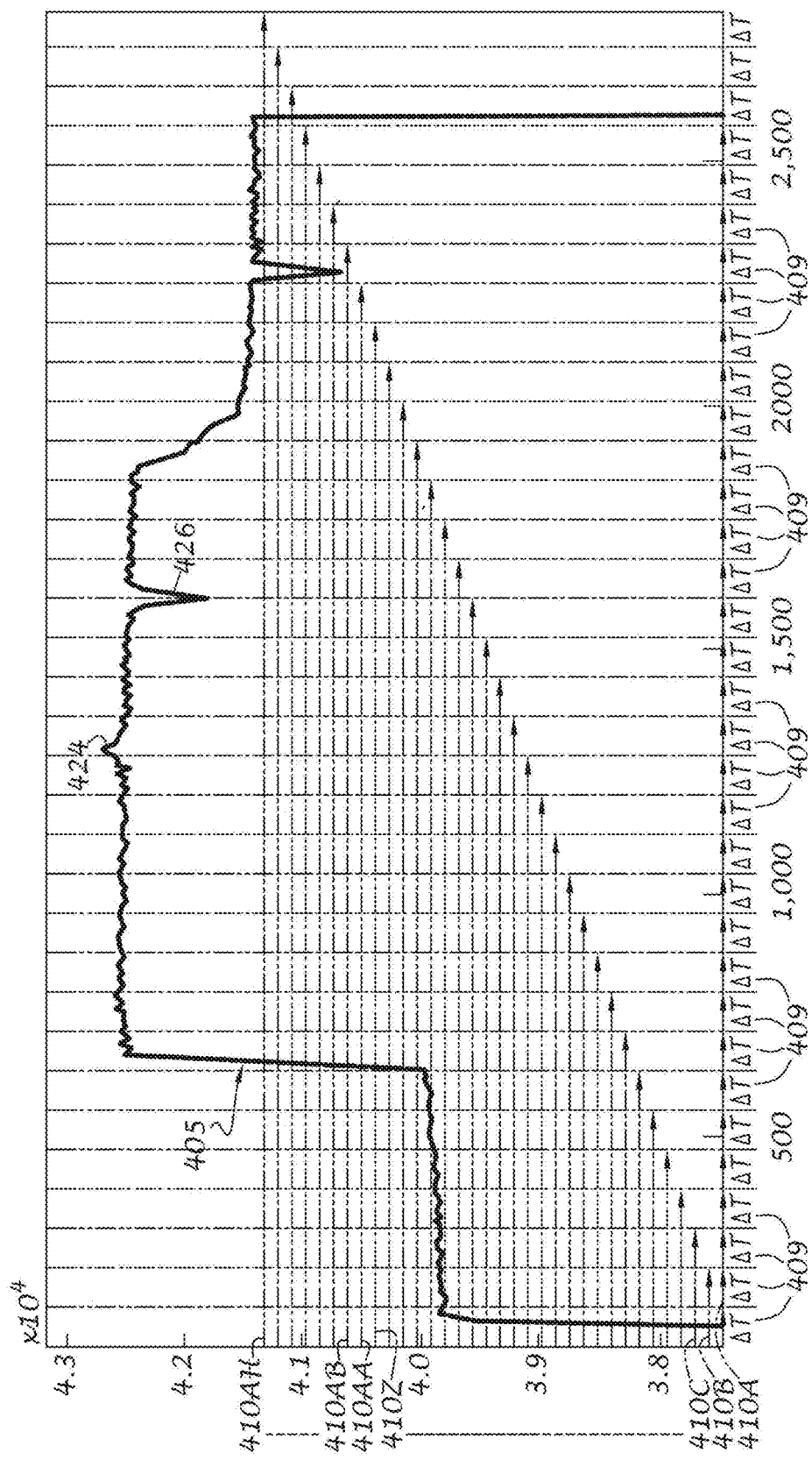
FIG. 26 is a graph illustrating an exemplary measurement curve tracing method in accordance with the invention for the TDR measurement system.

The module 406 generates an incremental delay needed for equivalent time sampling (ETS) of an electromagnetic pulse transmitted many times during a single measurement cycle. The module 406 includes provisions for highly accurate timing associated with actuating the firing of many pulses during a measurement cycle that propagate along the waveguide to create an echo profile 405, as shown in FIG. 26 for example, and for actuating the receiver for sampling (and holding) data associated with the echo profile created by each transmitted pulse.

One salient feature of the invention is the capability of initially receiving data prior to actuating the transmission of electromagnetic pulses so that the echo profile can be measured before the first pulse is transmitted and propagated along the waveguide, thereby ensuring the beginning of an echo profile 405 (FIG. 26) or echo profile 407 (FIG. 27) for example, can be received and analyzed. As more and more pulses are fired in quick succession, the timing at which the data is received gradually changes from receiving data before pulse transmission to receiving data after pulse transmission. In this manner, data associated with the end of the echo profile after the last pulse transmission can also be received and analyzed. Accordingly, the entire echo profile 405 or 407 for example, from before the first pulse transmission to after the last pulse transmission, representative of the impedance of the TDR measurement system along the entire length of the waveguide, can be received during a single measurement cycle for determination of liquid level and other measurable conditions. Preferably, several measurement cycles of plural transmissions are also performed and averaged or otherwise statistically combined for increased reliability of the measurement data.

Figure 27:
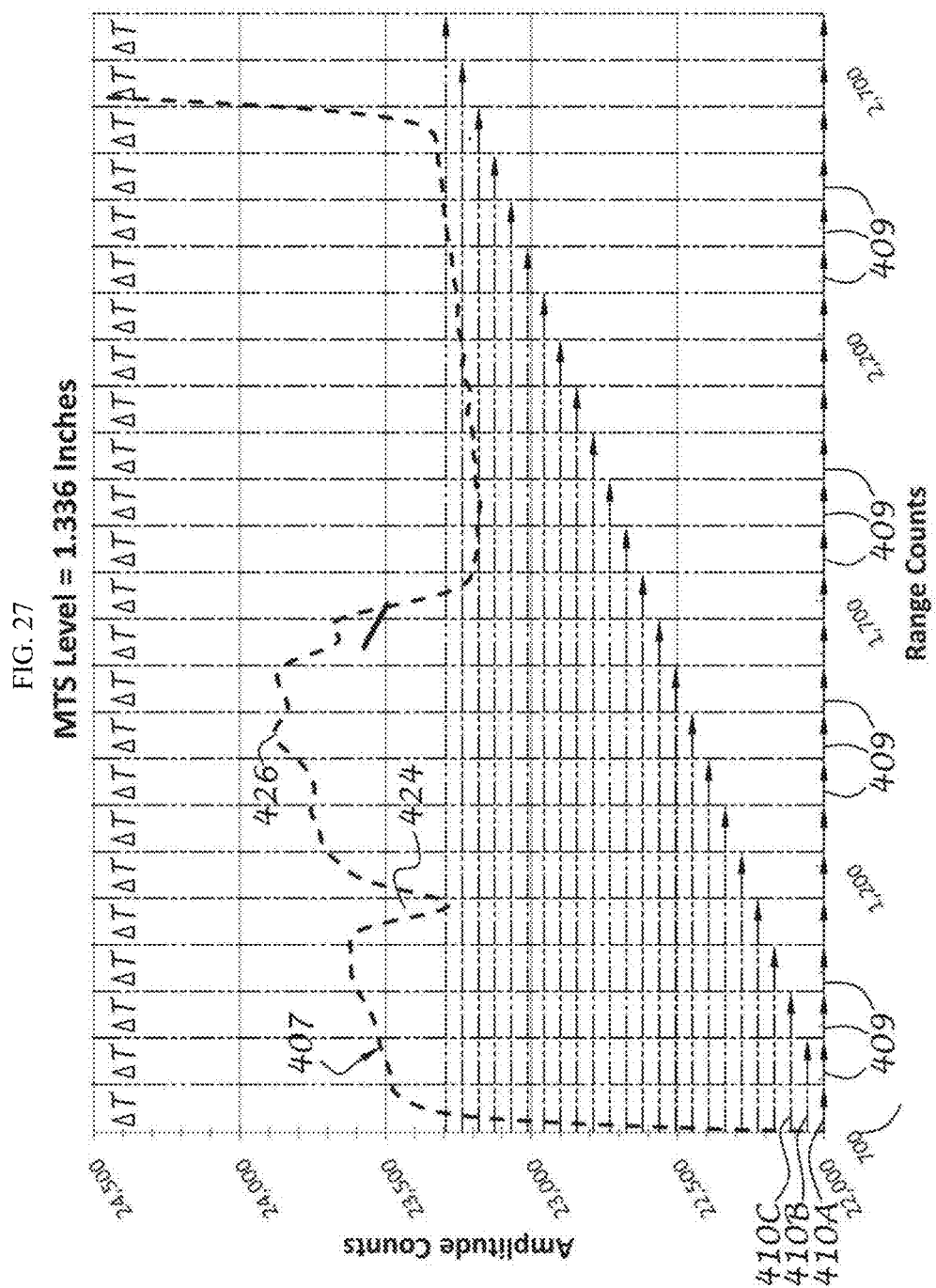
FIG. 27 is a graph similar to FIG. 26 illustrating the curve tracing method of the invention with a different measurement curve reflective of different material properties and/or a modified probe configuration.

The ETS module 406 generates both a transmit timing signal for generating the electromagnetic pulse on the waveguide, and a receive timing signal for actuating receipt of a single data point along the echo profile during a single transmission. Each subsequent transmitted pulse increases by a predetermined time interval or segment ΔT, designated as numeral 409 (FIGS. 26, 27) longer than the preceding pulse, to thereby generate and capture a data point representative of the impedance and change in impedance at a particular position where the data point is captured along the waveguide, including the calibration trace 365 (FIG. 18B) and/or the elongate electrodes 90 and 92 (FIG. 3) or 290 and 292 (FIG. 6). This is most clearly shown in FIGS. 26 and 27 for example, where the increasingly longer time intervals, represented by arrows of increasing lengths or multiples of the time interval ΔT at 410A, 410B, 410C, . . . , 410Z in FIGS. 26, and 410A, 410B, 410C, and so on, in FIG. 27. Arrow 410A represents the shortest time interval ΔT at the beginning of a measurement cycle, while arrow 410W in FIG. 26 and arrow 410AH in FIG. 27, represents the longest time interval comprising the sum of multiple time intervals, where the last data point associated with the radar reflection along the waveguide is captured. FIGS. 26 and 27 represent different time intervals or segments for ΔT, with FIG. 27 having more transmit pulses than FIG. 26, so as to illustrate the flexibility of the invention.

Figure 23:
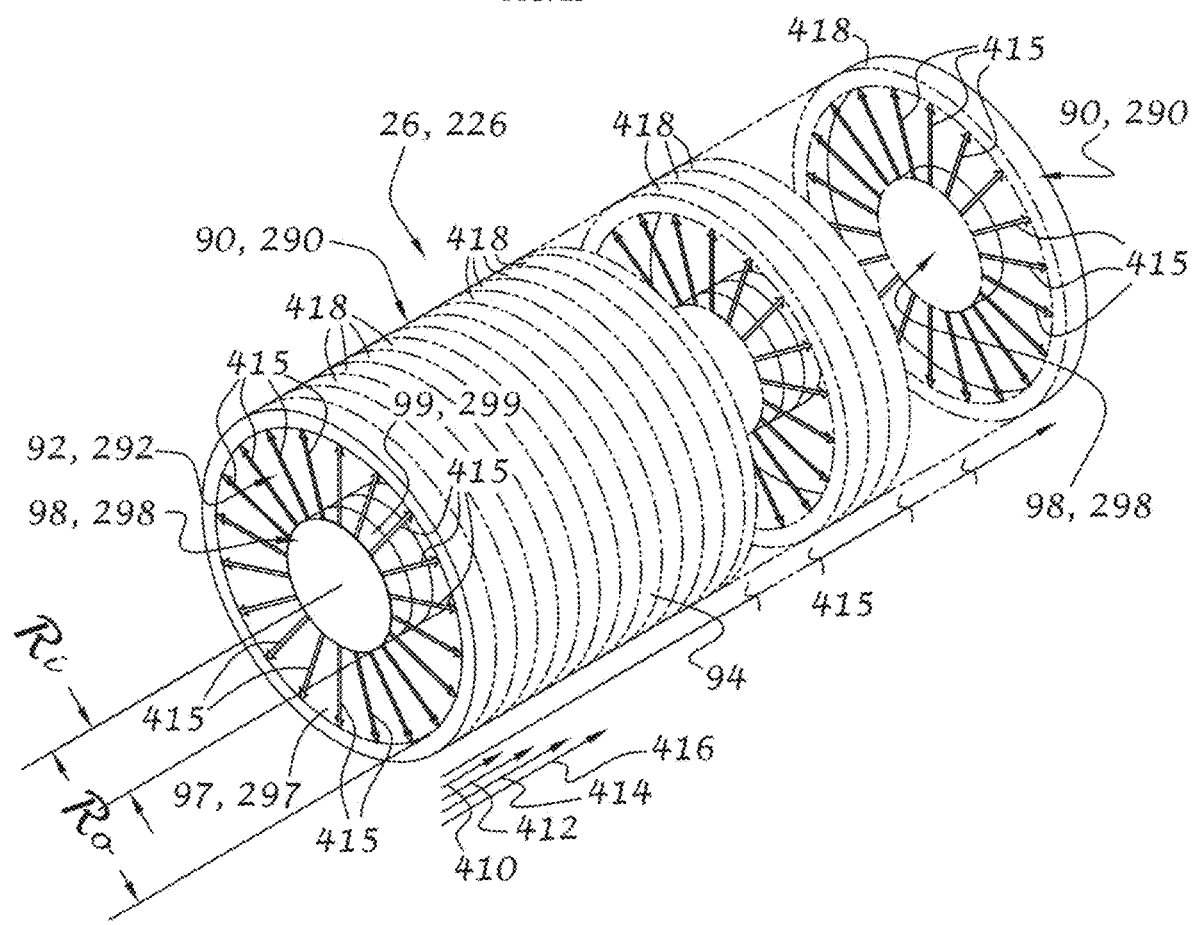
FIG. 23 is a representative isometric cut-away view of the elongate coaxial measurement probe electronically sliced in increments of time (or equivalent distance) to illustrate unobstructed current flow between inner and outer elongate electrodes and an exemplary method of receiving electronic measurement data at predefined intervals to thereby construct a measurement curve of the probe including any materials located within the coaxial elongate electrodes for determining liquid level or any other material properties.

In order to further illustrate the invention, FIG. 23 shows the outer and inner electrodes sliced into time segments or intervals 418 of ΔT duration, which represent distance segments based on the speed of the electromagnetic pulse along the electrode, which is in turn dependent on the dielectric value of the air, fluid, or solid material located in the annular inner measurement space 98, 298. Each subsequent transmission increases the transmission time by increasing multiples of ΔT, as represented by arrows 410, 412, 414 and 416, for example, to create the imaginary slices or segments 418 representative of distance traveled along of the inner and outer electrodes for multiple transmissions during a measurement cycle where data points associated with the localized impedance associated with each segment or slice can be gathered. The impedance value associated with each transmission is dependent on the localized dielectric constant of the air, fluid or solid material located in the space 98, 298 between the electrodes at the imaginary sliced locations or segments. The impedance values are generated during transmission and collected during reception to determine the level of liquid or other measurable properties of the media within the space 98, 298.

As shown, the energy of the electromagnetic pulse travels from the inner electrode 92, 292 to the outer electrode 90, 290 via the annular inner measurement space or volume 98, 298, as represented by radially extending arrows 415. The value of the impedance at any location or period of time along the length of the measurement probe can be expressed by the following formula:

$$\frac{C}{L} = \frac{2\pi k \epsilon_0}{\ln\left(\frac{b}{a}\right)} \quad (1)$$

Where: C is capacitance; L is unit length; k is the dielectric constant; $\epsilon_0$ is the dielectric permeability of free space (air in the space between the conductors=1); a is the inner radius of the outer electrode; and b is the outside radius of the inner electrode. When the elongate measurement probe is arranged generally vertically in a tank, and when liquid is located in the annular inner measurement space between the electrodes, part of the elongate measurement probe will be filled with liquid and cause a change in impedance beginning at the air/liquid interface. The change in impedance creates a return echo, where some of the energy of the electromagnetic pulse is reflected back to the electronics where it can be analyzed and determined whether the level of liquid has indeed been located, through known analysis techniques by examining the properties of the return echo, such as amplitude, area, and whether a return echo is expected at the determined distance along the waveguide comprising the calibration trace and the elongate electrodes.

Accordingly, each subsequent transmission during a measurement cycle captures a data point at a different location. For example, if the length of the calibration trace is 500 mm and the length of the elongate measurement probe is 500 mm, and 1,000 transmissions of electromagnetic energy pulses or bursts are activated during a measurement cycle, the distance between data points will be approximately 1,000 mm/1,000 transmissions=1 mm distance between data points. The segments 418 in FIG. 3 then represent 1 mm distance between measurements. Of course, the amount of transmissions, as well as the lengths of the calibration trace and electrodes can greatly vary. If for example 2,000 transmissions over the 1,000-mm total length occurs, the measurement resolution, or distance between transmissions, will be 0.5 mm. If 100,000 transmissions occur over the same length for example, 100,000 data points will be gathered with a resolution of 0.01 mm distance therebetween.

Furthermore, when the bursts of electromagnetic energy occur at a frequency of 2.4 Ghz for example, which is within the capabilities of very low-cost microcomputers having an internal clock, the microcomputer 83 is used in conjunction with the analog components of the module 406, to create first time intervals between actuating the receiver (RX) for receiving adjacent data points in the nanosecond range, and second time intervals in the picosecond range beyond the nanosecond range of each subsequent RX time interval for actuating the transmitter (TX) for transmission of the electromagnetic energy bursts. Actuating the transmitter picoseconds after receiver actuation allows data collection even before the first electromagnetic energy pulse occurs, as described above, to thereby collect data before, during, and after transmission of the electromagnetic pulse, as shown for example in FIGS. 26 and 27, as will be described in further detail below.

Thus, resolution of the TDR measurement system 10, 210 can greatly vary depending on the number of transmissions that will be actuated over the electronic length of the TDR measurement system. Other units of measure can be used without departing from the spirit and scope of the invention. More details of module 406 will be described below with reference to FIG. 22D.

A first calibration module 420 for generating a first calibration mark in the form of a first calibration return echo at a first location along the calibration trace 365 can be provided. Likewise, a second calibration module 422 can be provided for generating a second calibration mark in the form of a second calibration return echo at a second location along the calibration trace 365. Preferably, the first calibration mark is at an intermediate location along the length of the calibration trace 365, while the second calibration mark is at the end of the calibration trace 365 to mark the end of the calibration trace and the transition between the calibration trace and the elongate measurement probe 26, 226.

The first and second calibration modules 420 and 422, respectively, provide selectable first and second discontinuities, respectively, of predefined proportions to thereby selectively generate respective first and second calibration return echoes 424 and 426 (FIGS. 26 and 27) for example, during a calibration cycle, which can occur during each transmission, during each measurement cycle comprising a plurality of transmissions, or whenever it has been determined that a sufficient change in ambient temperature has occurred to affect the dielectric constant of the material to be measured, the clock timing from the microcomputer, and so on.

The first and second calibration echoes 424, 426 can be analyzed to determine the electronic distance therebetween, i.e. the electronically measured distance between the first and second calibration echoes, the slope between the echoes, the size and shape of the calibration echoes, the area under the calibration echoes, and so on, in order to correct for less accurate or inconsistent clock timing pulses associated with very low-cost microcomputers. Since the physical distance between the discontinuities is known, and the electronic distance can be measured, any discrepancy between the two values can be resolved to obtain highly accurate clock timing cycles that would exceed the accuracy of the clock pulses of much more expensive microcomputers. In this manner, the cost of the TDR measurement system can be significantly lowered by specifying in most cases very low-cost components for the electronics assembly 34.

It will be understood that one or more of the first and second calibration modules can be eliminated, especially when the distance between the start of the calibration trace 365 to the first or second selectable discontinuity is physically known and can be electronically measured to thereby correlate any discrepancies.

In accordance with a preferred embodiment of the invention, since the second calibration module 422 is located at the end of the calibration trace 365, it is advantageous to keep the second calibration module and eliminate the first calibration module 420 since the longer distance between the beginning of the calibration trace and the ending thereof would be expected to yield greater accuracy than the shorter distance between the first and second calibration modules. It will be further understood that more than two calibration modules can be provided when it is desirous to obtain a greater number of calibration points along the calibration trace 365.

A RF transmit pulse generator 428 is electrically connected to the ETS delay generator module 406 for imposing an electromagnetic energy pulse, preferably comprising a radio frequency (RF) energy pulse, such a radar energy pulse, on the waveguide including the calibration trace 365 and the measurement probe in accordance with the timing intervals established by the ETS delay generator module 406 and the microcomputer 83, as discussed above with respect to FIG. 23.

A RF receive pulse generator module 430 (FIG. 22) is electrically connected to the ETS delay generator module 406 for generating the RF receive pulse to collect data related to the RF energy pulse imposed on the waveguide comprising the calibration trace 365 and the measurement probe, including return echoes due to anomalies or discontinuities, changes in dielectric constant, and electrical shorts between the electrodes as discussed above, to signify the end of the calibration trace and/or measurement probe, for example, in accordance with the timing intervals established by the ETS delay generator module 406 and the microcomputer 83.

A RF receiver module 432 (FIG. 22) includes a RF bias generator 434 (FIG. 22) that is operably connected to a receive switch module 436 for biasing the module 434. The RF bias generator functions as a DC servo to maintain a constant bias on the receive switch module 436, resulting in constant sensitivity of the module 436 to the sample pulses and the received data generated by the imposed RF energy pulse.

The receive switch module 436 is operably connected to the RF receive pulse generator module 430 and controls when data is received in accordance with the timing intervals established by the ETS delay generator module 406 and the microcomputer 83.

The RF receiver module 432 is operatively associated with the RF receive pulse module 430 to generate a second sample pulse from the primary sample pulse associated with the RF receive pulse module 430. The second sample pulse allows the system to use a second track and hold amplifier module 437 which greatly amplifies the received signal upon actuation of a sample pulse generator module 438. The module 438 is operably associated with the receive pulse module 430 and the receive switch module 436 for greatly increasing the received measurement data signal from the receive switch module 436.

Details of the RF receiver module 432, including the RF bias generator 434, second track and hold amplifier module 437, and the sample pulse generator module 438, will not be described as they can be constructed of known analog components arranged in a circuit or the like for executing their respective functions. Such modules or components preferably work in conjunction with the analog circuitry associated with other modules of the electronics assembly 34, including the microcomputer 83 that interface with electronic components of the other modules or portions thereof for initiating and carrying out the functions of the RF receiver module 432 and its associated RF bias generator 434, track and hold amplifier module 437, and sample pulse generator module 438.

In accordance with a further embodiment of the invention, the receiver module 432, including at least a portion of one or more of the components or modules 434, 437, and 438, can comprise digital devices or components and arranged in a known manner to accomplish their respective functions. Such devices or components can also work in conjunction with the microcomputer 83 and/or with other circuitry for accomplishing their respective functions.

In accordance with yet a further embodiment of the invention, at least a portion of the receiver module 432, including the components or modules 434, 437, and 438, can be at least partially embodied as operating instructions associated with the microprocessor. Such instructions enable activation and deactivation of predefined ports associated with the microprocessor 83 for interfacing with the analog circuitry associated with other modules of the electronics assembly 34 and thus executing the equivalent functions of the RF receiver module 432 and its associated RF bias generator 434, track and hold amplifier module 437, and sample pulse generator module 438.

The microcomputer 83 can also be programmed with dedicated ports to generate one or more of the sample pulses, activate the second track and hold amplifier module 437, and/or programmed as software modules within the memory (not shown) of the microprocessor 83 for accomplishing similar purposes or functions.

A buffer amplifier module 440 is also operatively associated with the sample and hold module amplifier 437 and includes a high impedance input buffer amplifier for amplifying the received signal stored on a capacitor C35 of the module 440.

An analog low pass filter module 442 is operably connected to the A/D converter of the microcomputer 83, where the received signals are digitized for further processing in the microcomputer.

A temperature sensor module 444 is operatively associated with the microcomputer 83 for providing temperature compensation due to ambient temperature fluctuations to the system, which not only affects the mechanical dimensions of the compensation trace and the elongate electrodes of the measurement probe, but also the dielectric constant of the materials of the system as well as the medium or material(s) to be measured.

A D/A converter module 446 is operatively associated with the microcomputer 83 for converting a digital control signal output from the microcontroller to an analog control signal that can be used for operating one or more of the analog modules. The D/A converter module 446 can also be used for generating an analog signal from digital information stored in memory indicative of media or material condition, to thereby permit use of the TDR measurement system with analog indicator means, including visual and audio devices such as one or more indicator lights, gauges, buzzers, and so on. It will be understood that the module 446 can be eliminated when only digital signals and/or digital indicator means, such as digital displays or the like, will be used.

A voltage reference module 448 is operatively associated with the D/A converter module 446 for creating precision analog signals from the digital signal output of the microprocessor that can be used for operating one or more of the analog modules and/or generating an analog signal indicative of material condition, such as liquid level when the RF transducer is embodied as a liquid level measurement transducer, or linear travel between two objects connected to the transducer when embodied as a linear transducer. Other material conditions can also be communicated in analog form, as discussed above, for permitting a user, system, and so on, to receive, view, and/or interpret the information related to the material condition and perform further steps if needed.

Whether the output signals reflective of the material condition, such as liquid level or linear movement, be analog or digital, a hard-wired display 77 and/or a remote device linked wirelessly with the RF Transceiver 79, as previously described, can be used to relate the information indicative of liquid level, position, or other condition of the material between the elongate electrodes to a remote system or device.

Referring to FIG. 21, a block diagram of an independent communication device 450 for receiving and displaying measurement data from the TDR measurement system is shown. The device 450 includes a microcomputer 452 for processing signals received from a RF transceiver 454 operatively associated with the microcomputer 452 and in wireless communication with the RF transceiver 79 of the TDR measurement system, for receiving wireless signals indicative of the material level, condition, linear position, and so on, from the TDR measurement system. A display 456 is also operatively associated with the microcomputer 452 for displaying the material condition, and can display other information related or unrelated to the material condition. A user interface (UI) 458 can also be provided on the remote device 450 for changing display parameters, selecting data signals from other TDR measurement systems or other wireless devices, operating application specific programs associated with the TDR measurement system, and so on. A power supply 460 is also provided, such as a portable battery or the like, for powering the electronic components of the device 450. It will be understood that the RF transceiver 79 and the device 450 can be eliminated when the TDR measurement system is used exclusively in systems, machines, or the like where information is directly communicated through a hard-wired connection, as previously described.

Referring now to FIGS. 22 and 22A-22J, a more detailed description of the various electronic components of the modules of the electronics assembly 34, and their relationships, in accordance with an exemplary embodiment of the invention, will now be undertaken. FIGS. 22A-22J, in particular, are enlarged circuit diagrams of the different inventive modules of FIG. 22 to facilitate the more detailed description of the analog circuit elements of each module.

Figure 22A:
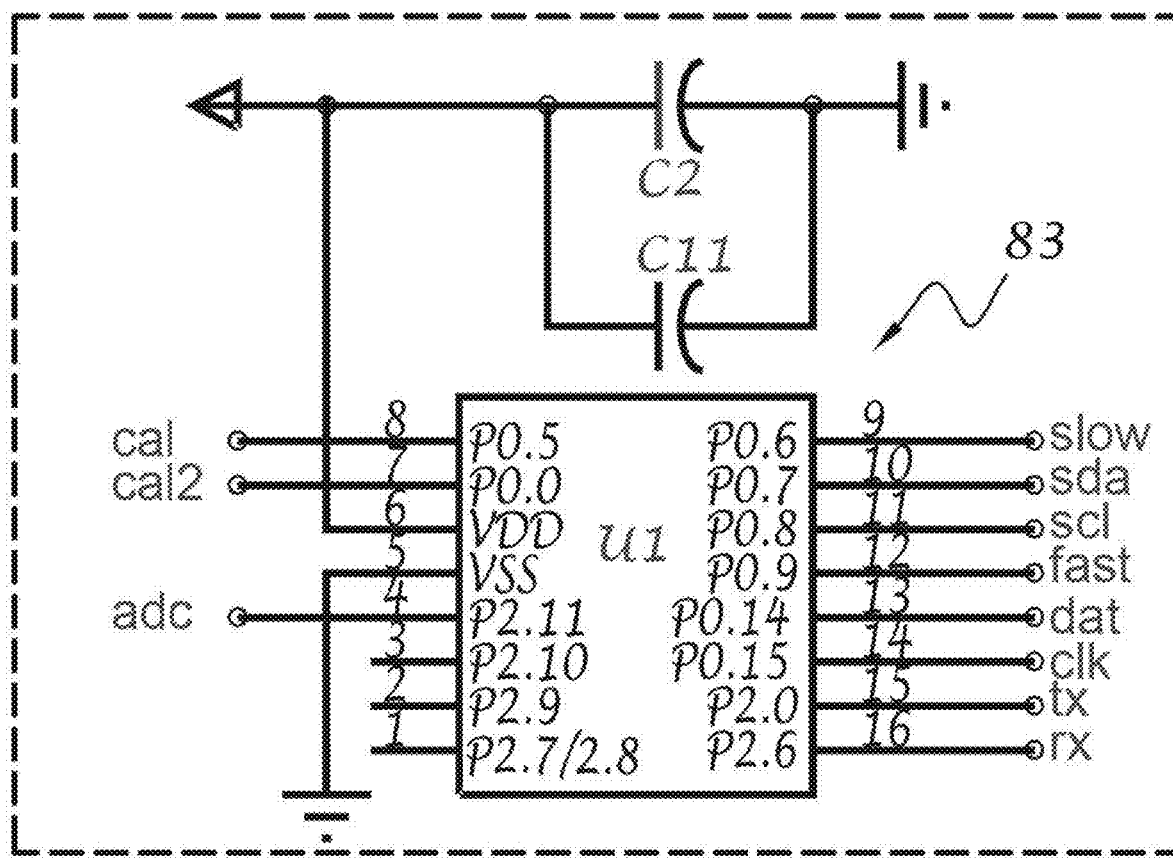

FIG. 22A is an enlarged schematic view of the microcomputer 83 and is designated as U1. As afore-mentioned, the microcomputer 83 is preferably very low in cost and therefore has limited computing capacity, clock function, a limited number of I/O ports for executing various functions in accordance with the invention in order to measure one or more properties of the medium being measured, including liquid level, linear movement, dielectric constant, and so forth. The functions are preferably embodied as computer-readable instructions of a software program or program segments stored in memory or the like and accessible by the CPU of the microcomputer 83 for executing the instructions and associated functions including, but not limited to, clock timing, calibration of the clock timing, calibration of the TDR measurement system, actuation and operation of electronic components and their related circuitry associated with other modules, data recording and retrieval, conversion between digital and analog signals and vice-versa, and so forth.

As shown in FIG. 22A, the microcomputer 83 includes power and ground ports labeled VDD and VSS respectively, for providing electrical power to the microcomputer. The microcomputer also includes an A/D converter input associated with port P2.11, a clock signal output at port P0.15, and various other ports that will be described in conjunction with the other modules. A power supply filter circuit comprising capacitors C2 and C11 in parallel between power and ground can also be included, it being understood that the filter circuit can greatly vary, as is well known, and can be eliminated when a stable power supply is available.

Referring now to FIGS. 22B, and 24-27, the ETS module 406 generates an incremental time delay for equivalent time sampling (ETS) of an electromagnetic pulse transmitted several times during a single measurement cycle. Each subsequent transmitted pulse increases by a predetermined time interval ΔT beyond the previously transmitted pulse so that each transmitted pulse is ΔT longer than the preceding pulse. As aforementioned, the term "pulse" as used herein refers to a distinguishable burst, ramp, wave, or other rapid change in electromagnetic energy, such as a change in amplitude or frequency of a signal imposed on the waveguide or transmission line of the TDR measurement system, e.g. that portion of the pulse that remains high during transmission, as shown in FIGS. 26 and 27 for example. Each measurement cycle has a duration T at least as long as the time required for the electromagnetic pulse to travel at least the entire length of the waveguide, including the distance between the beginning of the calibration trace 365 (FIG. 18B) and the end of the elongate electrodes 90 and 92 or 290 and 292, of the measurement probe 26 or 226 (FIGS. 2 and 5).

As described above, the calibration trace and electrodes together comprise a waveguide or transmission line with a total combined length for guiding the electromagnetic pulse therealong from the beginning of the waveguide to the end thereof. The electromagnetic pulse preferably comprises a portion of a square wave pulse or the like in the radar frequency range of the electromagnetic radiation spectrum. The radar wave typically travels at the speed of light when unimpeded, e.g. in a perfect vacuum, but due to differences in the dielectric constant of air and various materials, the radar wave can actually slow down to half the speed of light or less, depending on the dielectric constant of the material or fluid through which the radar wave propagates. Accordingly, although the waveguide length is relatively long, the duration of the radar wave is very short and can thus be transmitted thousands of times per second, for example, during a single measurement cycle. Preferably, several measurement cycles with thousands of transmissions of the radar wave are performed to obtain data that can be analyzed for determining liquid level or other measurable characteristics of the medium as well as the interface between media.

As shown in FIGS. 23 and 26, each transmission pulse is associated with reaching a particular distance or location along the waveguide of the TDR measurement system to thereby generate and capture a single data point per transmitted pulse at a particular position along the waveguide, such as the calibration trace 365 or elongate measurement probe 26, 226 representative of the electrical state, i.e. the impedance or change in impedance, at the particular position where the data point is captured along the waveguide. In order to generate the signals for initiating the transmit and receive signals, the microcomputer 83 (U1) generates two timing signals, namely SignalSlow associated with output port P0.6 and SignalFast associated with port P0.9 of the microcomputer. SignalSlow for example, can comprise a 40 Hz square wave for controlling the start of a measurement cycle. SignalFast, for example, can comprise a 4 MHz square wave for controlling the start of each radar or radio frequency (RF) pulse. The RF pulse occurs several times during the measurement cycle for the purpose of collecting a single data point one transmission at a time along the waveguide each time the RF pulse is generated and propagated along the length of the waveguide. Both signals from the microprocessor, in accordance with corrected or calibrated clock timing, are input to the ETS delay generator module 406 whereupon two signals are output, namely, SignalTransmit and SignalSample. SignalTransmit controls the timing of the RF transmit pulse or transmitter, while SignalSample controls the timing of the RF sampler or receiver. It will be understood that the SignalSlow and SignalFast values are given by way of example and can greatly vary without departing from the spirit and scope of the invention.

SignalTransmit is applied to the sample pulse generator module 438 and triggers transistor Q3 (FIG. 22C) in the RF transmit pulse generator 428, which generates a fast falling edge of a pulse at the drain 468 of transistor Q3. For example, the fast falling edge can be generated for a 130 picosecond or 2.7 GHz bandwidth, depending on the values of the passive electronic components. This pulse couples through capacitor C42 (FIG. 22F) of the receive switch module 436 to the waveguide connection 462, which is electrically connected to the first end 369 (FIG. 18B) of the calibration trace 365 for propagating the RF signal down the waveguide. The fast falling edge propagates down the waveguide and is reflected in part by the surface of the liquid or material in the space 98, 298 (FIGS. 3, 6) between the electrodes to create an echo signal. The echo signals travel back up the waveguide and are coupled through the capacitor C42 (FIG. 22F) of the receive switch module 436 to the anode of diode D1. It will be understood that the timing of the fast falling edge is given by way of example only and can greatly vary without departing from the spirit and scope of the invention.

The module 406 (FIG. 22B) SignalSample connects to the RF receive pulse module 430 (FIG. 22D) on the SMP line 464 to turn on the transistor Q4 and generate a fast edge at the drain 466 of the transistor Q4. For example, the fast edge can be generated for a 130 picosecond or 2.7 GHz bandwidth, depending on the values of the passive electronic components, as will be described below. The drain 466 of transistor Q4 is coupled to the cathode 468 (FIG. 22F) of diode D1 through a pulse forming network including resistor R18 in module 430 (FIG. 22D), the calibration trace 365 (FIG. 18B), and the capacitors C27 and C26 in module 436 (FIG. 22F). The resulting pulse at the cathode 468 of diode D1 forward biases the diode, which allows the received echo signal to couple through the resistor R20 in module 436 to the RF bias generator 434 (FIG. 22) that is operably connected to the receive switch module 436 for biasing the diode D1 of the module 434. It will be understood that the values of the passive components can vary for varying the speed of the edge at the drain 466 of transistor Q4, without departing from the spirit and scope of the invention.

The resistor Rd of the module 436 (FIG. 22) is in parallel with the capacitor C42 and has a relatively large value, such as in the kilo-Ohm (KΩ) range for example, to allow the current to safely drain from the capacitor C42 of the module 436 (FIG. 22F) when the forward bias on the diode D1 applied by the RF bias generator 434 (FIG. 22) is removed. With this feature, electric sparks that might otherwise occur due to the removal of the forward bias on the diode D1 are safely eliminated. The transducer is therefore capable of measuring the level of liquid that may be flammable, explosive, or otherwise react negatively to an electrical spark.

Figure 22B:
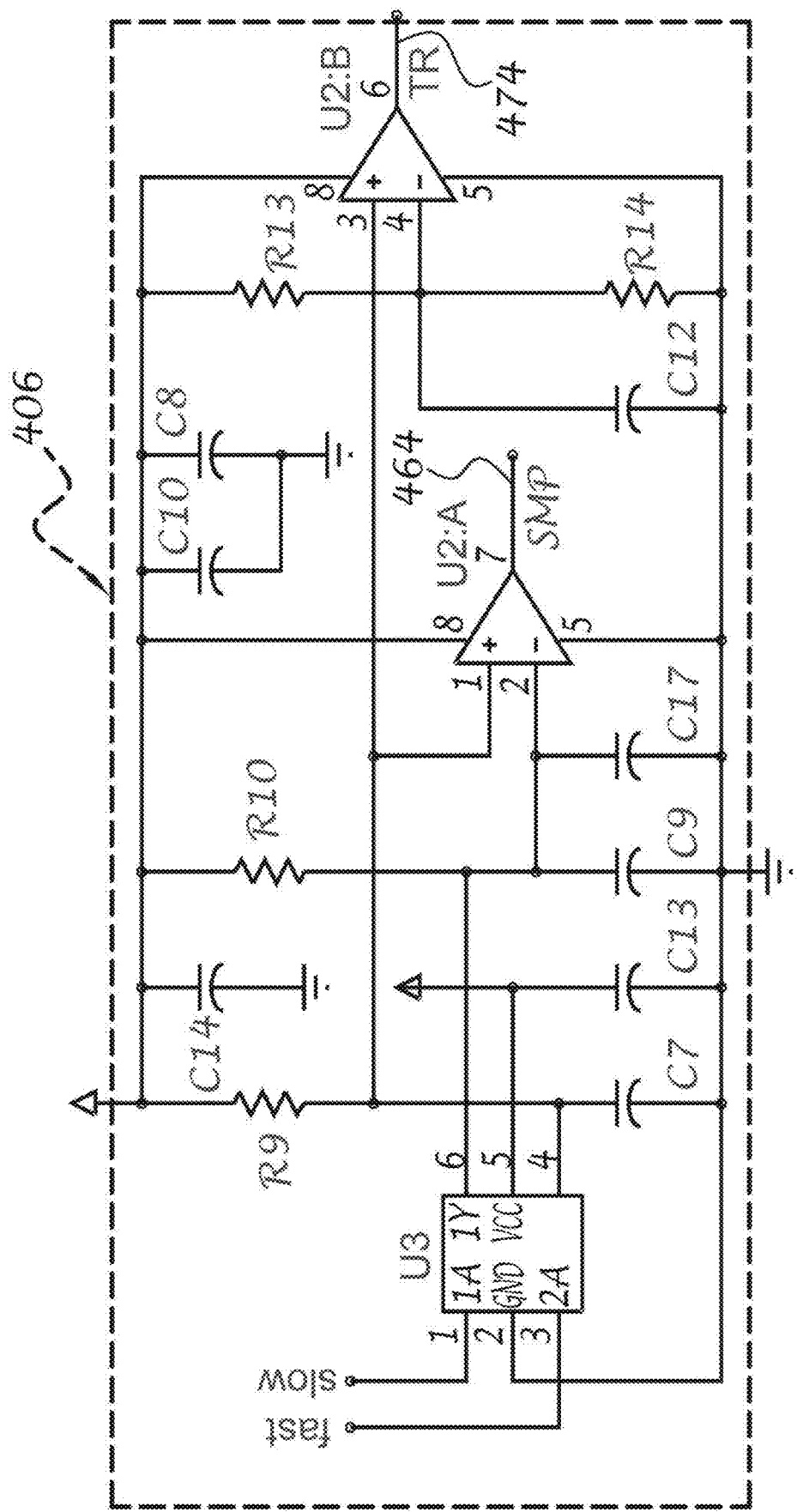
Figure 24:
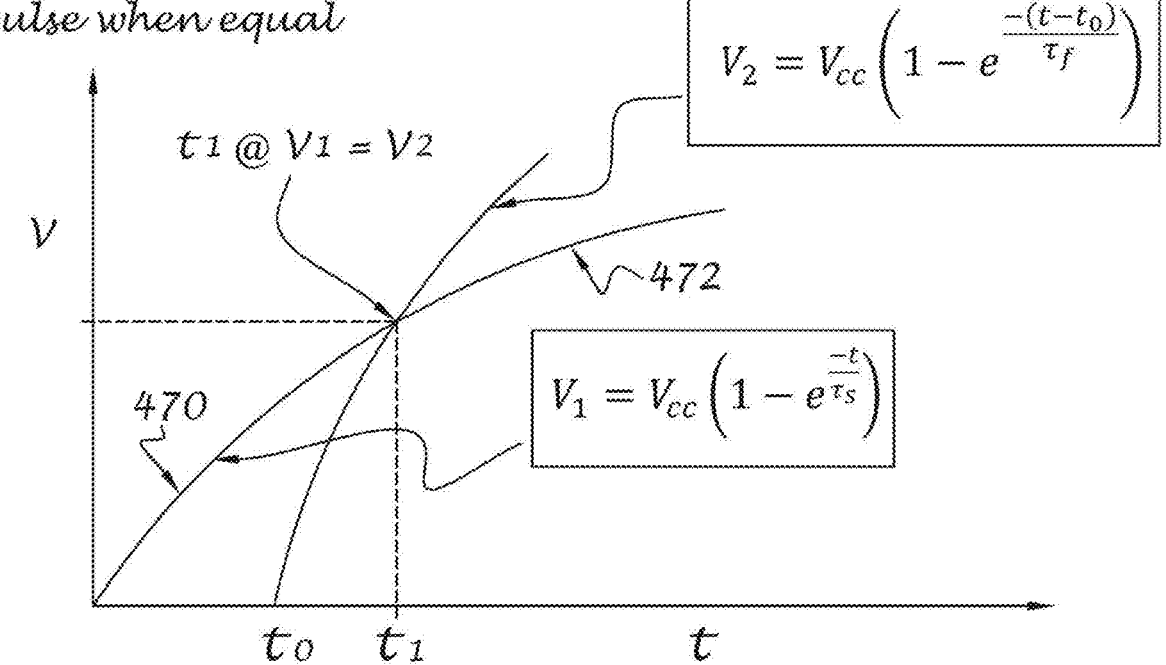
FIG. 24 is a diagram of two non-linear equations that form a linear function for triggering a series of measurement pulses at the predefined intervals of time in accordance with an exemplary embodiment of the invention.

With particular reference to FIGS. 22A, 22B, and 24, the Equivalent Time Sampling (ETS) Delay Generator module 406 is and its operation for generating receive and transmit pulses to the receive module 430 (FIG. 22) and transmit module 428 (FIG. 22), respectively, will now be described in greater detail. The TDR measurement system uses ETS where many individual RF transmit/receive cycles are initiated during a single measurement cycle. During each transmit/receive cycle, a single data point of the complete echo profile is captured. In each successive RF transmit/receive cycle, the delay between transmit and receive is increased, so that with a plurality of cycles at predetermined time delay intervals, a complete echo profile can be captured and analyzed. See, for example, echo profile 405 in FIG. 26 or echo profile 407 in FIG. 27. One of the primary purposes of ETS module 406 is to generate the incremental delay between transmit and receive pulses in a highly efficient, accurate, and low-cost manner without the need for a relatively large number of precision electronic components and their attendant higher costs, as required by prior art solutions.

The ETS Module 406 includes a dual inverter, labeled U3, with power input at pin 5, ground at pin 2, open drain outputs at pins 4 and 6, and signal inputs at pins 1 and 3. Pin 1 receives a slow pulse signal from pin 9 of the processor (microcomputer 83). Likewise, pin 3 receives a fast pulse signal from pin 12 of the processor U1. A measurement cycle begins when SignalSlow goes low in response to a slow signal from the processor U1, which opens the drain output (pin 6 of U3) and allows the capacitor C9 to begin charging through the resistor R10, thereby creating a RC charging circuit with the step 1 470 (FIG. 22B). The values of the capacitor C9 and resistor R10 are selected so that a relatively slow charge in voltage across the capacitor C9 occurs.

As shown in FIG. 24, the slow charge rate can be expressed as a function of voltage versus time with the values of the capacitor and resistor selected so that a slow curve 470 is generated as voltage versus time as:

$$V_1 = V_{CC} \times \left(1 - e^{\frac{-t}{t_s}}\right) \tag{2}$$

Where $V_1$ is the charging voltage across the capacitor C9, $V_{cc}$ is the supply voltage, t is the elapsed time since application of the supply voltage, and $t_s$ is the RC time constant of the RC charging circuit.

The frequency of SignalSlow is selected for example at 40 Hz, as programmed into or otherwise set by the processor U1, so a complete measurement cycle is repeated every 25 milliseconds. It will be understood that other values can be chosen for the frequency of SignalSlow without departing from the spirit and scope of the invention.

The SignalFast is applied to pin 4 of the second inverter U3 and controls the beginning of the RF transmit/receive cycle. The frequency of SignalFast is selected at 4 MHZ, for example, by the processor U1 as programmed or otherwise set, with the resultant period being 250 nanoseconds. Accordingly, there are 25 mm/250 nm=100 k RF transmit/receive pulses per complete measurement cycle with the exemplary values. It will be understood that other values can be chosen for the frequency of SignalFast without departing from the spirit and scope of the invention.

As shown in FIG. 24, the fast charge rate can be expressed as a function of voltage versus time with the values of the capacitor and resistor selected so that a fast curve 472 is generated as voltage versus time as:

$$V_2 = V_{CC} \times \left(1 - e^{\frac{-(t-t_0)}{t_f}}\right) \tag{3}$$

Where $V_2$ is the charging voltage across the capacitor C7, Vcc is the supply voltage, t is the elapsed time since application of the supply voltage, $t_0$ is the time at which the transmit signal is generated, and $t_f$ is the RC time constant of the RC charging circuit.

Referring to FIGS. 22B and 24, the signal slow curve is initiated at time t=0, while the signal fast curve is initiated at $t_0$. Initiation of the fast curve is also when the transmit signal is actuated. Upon intersection of the slow and fast curves, as shown at time $t_1$ in FIG. 24, the receive signal is actuated. In accordance with equations (2) and (3) above representing the slow and fast curves, respectively, when the following occurs:

$$V_2 = V_1: \tag{4}$$

then, $$V_{CC} \times \left(1 - e^{\frac{-t}{t_s}}\right) = V_{CC} \times \left(1 - e^{\frac{-(t-t_0)}{t_f}}\right) \tag{5}$$

$$\left(1 - e^{\frac{-t}{t_s}}\right) = \left(1 - e^{\frac{-(t-t_0)}{t_f}}\right) \tag{6}$$

Figure 22C:
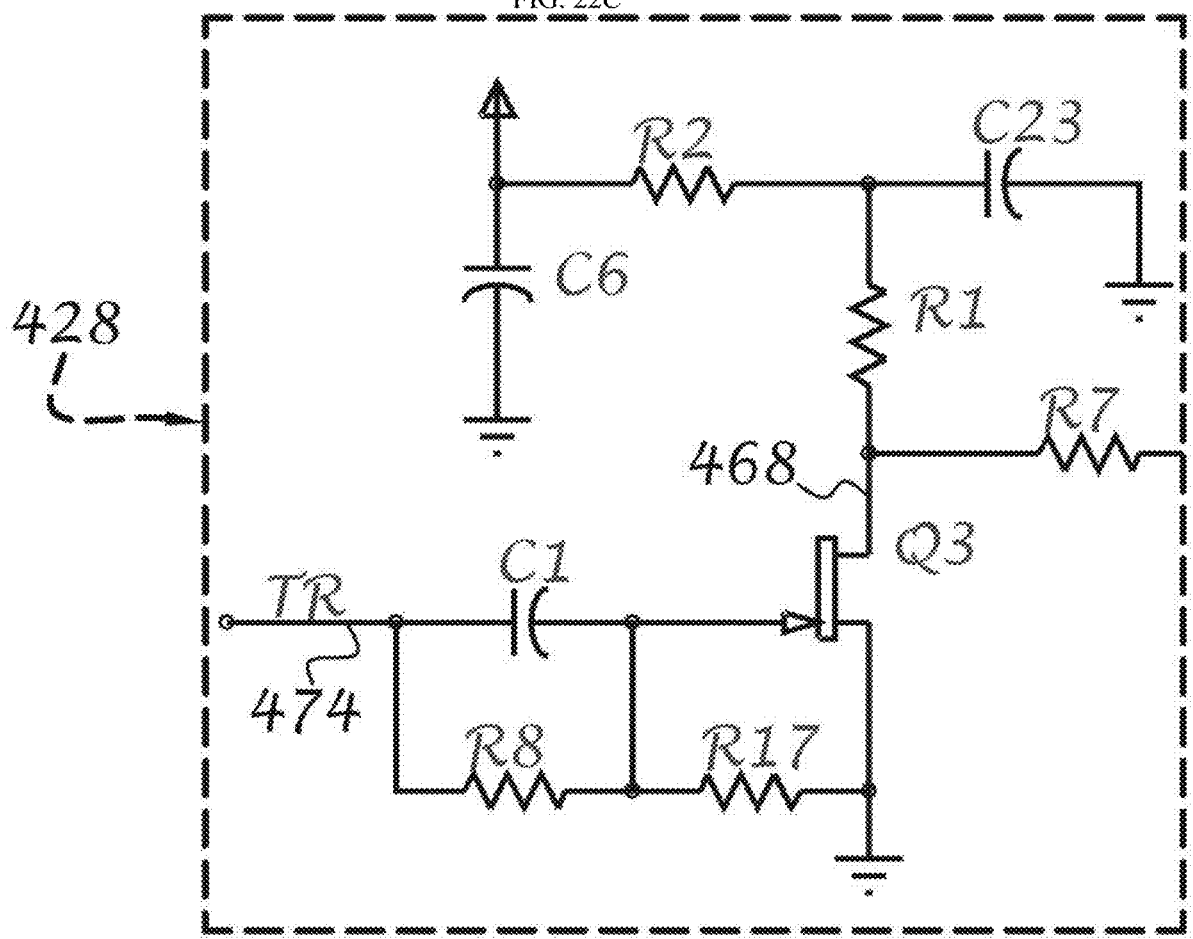

In this instance, Vcc cancels out, and a reading is taken (data point received) at the intersection of the two non-linear equations at time $t_1$. Over time, as equation (2) continues to rise during the measurement cycle, it will take longer and longer for equation (3) to intersect equation (2) as defined by the analog components of the RC circuits previously described. This results in a longer delay, preferably in multiples of picoseconds, for receiving the return pulse and thus a further position along the waveguide where the impedance is measured, and the data point associated with the localized impedance is received. This process takes place in the dual comparator, represented by designators U2:A and U2:B of the ETS module 406 in FIG. 22B. As shown, comparator U2:B sends a transmit signal on line TR denoted by numeral 474 associated with both the output of comparator U2:B of module 406 and the RF transmit pulse generator 428 (FIG. 22C). In accordance with an exemplary embodiment of the invention, the timing of the transmit signal is determined by the microcomputer 83, and occurs for example at every 250 nanoseconds. Likewise, the intersection of the fast and slow curves occurs every 250-nanosecond cycle, plus multiples picoseconds to cause a receive signal to be generated a predefined distance each transmission cycle to thereby eventually capture the entire echo profile. Thus, the intersection of the fast and slow curves causes the comparator U2:A to trip as the value of capacitor C7 equals the value of capacitor C17, both of which are inputs on pins 1 and 2 of the comparator U2:A. Preferably, one transmit pulse occurs at 250 ns, while the corresponding receive pulse occurs at 250 ns plus 1 picosecond. Likewise, the next transmit pulse occurs at 500 ns, while the corresponding receive pulse occurs at 500 ns plus 2 picoseconds. Again, the next transmit pulse occurs at 750 ns, while the corresponding receive pulse occurs at 750 ns plus 3 picoseconds, and so on, for thousands of transmit cycles until the entire echo profile is captured and stored, where it can subsequently be analyzed.

Over time, although the capacitors C7 and C17 (and thus the equations (1) and (2)) are nonlinear, due to the increasing delayed timing of the intersection of the fast and slow curves, the remaining values, once Vcc is canceled out, as discussed above, reveals a linear function as follows:

$$t = \frac{-t_0 \times t_s}{t_f - t_s} \quad (7)$$

Figure 25:
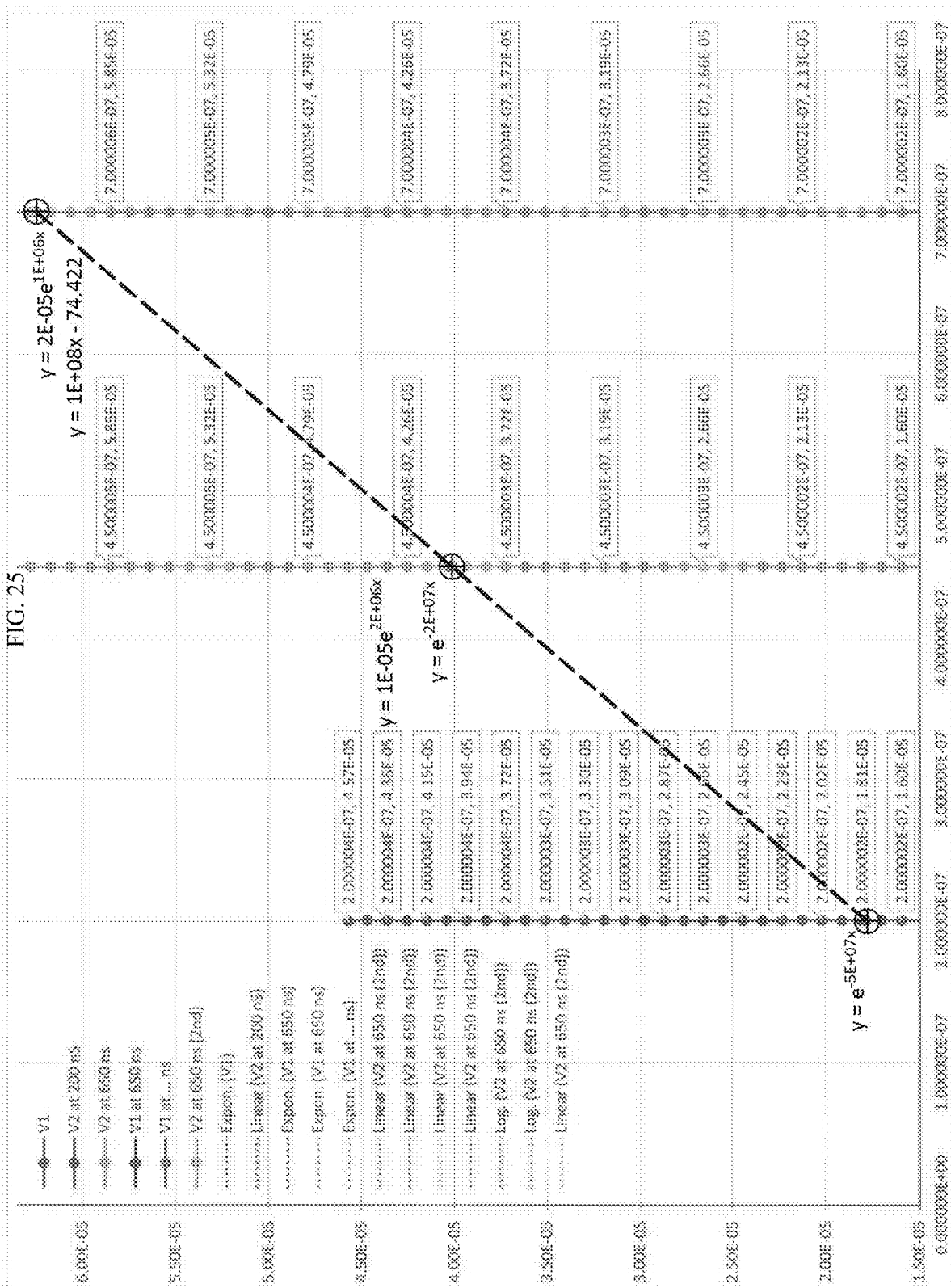
FIG. 25 is a chart illustrating intersections of the non-linear equations at first, second, and third exemplary time intervals to create a linear function in accordance with the invention.

See FIG. 25 for example which shows three sets of data points for the transmit signal at 250 ns, 500 ns, and 750 ns, and three sets of data points for the receive signal intersecting with their respective transmit signals, due to the very fast rise of the fast curve and the very slow rise of the slow curve, only a single receive data point can be represented at this scale for each transmit signal. However, it is clear from this chart that the intersection of the fast and slow curves at the predetermined transmit intervals results in a linear curve when connecting the intersection of the fast and slow curves. The linear nature of multiple fast and slow curve intersections is independent of the timing of the transmit signals. It will be understood that although certain values have been given for the transmit and receive signal actuation and intersection, a wide variety of values can be selected depending on a particular application, how much accuracy or resolution is desired, the processing speed of the microcomputer, and so on. Accordingly, the present invention is not to be limited by the exemplary values set forth herein.

The purpose of using the ETS method in accordance with the invention is due to the high-speed propagation of the radar wave along the waveguide, e.g. the calibration trace and elongate electrodes, as previously described. The radar wave moves at the speed of light in a vacuum, and close to the speed of light in air or atmosphere. It has been found that, when a material is reached by the radar wave with a higher impedance value than air, the propagation is much less than the speed of light. Along the calibration trace for example, as buried in the PCB, the propagation is approximately half the speed of light. Accordingly, the entire echo signal for a 24-inch measurement probe occurs in approximately four nanoseconds (4 billionths of a second). While it may theoretically be possible to create electronics that can record the echo this fast, such an attempt would be very expensive and thus not practical for most liquid level measuring transducers in transportation, marine, off-road, and other markets.

On the one-hand, by limiting the electronics assembly, including software instructions associated with the microprocessor, to only capturing the echo from one distance per cycle, the transducer can be of sufficient low-cost to be competitive in the above-mentioned markets. Until the present invention, this has not been achieved.

On the other hand, for a 24-inch probe, thousands of measurement cycles may be required to capture the entire echo profile, such as the echo profile 406 in FIG. 26, for example. However, this compromise is not typically an issue, since each individual measurement only takes 250 ns.

The TDR measurement system as presently embodied is capable of easily capturing 40 complete echo profiles per second (as opposed to 25 million echo profiles we could record at full speed). Since the level of liquid in a tank or the movement of a plunger within the outer electrode does not significantly change in 25 ms, (much less 4 ns), even with the time tradeoff, the TDR measurement system is still much faster than is practically needed, even with a microcomputer currently priced at much less than $1 USD, and low-cost analog electronic components that do not, in and of themselves, offer consistent accuracy or reliability, yet such components, when properly combined and managed, as in the present invention, produces a highly accurate, highly repetitive, and highly reliable transducer, with perhaps only a single comparator being of the high-precision variety. Another factor, which may be important depending on the level of accuracy and repeatability desired, is the selection of C7 and C9, which should have low or zero temperature and vibration sensitivity. The comparator U2 should also have high input impedance and provide fast-rising edges on outputs.

Figure 22D:
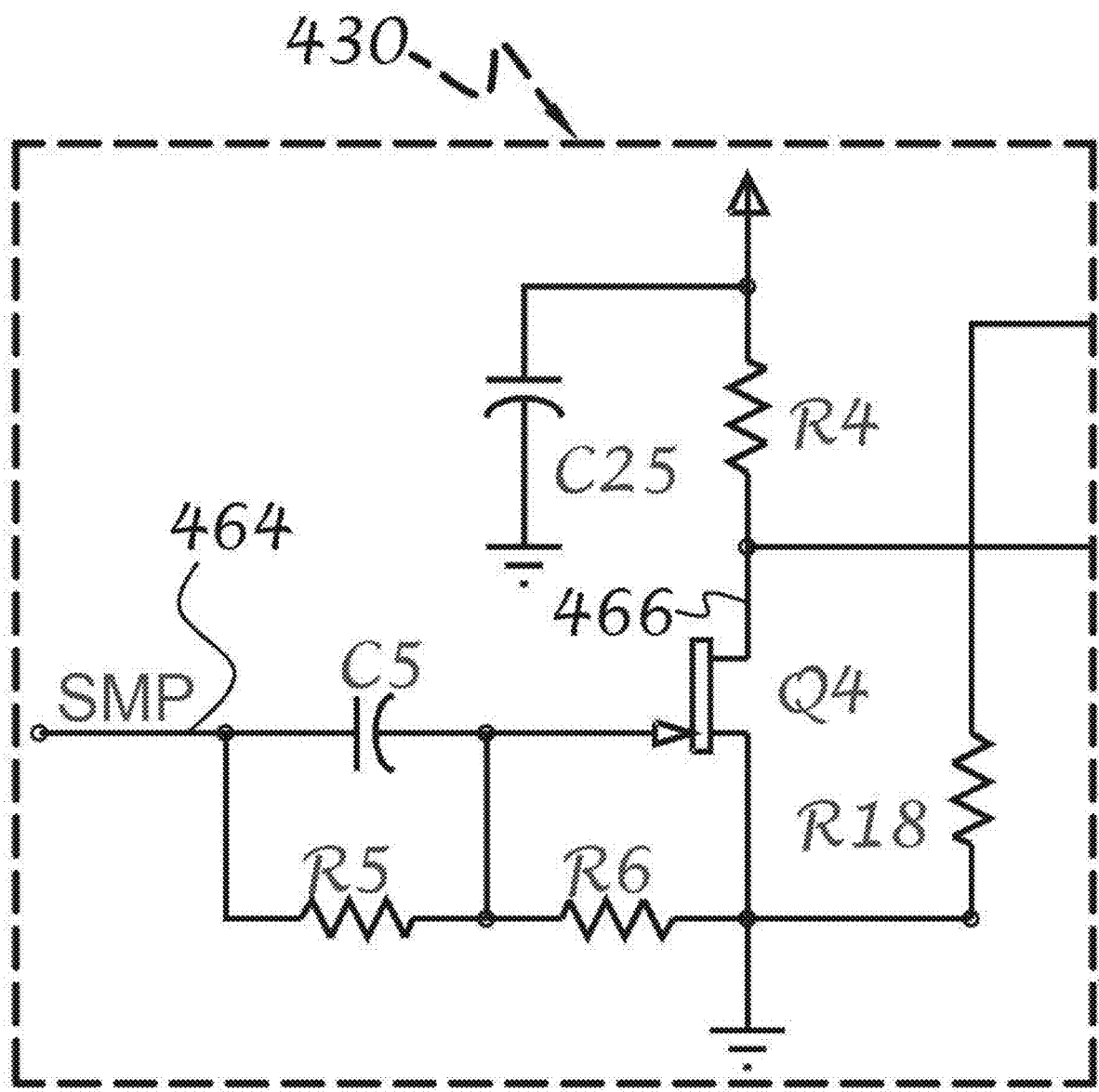
Figure 22F:
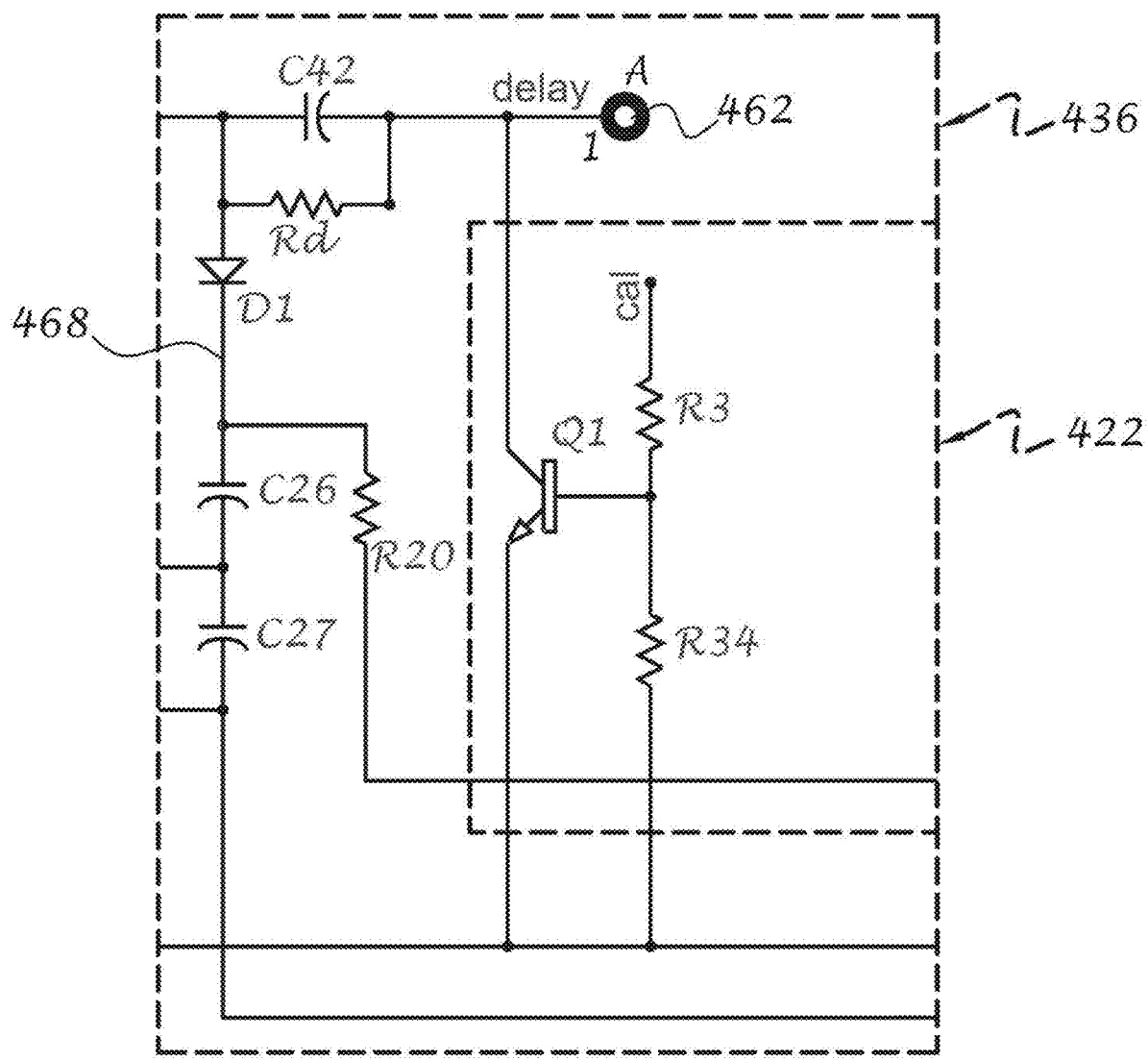

As shown in FIG. 22D, the fast sampling signal from transistor Q4 of the RF receive pulse generator module 430 couples with the sample pulse generator module 438, which delays the sample signal and delivers the delayed sample signal to the sample input of the sample and hold amplifier module 437. When sampled, the output of the sample and hold amplifier module 437 charges the capacitor C35 associate with the buffer amplifier module 438 (FIG. 22G), which integrates the received echo return signals from multiple 4 MHz cycles.

Modules 437 and 438 together derive a second sample pulse (generated in module 438) from the primary sample pulse from the transistor Q4 in the receive module 430. This second pulse allows the system to use a second track and hold amplifier (module 437), which greatly increases the signal from the sample diode D1 in module 436. The RF receiver module 434 forms a DC servo to maintain a constant bias on D1, resulting in constant sensitivity of D1 to the sample pulses and the received echoes.

Figure 22H:
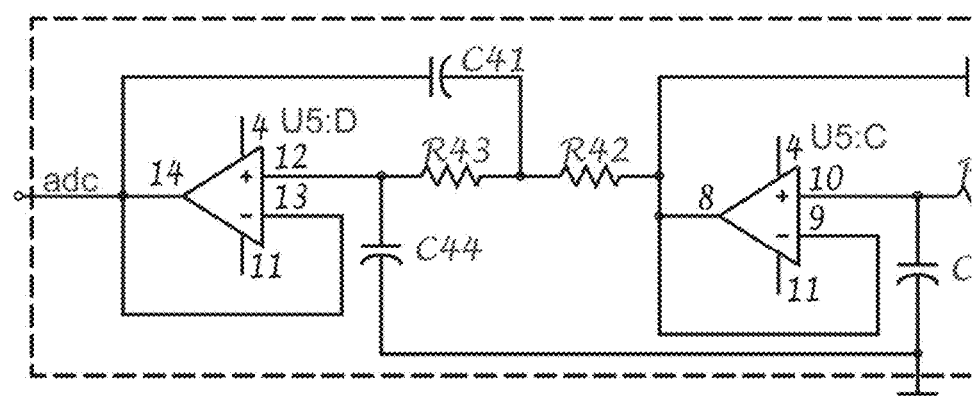

As shown in FIG. 22H, the module 440 includes a high impedance input buffer amplifier for the integrated echo received data signal stored on capacitor C35 of the buffer amplifier module 438. The module 440 also forms an analog low pass filter whose output is connected to the analog to digital converter (at pin 4) of the processor, where the echo signal is digitized and received in such a manner into the microcomputer for storage and analysis of the return echo profile.

Figure 22I:
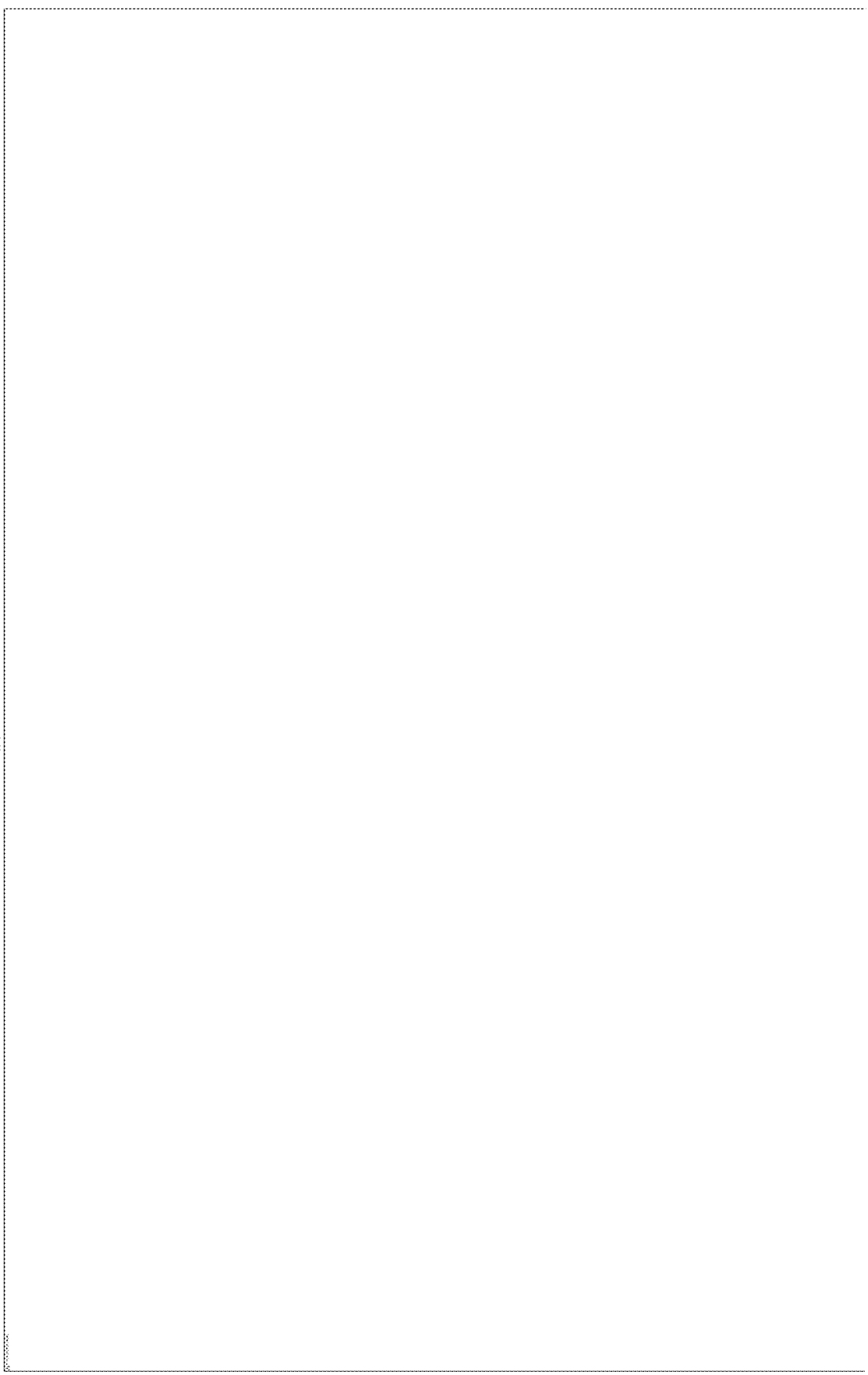

As shown in FIG. 22I, a temperature sensor in module 444 provides for temperature compensation. Module 446 is associated with module 444 and includes a digital to analog converter and a voltage reference for precision analog indication of the liquid level, linear position, as well as other material properties or positions of anomalies along the waveguide.

Figure 22J:
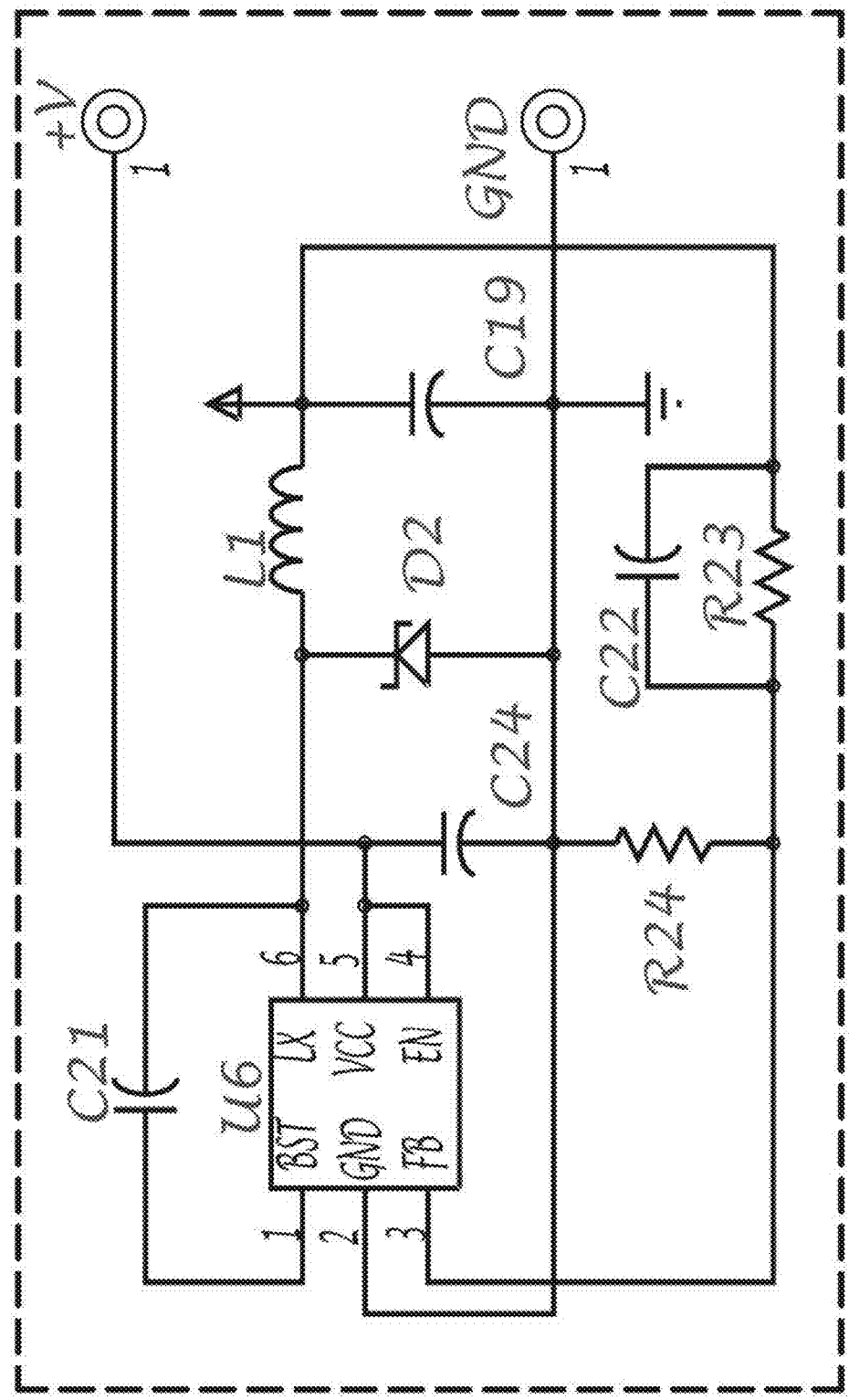

As shown in FIG. 22J, the power supply module 75 includes a switching power supply that converts input voltages in the range of about 7 to 32 VDC into 5 VDC in order to power the system. Although particular values of the electronic components, such as the value of capacitors, inductors, and resistors, and so on, have not been given, it will be understood that the values can greatly vary and can be selected to vary the RC fast and slow timing curves, as well as other functions associated with each module of the electronics assembly.

Figure 28:
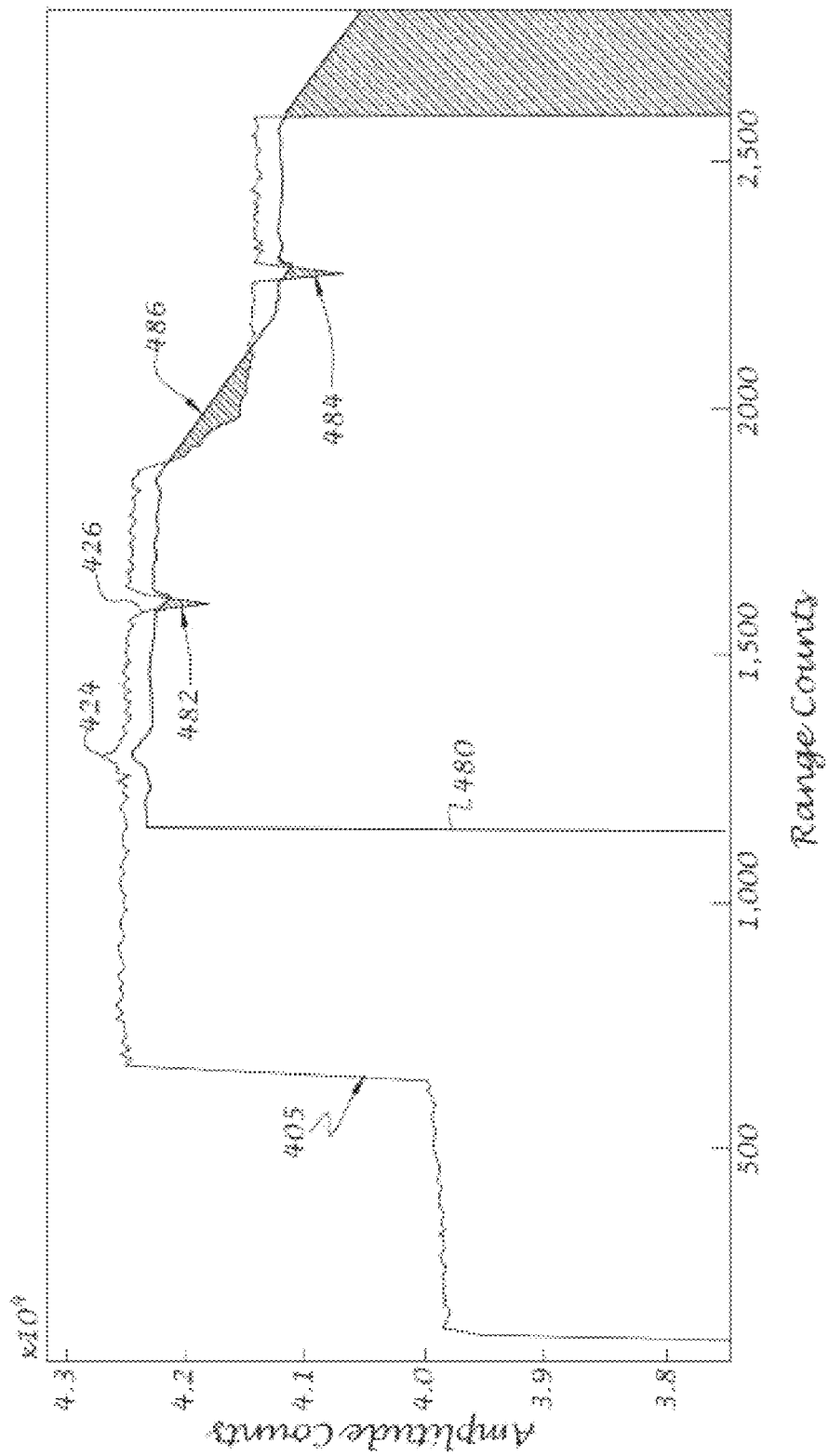
FIG. 28 is a graph similar to FIG. 26 with the addition of an exemplary calculated time value trace (TVT) in accordance with the invention that follows the measured return echo profile of the TDR measurement system for identifying the position of return echoes when the impedance of the measurement probe changes due to the presence of an anomaly therein.

Referring now to FIG. 28, once the data has been gathered for at least one measurement cycle, the microcomputer performs an analysis of the data by creating a processor-generated time varying threshold (TVT) curve 480 that follows the curve of the originally gathered data associated with the measured return echo profile 405. The TVT curve can be expressed for each data point as the average of a certain number of received data values before and after the TVT data point on the return echo profile, with a limit on the amount of slope the TVT curve is allowed to follow the return echo profile, such as represented by numeral 486 in FIG. 28.

In this manner, unimportant anomalies or return echoes can be ignored, while important anomalies, such as calibration marks to calibrate the system clock and thus the measured distance to the anomalies, as well as the top of a liquid surface within the inner space between the electrodes to determine liquid level for example, can be automatically located, such as represented by numeral 486, where the maximum slope of the TVT curve does not follow the slope of the echo profile 405. Likewise, important anomalies, such as the echo 482 created at the transition of the electrodes and the calibration trace, to calibrate the timing of the system clock, can also be identified. The commonality to recognizing a valid return echo is in the fast fall (or rise) of the return echo profile and the slope limitation of the TVT curve that prohibits the TVT curve from following the slope of the echo profile 405. The following expression can be used for generating the TVT curve in FIG. 28, it being understood that other expressions can be used without departing from the spirit and scope of the invention:

$$TVT(i) = \sum_{i-m}^{i+n} \frac{(i-m)-(i+n)}{m+n} - k \qquad (8)$$

where i is given range count; and m, n and k are constants, with suitable values including: m=20, n=10, and k=200. It will be understood that the values are given by way of example and can greatly vary depending on the nature of the TVT curve, the return echo profile, and preferred behavior of the TVT curve.

Calibration of the system clock, for example the clock associated with the low-cost microcomputer 83, can take place several ways. One exemplary embodiment of the invention comprises activating the transistor Q1 in module . . . is calibration of the system clock. When turned on, Q1 provides a large and precise echo from the end of the calibration trace 365 (delay line) buried in the PCB. Since the delay line is a calibrated distance, by measuring the length of the delay line with the system, the system can be calibrated.

Figure 29:
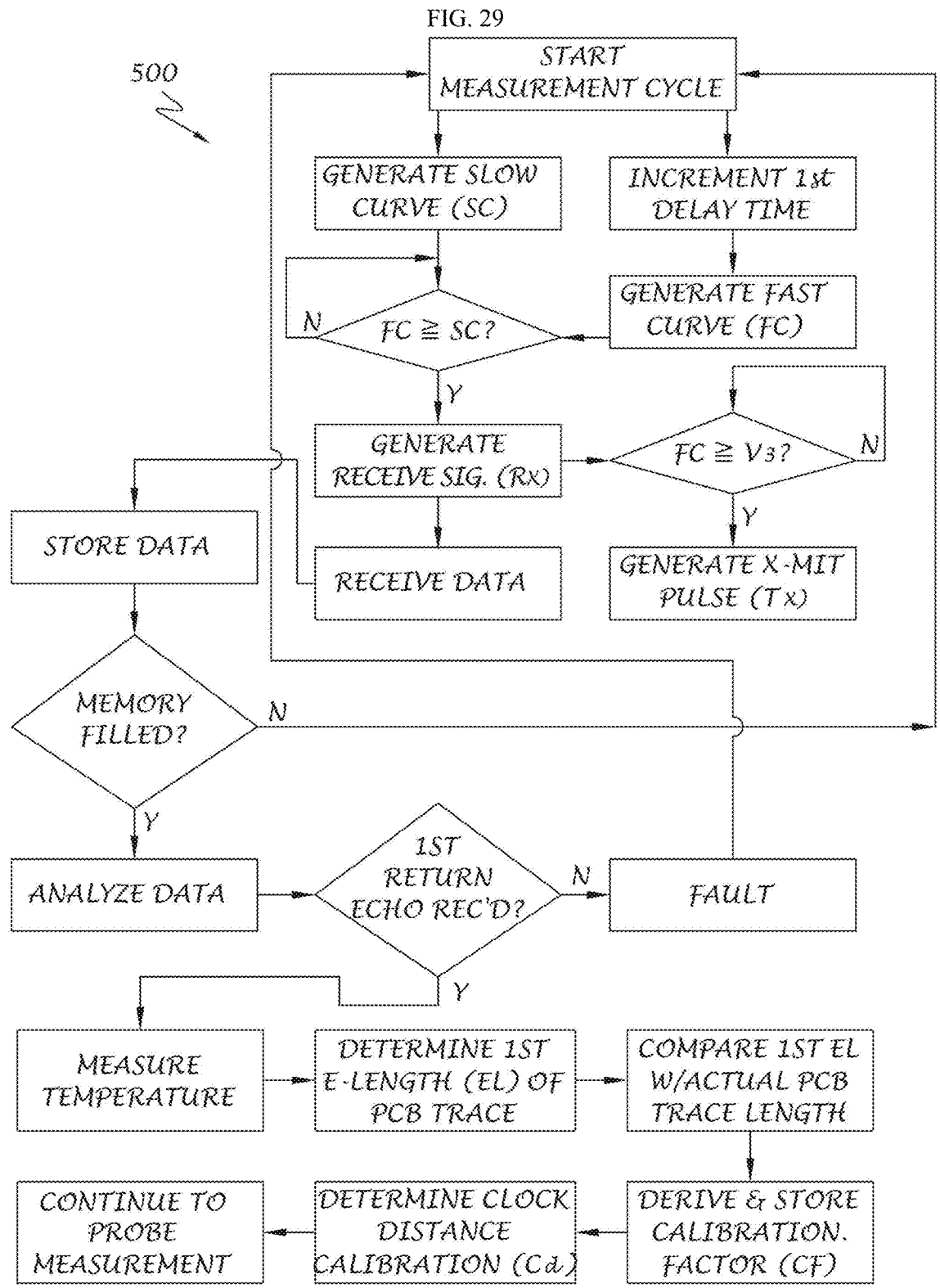
FIG. 29 is a block diagram illustrating a method for calibrating the PCB calibration trace in accordance with an exemplary embodiment of the invention.

Referring now to FIG. 29, a block diagram illustrating a method 500 for calibrating the calibration trace 365 (FIG. 18B) is disclosed. This method follows the procedure as discussed above with determining the echo profile at least of the calibration trace, then comparing the determined length with the actual physical length taking into account dimensional variables due to temperature fluctuations, then deriving and storing a calibration factor, and using that calibration factor to determine a system clock distance calibration. For example, if the end of the calibration trace 365 is reached in 1,000 clock cycles, and the expected or actual number of clock cycles for the physical length is 1,005, the calibration factor would be a ratio of the clock cycles to ensure that the determined electronic length is equal to the actual mechanical length. Once the system clock has been calibrated, measurement of the distance along the probe to the liquid height, plunger height, and so on, can then be determined with very high accuracy, again by using very low-cost electronic components.

Figure 30:
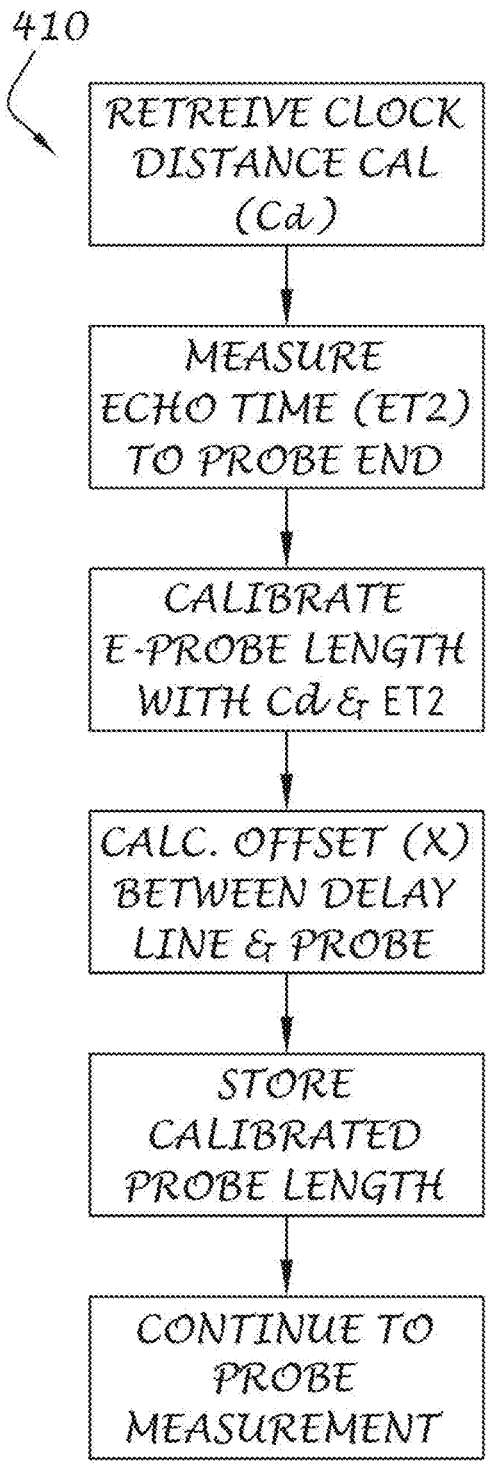
FIG. 30 is a block diagram illustrating a method of calibrating the measurement probe in accordance with one exemplary embodiment of the invention.
Figure 31:
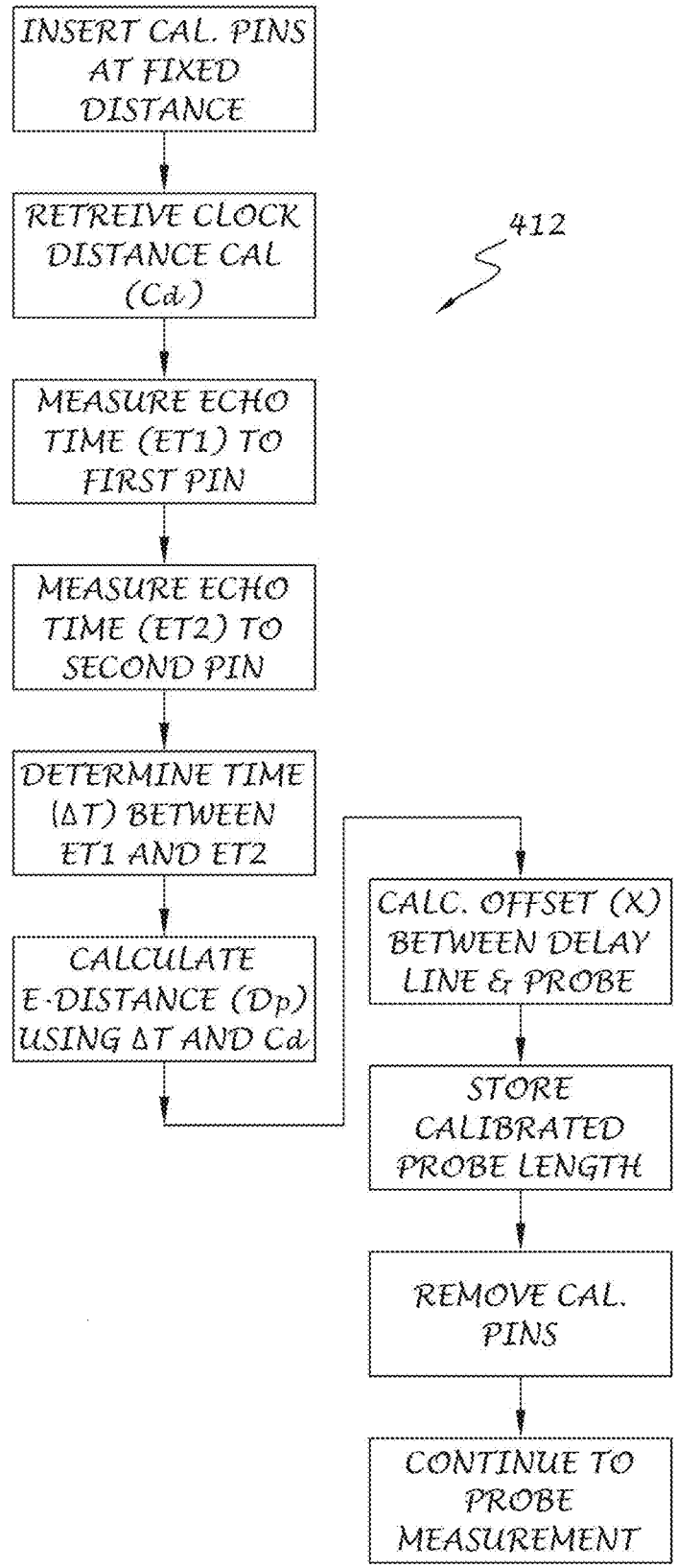
FIG. 31 is a block diagram illustrating a method of calibrating the measurement probe in accordance with a further exemplary embodiment of the invention.

Referring now to FIGS. 30 and 31, two different methods 410, and 412 for calibration of the probe are illustrated in block diagram. The 410 method includes retrieving the system clock calibration factor, measuring the echo time to the end of the elongate measurement probe, calibrate the electronically determined probe length with the clock calibration factor, calculate the offset "X" between the delay line and the probe, e.g. the space in which the upper spacer is located, then calculate and store the calibrated probe length. This method can be repeated as often as needed in the field, and initiated either automatically, such as when a sufficient fluctuation in ambient temperature occurs, or manually when it is suspected that recalibration may be needed. The calculation of the distance X can be accomplished by using the known physical height of the upper spacer, the calibrated height based on temperature expansion or contraction of the material, or by measuring the speed of the radar signal through the known spacer material and determining the time of propagation therethrough. The distance can then be calculated by the determined propagation velocity and the system clock timing.

The method 412 is accomplished, as previously described, by inserting calibration pins at known locations along the measurement probe, measuring the echo time to each pin, determining the delta time between the pins, and calculating the electronic distance therebetween using the calibration clock value, then calculating the offset "X" as previously described. The calibrated probe length can then be stored and retrieved during actual measurements.

Figure 32:
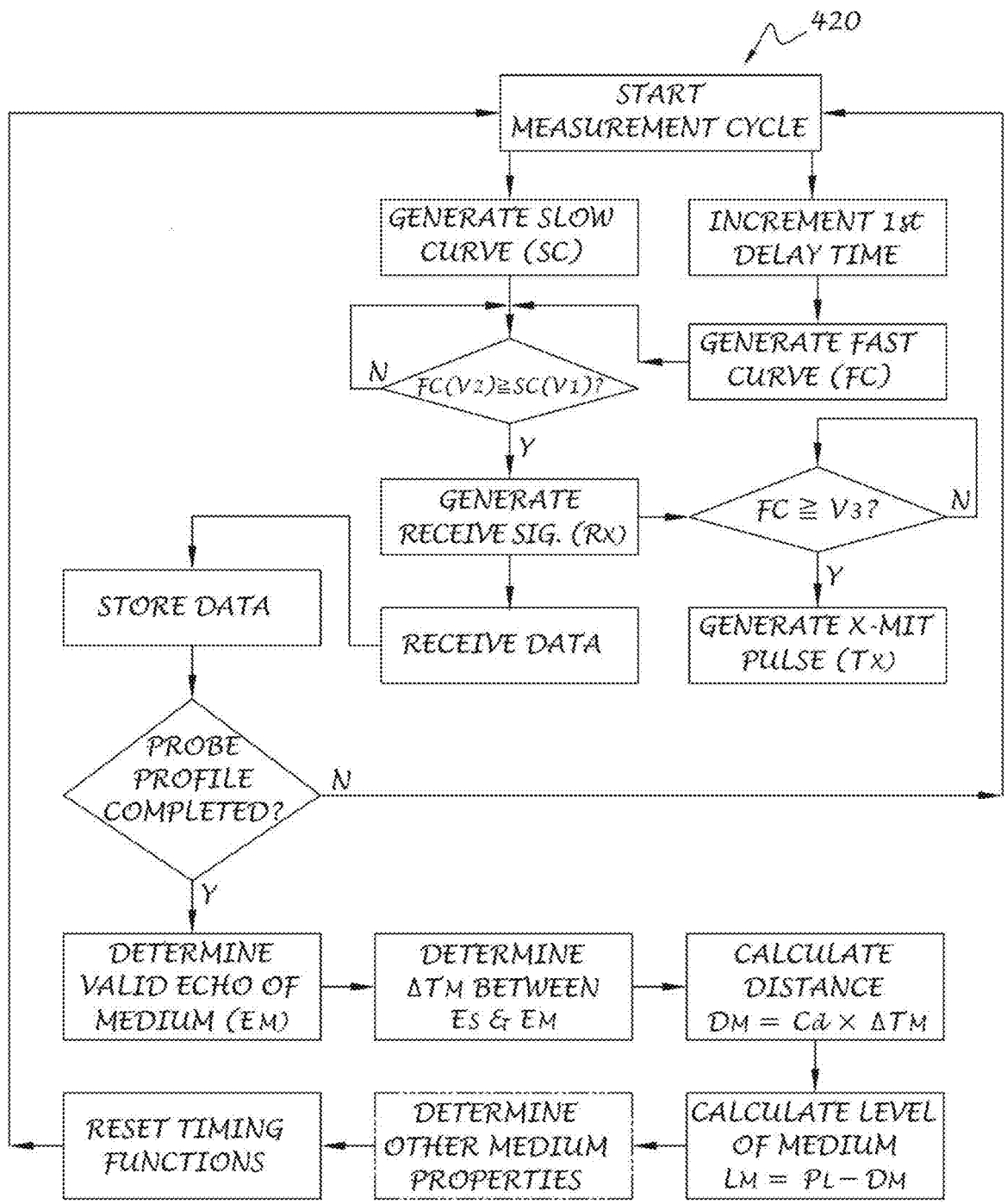
FIG. 32 is a block diagram illustrating a method of determining a material level, as well as a position of an object, such as a plunger, within the measurement probe for determining liquid level, material level, or movement of a plunger within the measurement probe in accordance with exemplary embodiments of the invention.
Figure 33:
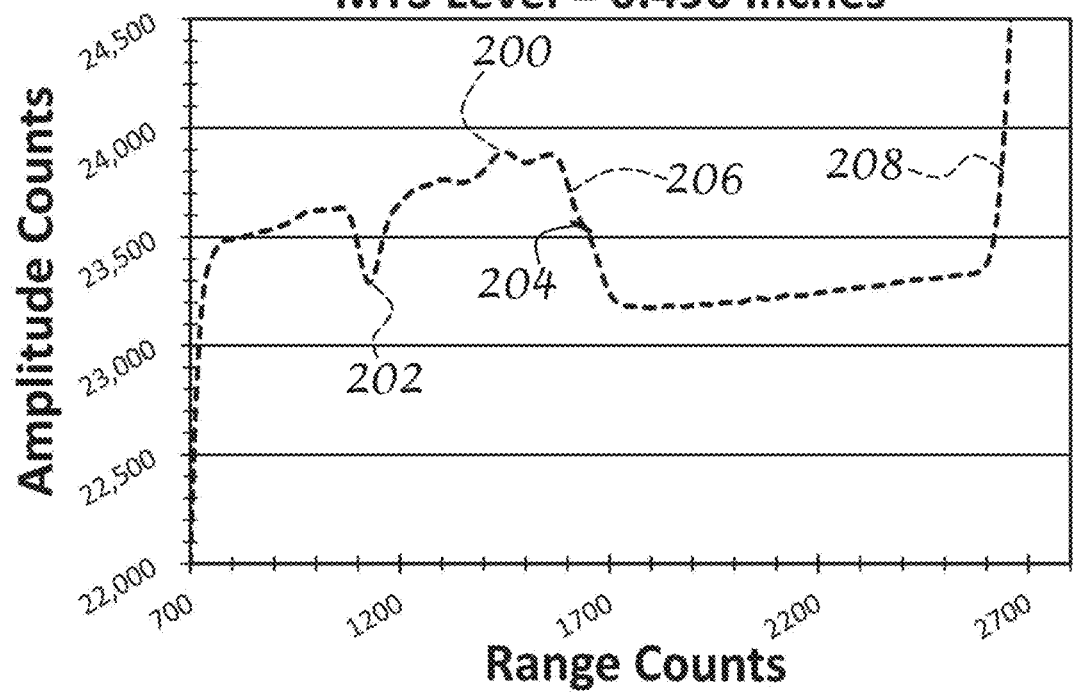
Figure 34:
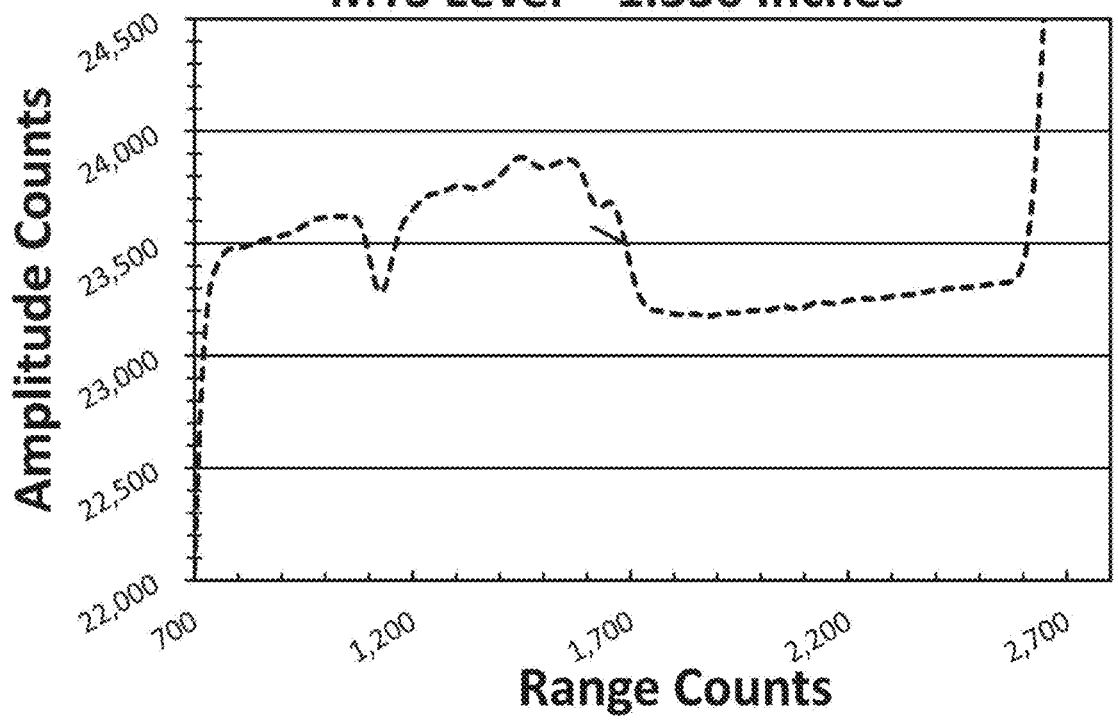
Figure 35:
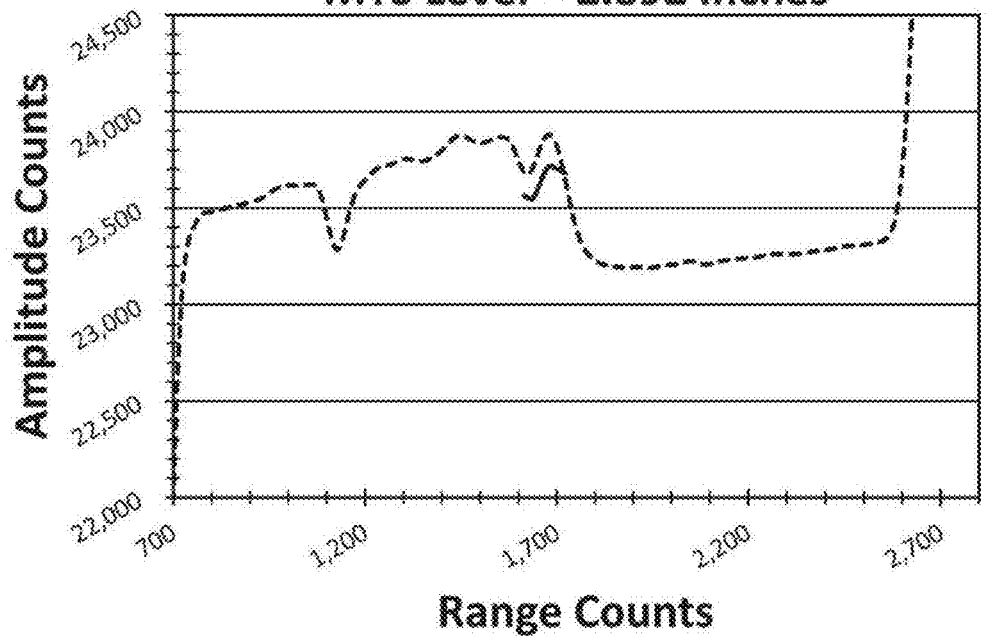
Figure 36:
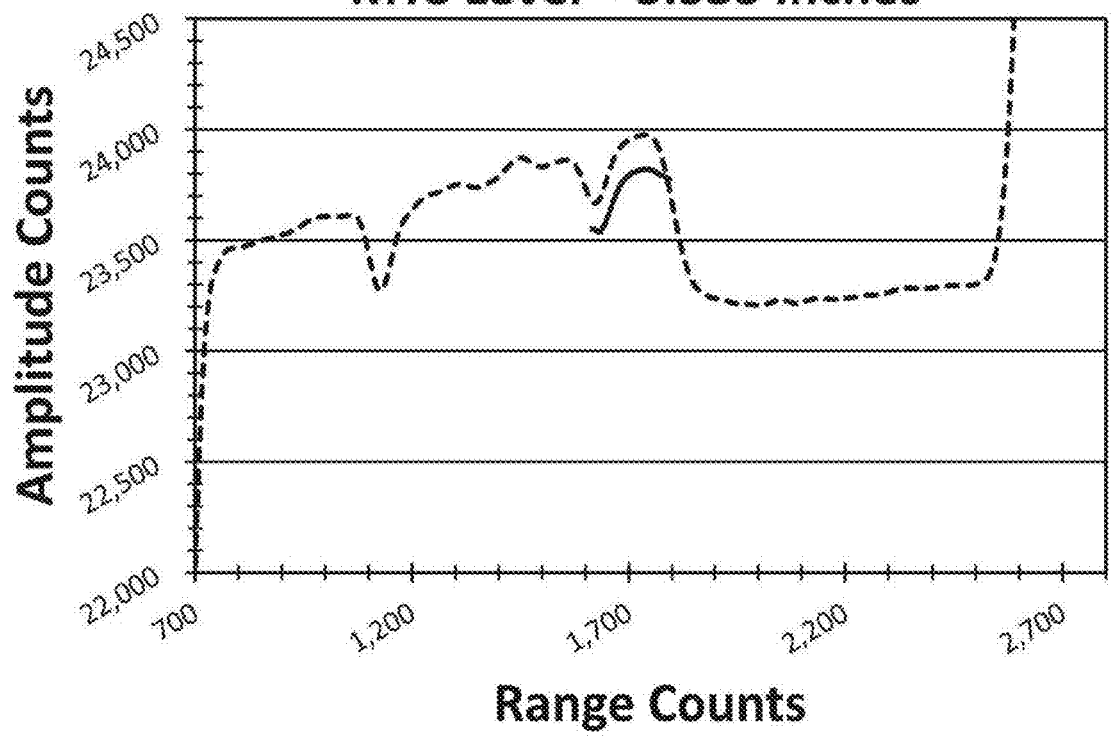
Figure 37:
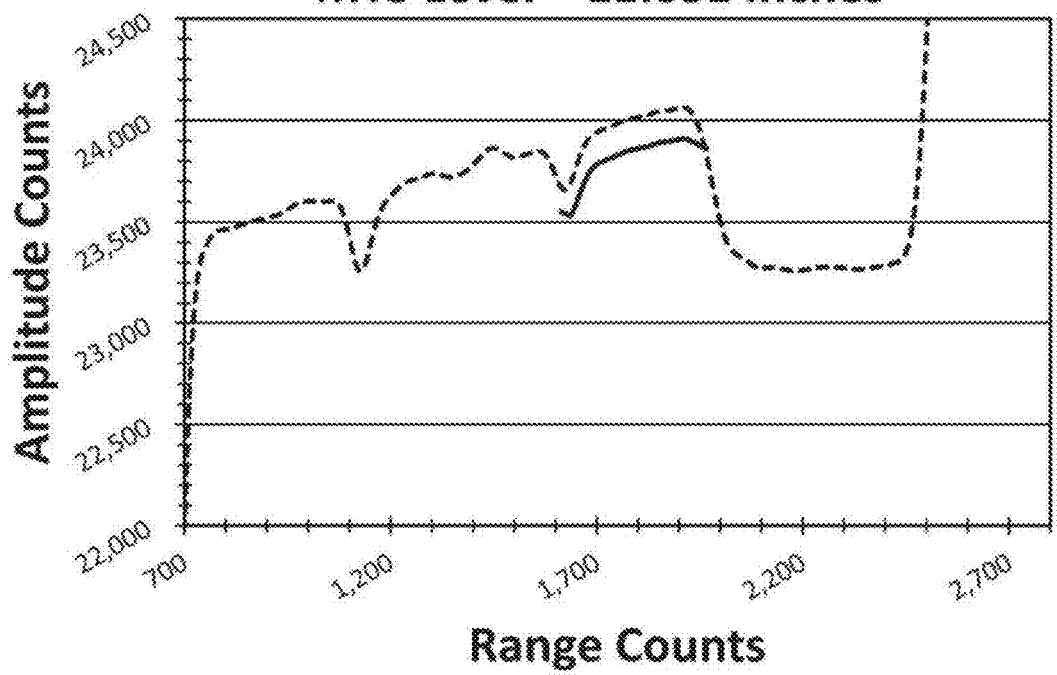
Figure 38:
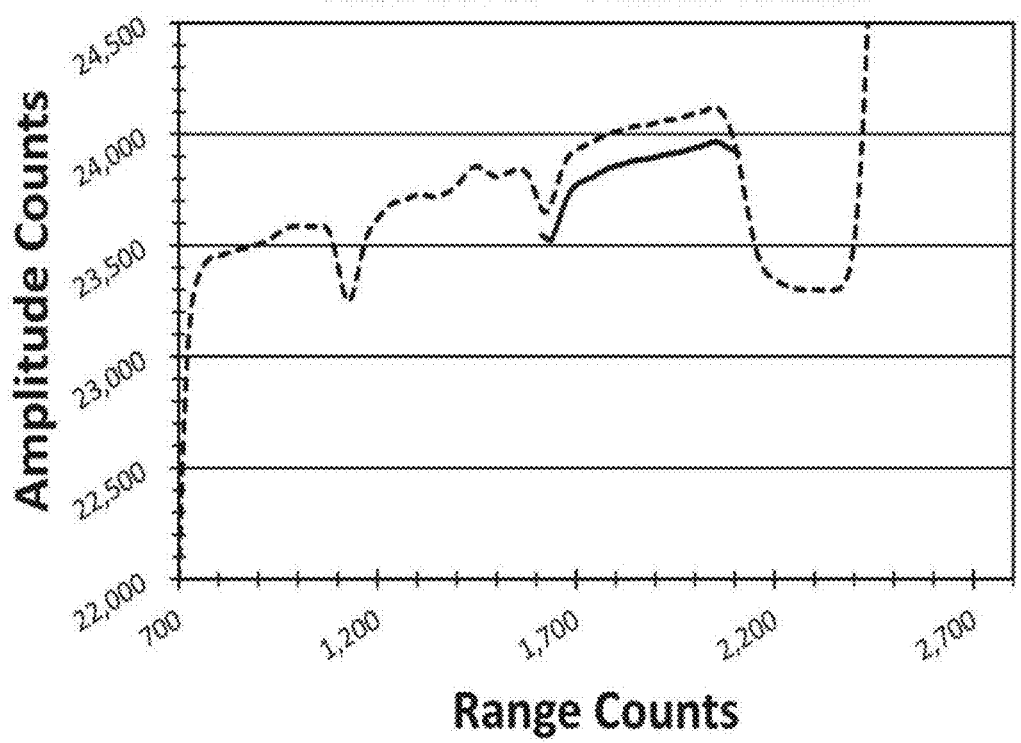
Figure 39:
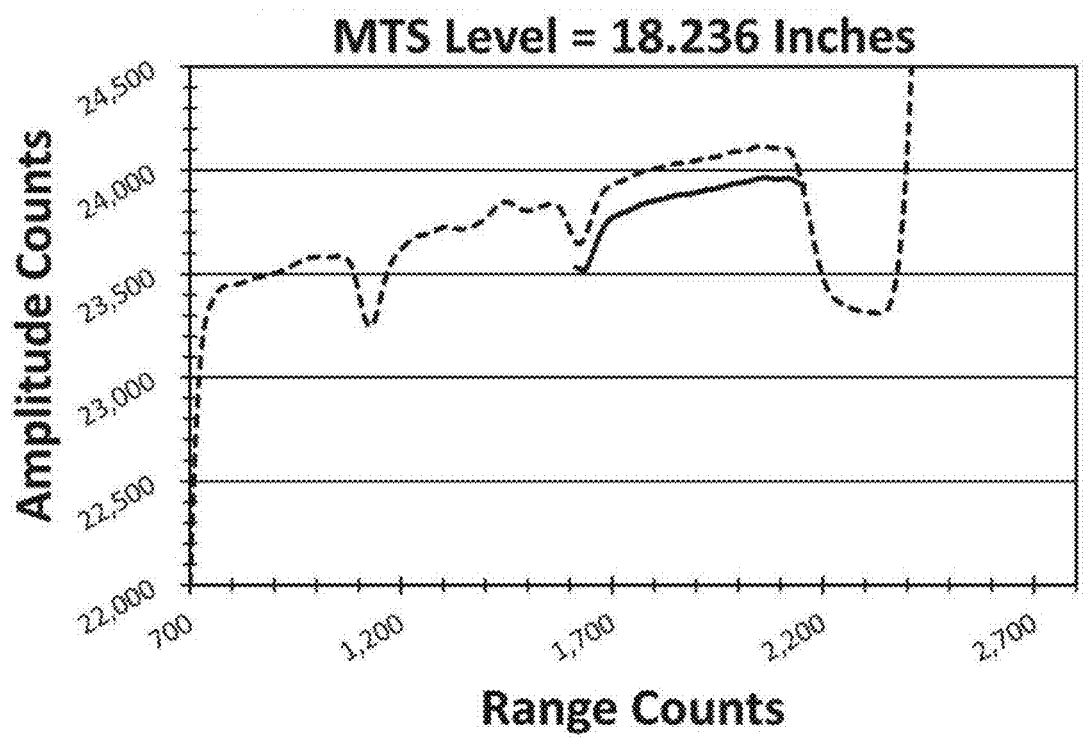
Figure 40:
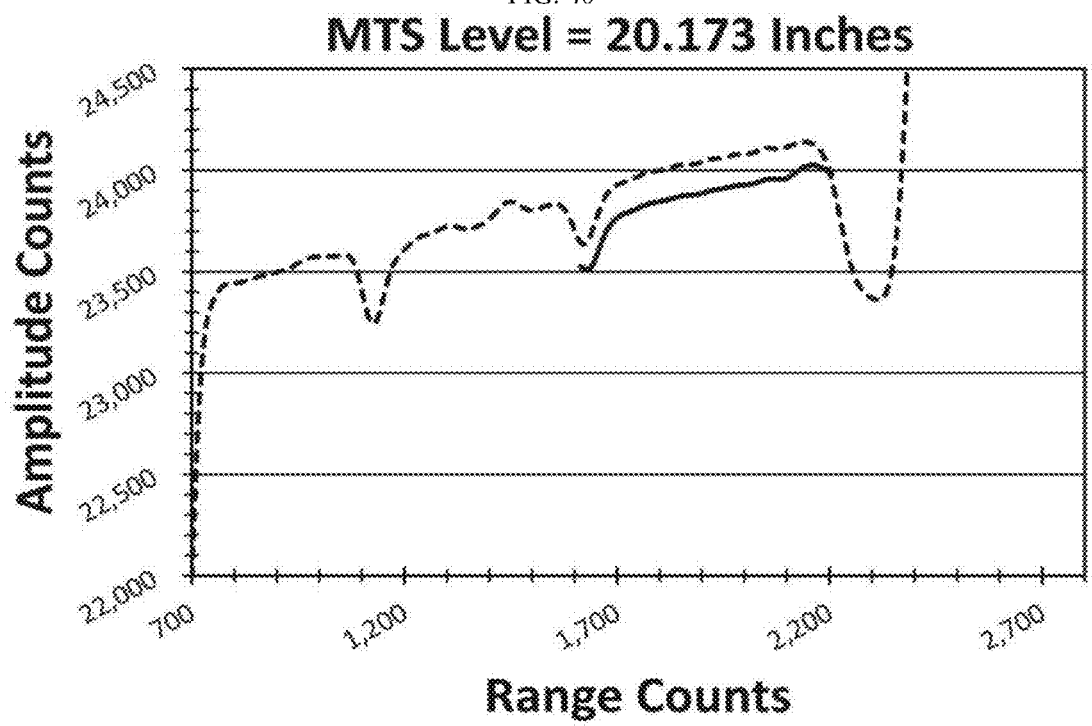

Referring now to FIG. 32, a method 420 for measuring a level of material, such as liquid, with the TDR measurement system is illustrated in block diagram. The method 420 includes generating the fast and slow curves, transmitting the radar pulse and receiving return echo data, then determining, using the TVT method described above, whether a return echo is valid and if so, calculate the difference in time between the upper end of the measurement probe and the top of the material surface, as determined by the valid return echo profile and the maximum slope of the TVT curve as previously described, then apply the system clock calibration factor to calibrate the determined time difference and thus the actual distance to the top surface of the material being measured.

Referring to FIGS. 36-47, graphs of actual return echo profiles were generated using the system and methods of the present invention. As shown, the TVT curve intersects the return echo profile at distinct positions on each graph. For a 24-inch probe, it is readily seen that the system and methods of the invention enable measurement of the liquid level to within 0.490 inches or closer to the top of the upper spacer, the result of which is quite surprising, but is made possible by the mechanical structure of the inner electrode, the narrow upper portion thereof, the size and dielectric constant of the upper spacer, which greatly reduces the size of any return echo at the transition of the upper spacer and the inner space between the electrodes, since the upper end of the measurement probe is designed to approximate the impedance of the empty probe below the upper spacer. Accordingly, the liquid or material level is capable of being measured at a much closer position with respect to the top of the measurement probe than prior art devices requiring much more expensive solutions.

Also, as shown in FIG. 47, a measurement of 24.1 inches at the intersection of the return echo profile and the TVT curve, demonstrates that the liquid level or material level can be measured to the lower end of the probe at or near the lower spacer. In this manner, substantially the full length of the elongate measurement probe can be used.

The compensation process associated with ensuring accurate liquid level or linear movement within the elongate measurement probe can be gathered and processed through known data processing techniques using computer algorithms or software for various platforms and can be provided as computer readable software on various media storage devices for downloading into and operating on a smartphone, a computer, display, or the like, including but not limited to hard drives, websites, thumb drives, flash memory devices, CD's, and so on.

It will be understood that the various measured and calculated values associated with material properties as described above are given by way of example only and are not intended to be an exhaustive list. Software techniques and methods for accurately determining the liquid level, volume and other tank conditions as discussed above can be implemented in analog circuitry, digital circuitry, in computer hardware, firmware, software, and combinations thereof. The techniques and methods may be implemented in a computer program product tangibly embodied in a machine-readable storage device for execution by a programmable processor; and the above-described methods may be performed by a programmable processor executing a program of instructions to perform functions by operating on input data and generating output. Further embodiments may advantageously be implemented in one or more computer programs that are executable on a programmable system including at least one programmable processor coupled to receive data and instructions from and transmit data and instructions to a data storage system, at least one input device, and at least one output device. Each computer program may be implemented in a high level procedural or object-oriented programming language, or in assembly or machine language, which can be compiled or interpreted. Suitable processors include, by way of example, both general and special purpose microprocessors. Generally, a processor receives instructions and data from read-only memory and or RAM. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and so on. Any of the foregoing may be supplemented by, or incorporated in, specially designed application specific integrated circuits (ASICs).

Although particular embodiments 10, 210 of the TDR measurement system have been shown and described, it will be understood that other mounting arrangements as well as other sensing probe configurations can be used without departing from the spirit and scope of the invention. For example, a one-inch NPT threaded mounting opening is common on many types of holding tanks and therefore it is within the purview of the present invention to provide appropriate mounting heads for any tank mounting configuration for connecting the TDR measurement system to the tank wall or other surface.

It will be understood that the term "preferably" as used throughout the specification refers to one or more exemplary embodiments of the invention and therefore is not to be interpreted in any limiting sense.

It will be further understood that the term "connect" and its derivatives refers to two or more parts capable of being attached together either directly or indirectly through one or more intermediate members.

In addition, terms of orientation and/or position, such as upper, lower, first, second, inner, outer, vertical, horizontal, and so on, as well as their derivatives as may be used throughout the specification denote relative, rather than absolute, orientations and/or positions.

It will be appreciated by those skilled in the art that changes can be made to the embodiments described above without departing from the broad inventive concept thereof. It will be understood, therefore, that this invention is not limited to the particular embodiments disclosed, but is intended to cover modifications within the spirit and scope of the present invention as defined by the appended claims.

The inventor claims:

1. In a Time Domain Reflectometry (TDR) measurement system including a housing and an elongate measurement probe and an electronics assembly comprising a transmitter for transmitting a signal to the elongate measurement probe and a receiver for receiving at least a return echo from the signal upon encountering a change in impedance to thereby determine a position of a medium in relation to the elongate measurement probe, a method for generating a time delay between transmit and receive pulses for capturing measurements in a given measurement cycle, the method comprising:

said electronics assembly initiating a first time-dependent non-linear ramped waveform function and a second time-dependent non-linear ramped waveform function associated with transmit and receive signals, respectively;

wherein the second time-dependent non-linear ramped waveform function being a relatively slow waveform in relation to the first time-dependent non-linear ramped waveform function, and initiated at a first time prior to initiation of the first time-dependent non-linear ramped waveform at a second time $t_0$;

comparing the output of the first time dependent non-linear ramped waveform function and the second time-dependent non-linear ramped waveform function;

activating a receive signal to measure a data point along the waveguide associated with a localized impedance at a third time $t_1$ when the outputs of the first and second time-dependent non-linear waveforms are equal;

wherein the first and second time-dependent non-linear ramped functions are configured such that their waveform characteristics produces a time delay between time $t_0$ and time $t_1$ that is a linear function of time.

2. The method according to claim 1, further comprising, in response to a determination that the outputs of the first and second time-dependent non-linear ramped waveforms are equal, resetting the first time-dependent non-linear function to a known value and repeating the comparison between the first and second time-dependent non-linear waveform functions until the outputs of the first and second time-dependent non-linear ramped waveforms are determined to be equal, wherein, in response thereto, actuating a receive signal to measure another data point along the waveguide associated with a localized impedance; and repeating said steps to thereby generate a series of time delays.

3. The method according to claim 2, further comprising generating a series of linearly increasing time delays by linearly increasing the time between the said reset of one of the time-dependent non-linear waveform functions.

4. The method according to claim 2, wherein the second time-dependent non-linear ramp waveform function is reset at the end of a measurement cycle, and the wherein generation of a series of time delays is repeated.

5. The method according to claim 4, wherein a profile of an echo signal is developed and used to determine the position of the medium by the elongate measurement probe.

6. The method according to claim 1, wherein the first and second time-dependent non-linear ramped waveform functions are exponential functions.

7. The method according to claim 6, wherein the second time-dependent non-linear ramped waveform function is given as $$V-1 = V_{cc} \times \left(1 - e^{\frac{-t}{\tau_s}}\right)$$

wherein:
V1 is a charging voltage across a capacitor of said electronics assembly;
Vcc is the supply voltage,
t is the elapsed time since application of the supply voltage, and
τs is the RC time constant of the RC charging circuit; and wherein the first time-dependent non-linear ramped waveform function is given as $$V_2 = V_{cc} \times \left(1 - e^{\frac{-t-t_0}{\tau_f}}\right)$$

wherein:
V2 is the charging voltage across said capacitor,
Vcc is the supply voltage,
t is the elapsed time since application of the supply voltage,
t0 is the time at which the transmit signal is generated, and
$t_f$ is the RC time constant of the RC charging circuit.

8. The method according to claim 1, wherein the first time-dependent non-linear ramped waveform function is configured as a 40 Hz square wave signal; and
wherein said second time-dependent non-linear ramped waveform function is configured as a 4 MHz square wave signal.

* * * * *